(12) United States Patent
Takada et al.

(10) Patent No.: US 10,365,411 B2
(45) Date of Patent: *Jul. 30, 2019

(54) HARDCOAT FILM, POLARIZING PLATE, LIQUID CRYSTAL DISPLAY, AND METHOD FOR MANUFACTURING HARDCOAT FILM

(71) Applicant: FUJIFILM Corporation, Tokyo (JP)

(72) Inventors: Katsuyuki Takada, Kanagawa (JP); Keigo Ueki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/655,183

(22) Filed: Jul. 20, 2017

(65) Prior Publication Data

US 2017/0322345 A1   Nov. 9, 2017

Related U.S. Application Data

(63) Continuation of application No. PCT/JP2016/053484, filed on Feb. 5, 2016.

(30) Foreign Application Priority Data

Feb. 6, 2015 (JP) .................. 2015-021869
Nov. 13, 2015 (JP) .................. 2015-222756

(51) Int. Cl.
| | | |
|---|---|---|
| G02F 1/1335 | (2006.01) | |
| G02B 1/14 | (2015.01) | |
| B32B 27/30 | (2006.01) | |
| B32B 27/38 | (2006.01) | |
| B05D 1/18 | (2006.01) | |
| B05D 1/26 | (2006.01) | |
| B05D 1/28 | (2006.01) | |
| B05D 1/30 | (2006.01) | |
| C08J 7/04 | (2006.01) | |
| G02B 5/30 | (2006.01) | |
| G02B 27/00 | (2006.01) | |

(52) U.S. Cl.
CPC ............ *G02B 1/14* (2015.01); *B05D 1/18* (2013.01); *B05D 1/265* (2013.01); *B05D 1/28* (2013.01); *B05D 1/305* (2013.01); *B32B 27/30* (2013.01); *B32B 27/38* (2013.01); *C08J 7/047* (2013.01); *G02B 5/3033* (2013.01); *G02F 1/1335* (2013.01); *G02F 1/133528* (2013.01); *C08J 2301/10* (2013.01); *C08J 2333/12* (2013.01); *C08J 2367/02* (2013.01); *C08J 2369/00* (2013.01); *C08J 2463/10* (2013.01); *G02B 27/0006* (2013.01); *G02F 2201/50* (2013.01); *Y10T 428/105* (2015.01); *Y10T 428/1073* (2015.01); *Y10T 428/1077* (2015.01)

(58) Field of Classification Search
CPC . B05D 1/18; B05D 1/28; B05D 1/265; B05D 1/305; G02B 1/14; G02B 27/0006; G02F 1/133528; G02F 2201/50; Y10T 428/1036; Y10T 428/105; Y10T 428/1073; Y10T 428/1077; C08J 2463/10; C08J 2333/12; C08J 2367/02; C08J 2301/10
See application file for complete search history.

(56) References Cited

U.S. PATENT DOCUMENTS

| | | | |
|---|---|---|---|
| 8,859,060 B2 | 10/2014 | Fukagawa et al. | |
| 2005/0249940 A1* | 11/2005 | Klun | C08G 65/226 428/323 |
| 2006/0099385 A1* | 5/2006 | Onozawa | C08J 7/047 428/141 |
| 2007/0178297 A1* | 8/2007 | Takada | C08G 18/673 428/323 |
| 2010/0129587 A1* | 5/2010 | Terauchi | C08F 220/22 428/65.1 |
| 2010/0137515 A1* | 6/2010 | Takawaki | C08F 299/00 525/55 |
| 2012/0077046 A1 | 3/2012 | Asahi et al. | |
| 2013/0189449 A1* | 7/2013 | Fukagawa | C09K 19/52 428/1.33 |
| 2014/0098331 A1 | 4/2014 | Hisanaga et al. | |
| 2016/0122486 A1 | 5/2016 | Noro et al. | |

FOREIGN PATENT DOCUMENTS

| | | |
|---|---|---|
| JP | H04-236211 A | 8/1992 |
| JP | H08-073771 A | 3/1996 |
| JP | 2002-322430 A | 11/2002 |

(Continued)

OTHER PUBLICATIONS

International Preliminary Report on Patentability issued by WIPO dated Aug. 17, 2017, in connection with international Patent Application No. PCT/JP2016/053484.
International Search Report issued in connection with International Patent Application No. PCT/JP2016/053484 dated Mar. 1, 2016.
Written Opinion issued in connection with International Patent Application No. PCT/JP2016/053484 dated Mar. 1, 2016.
Notification of Reasons for Refusal issued by the Japanese Patent Office dated Oct. 3, 2017, in connection with corresponding Japanese Patent Application No. 2015-0742442.

(Continued)

*Primary Examiner* — Sophie Hon
(74) *Attorney, Agent, or Firm* — Edwards Neils, LLC; Jean C. Edwards, Esq.

(57) ABSTRACT

A hardcoat film including a support and a hardcoat layer, in which the support contains a resin as a main component, a film thickness of the hardcoat layer exceeds 20 μm, the hardcoat layer contains a structure derived from a compound which has one alicyclic epoxy group and one ethylenically unsaturated double bond group and has a molecular weight equal to or less than 300, and a structure derived from a compound which has 3 or more ethylenically unsaturated double bond groups, a radical polymerization initiator and a cationic polymerization initiator.

10 Claims, No Drawings

(56) References Cited

FOREIGN PATENT DOCUMENTS

| | | |
|---|---|---|
| JP | 2003-147017 A | 5/2003 |
| JP | 2004-237687 A | 8/2004 |
| JP | 2006-098444 A | 4/2006 |
| JP | 2006-137835 A | 6/2006 |
| JP | 2006-335837 A | 12/2006 |
| JP | 2007-237483 A | 9/2007 |
| JP | 2010-008659 A | 1/2010 |
| JP | 2010-032853 A | 2/2010 |
| JP | 2011-118135 A | 6/2011 |
| JP | 2012-088699 A | 5/2012 |
| JP | 2012-141459 A | 7/2012 |
| JP | 2013-204001 A | 10/2013 |
| JP | 2014-030969 A | 2/2014 |
| WO | 2015/005400 A1 | 1/2015 |

OTHER PUBLICATIONS

Notification of Reasons for Refusal issued by the Japanese Patent Office dated Feb. 21, 2017, in connection with corresponding Japanese Patent Application No. 2015-074244.

Non-Final Office Action issued in U.S. Appl. No. 14/747,463 dated Dec. 22, 2016.

Final Office Action issued in U.S. Appl. No. 14/747,463 dated May 10, 2017.

Notification of Reason for Refusal issued by the Korean Intellectual Property Office dated May 21, 2018, in connection with Korean Patent Application No. 10-2017-7019025.

Notification of Reasons for Refusal issued by the Japanese Patent Office dated Jul. 3, 2018, in connection with Japanese Patent Application No. 2016-573434.

\* cited by examiner

HARDCOAT FILM, POLARIZING PLATE, LIQUID CRYSTAL DISPLAY, AND METHOD FOR MANUFACTURING HARDCOAT FILM

CROSS-REFERENCE TO RELATED APPLICATIONS

This application is a Continuation of PCT International Application No. PCT/JP2016/053484, filed on Feb. 5, 2016, which was published under PCT Article 21(2) in Japanese, and which claims priority under 35 U.S.C. Section 119(a) to Japanese Patent Application No. 2015-021869 filed on Feb. 6, 2015 and Japanese Patent Application No. 2015-222756 filed on Nov. 13, 2015. The above applications are hereby expressly incorporated by reference, in their entirety, into the present application.

BACKGROUND OF THE INVENTION

1. Field of the Invention

The present invention relates to a hardcoat film, a polarizing plate, a liquid crystal display, and a method for manufacturing a hardcoat film. More specifically, the present invention relates to a hardcoat film which has high pencil hardness and excellent smoothness and excellently maintains the external appearance of the film without change after being left in a moist-heat environment for a long period of time, a polarizing plate using the hardcoat film, a liquid crystal display using the polarizing plate, and a method for manufacturing a hardcoat film which has high pencil hardness and excellent smoothness and excellently maintains the external appearance of the film without change after being left in a moist-heat environment for a long period of time.

2. Description of the Related Art

In image displays such as a cathode tube display, a plasma display, an electroluminescence display, a fluorescent display, a field emission display, or a liquid crystal display (LCD), in order to prevent an image display surface from being scratched, it is suitable for a hardcoat film having a hardcoat layer to be provided on a support containing a resin as a main component.

Because of being used as the uppermost surface of a display, the hardcoat film is required to have high film hardness.

As a film laminate having other functional layers on the support containing a resin as a main component, the constitution other than the hardcoat film is also known.

For example, JP2004-237687A describes a film laminate obtained by laminating a smoothing layer directly on a base material layer formed of a plastic film and laminating an inorganic compound layer on the flattening layer, in which the maximum value of peak-to-valley of irregularities on the surface of the laminated side excluding waviness is equal to or less than 50 nm.

Meanwhile, it is known that various compositions are adopted for the hardcoat layer used in the hardcoat film.

For example, JP2007-237483A describes an optical laminate including a light-transmitting resin base material and a hardcoat layer disposed on the base material, in which the hardcoat layer is a cured layer containing (1) resin which has a weight-average molecular weight equal to or greater than 1,000 and equal to or less than 100,000 and contains two or more radically polymerizable functional groups and (2) resin which has a weight-average molecular weight equal to or greater than 100 and equal to or less than 1,000 and contains one or more cationically polymerizable functional groups, and (2) resin is cured in a state of permeating the light-transmitting resin base material.

JP1996-073771A (JP-H08-073771A) describes a photocurable hardcoat composition which contains, as an essential constituent, (A) component: one kind or two or more kinds of radically polymerizable compounds containing 3 or more radically polymerizable carbon-carbon double bonds in one molecule, (B) component: one kind or two or more kinds of cationically polymerizable compounds containing 1 to 5 epoxy groups in one molecule, (C) component: a photosensitive cationic polymerization initiator, and (D) component: a photosensitive radical polymerization initiator formed of aromatic ketones, in which a mass ratio of (A) component/(B) component is 95/5 to 60/40.

SUMMARY OF THE INVENTION

In the related art, for the uses in which glass such as chemically strengthened glass is mainly used, as novel techniques for improving the hardness of hardcoat materials progress, the usefulness of the hardcoat materials as substitutes for glass are drawing attention. One of the examples of the uses of the materials as substitutes for glass is the application of the materials to an uppermost surface protective film of an image display such as a touch panel.

The inventors of the present invention performed examination regarding the use of a hardcoat film, which includes a support containing a resin as a main component and a hardcoat layer, as an uppermost surface protective film of an image display. As a result, the inventors found that the support containing a resin as a main component tends to be less smooth than glass, and in a case where the hardcoat layer is laminated on the support containing a resin as a main component, the surface of the hardcoat layer also tends to exhibit low smoothness. Furthermore, the inventors found that, in a case where a film with low smoothness is used as the uppermost surface of a touch panel, fluorescent light or the like is reflected on the touch panel, hence the reflected image is distorted, and accordingly, the quality deteriorates unfortunately. Therefore, the inventors performed examination regarding the use of the invention described in JP2004-237687A as the hardcoat film of the uppermost surface of a display. The inventors laminated a flattening layer containing aminopropyltrimethoxysilane, organosilane, and the like used in examples in JP2004-237687A on a plastic film. As a result, they found that, although a smoothness improving effect is confirmed, the surface hardness is insufficient in a case where the laminate is used as a hardcoat film as a substitute for glass used for a touch panel, and it is difficult to use the laminate as the uppermost surface of a display.

In order to improve the hardness of the surface of the hardcoat film, generally, a method such as densely curing the hardcoat layer is generally considered. However, this method leads to a problem in that the smoothness of the hardcoat film obtained after curing deteriorates. The inventors of the present invention actually performed examination regarding the use of the hardcoat film, which has the hardcoat layer having a composition obtained by mixing together an acryl-based compound and an epoxy-based compound described in JP2007-237483A and JP1996-073771A (JP-H08-073771A), as an uppermost surface protective film of an image display. As a result, the inventors found that it is difficult to accomplish both of the surface hardness and the smoothness simultaneously.

Furthermore, the inventors of the present invention found that, in a case where the acryl-based compound and the epoxy-based compound are mixed together as in the inventions described in JP2007-237483A and JP1996-073771A (JP-H08-073771A), in addition to the problem in that it is difficult to accomplish both of the surface hardness and the smoothness simultaneously, a new problem which has not yet been known in the related art arises in that in a case where the hardcoat film is exposed to a high temperature and a high humidity for a long period of time (in a case where the hardcoat film has been left in a moist-heat environment for a long period of time), due to the bleed-out of the epoxy-based compound, the film turns white, and the external appearance of the film changes.

An object of the present invention is to provide a hardcoat film which has high pencil hardness and excellent smoothness and is inhibited from experiencing a change of external appearance of the film after being left in a moist-heat environment for a long period of time.

In order to achieve the aforementioned object, the inventors of the present invention performed thorough examination.

The aforementioned object of the present invention can be achieved by the present invention described below.

[1] A hardcoat film comprising a support and a hardcoat layer disposed on at least one surface of the support, in which the support contains a resin as a main component, a film thickness of the hardcoat layer exceeds 20 μm, the hardcoat layer contains at least a structure derived from the following a), a structure derived from the following b), the following c), and the following d), and in a case where a total solid content of the hardcoat layer is regarded as being 100% by mass, the hardcoat layer contains the structure derived from the following a) in an amount of 15% to 70% by mass, the structure derived from the following b) in an amount of 25% to 80% by mass, the following c) in an amount of 0.1% to 10% by mass, and the following d) in an amount of 0.1% to 10% by mass.

a) compound which has one alicyclic epoxy group and one ethylenically unsaturated double bond group in a molecule and has a molecular weight equal to or less than 300 b) compound which has 3 or more ethylenically unsaturated double bond groups in a molecule c) radical polymerization initiator d) cationic polymerization initiator

[2] In the hardcoat film described in [1], the hardcoat layer is preferably formed by curing a composition for forming a hardcoat layer containing at least a), b), c), and d), and in a case where a total solid content of the composition for forming a hardcoat layer is regarded as being 100% by mass, the composition preferably contains a) in an amount of 15% to 70% by mass, b) in an amount of 25% to 80% by mass, c) in an amount of 0.1% to 10% by mass, and d) in an amount of 0.1% to 10% by mass.

[3] In the hardcoat film described in [1] or [2], the hardcoat layer preferably contains e) inorganic particles reactive with tin epoxy group or an ethylenically unsaturated double bond group in an amount of 5% to 40% by mass.

[4] In the hardcoat film described in [3], e) inorganic particles reactive with an epoxy group or an ethylenically unsaturated double bond group are preferably silica particles.

[5] In the hardcoat film described in any one of [1] to [4], a) compound which has one alicyclic epoxy group and one ethylenically unsaturated double bond group in a molecule and has a molecular weight equal to or less than 300 is preferably epoxycyclohexylmethyl (meth)acrylate.

[6] In the hardcoat film described in any one of [1] to [5], the hardcoat layer preferably contains f) polyester urethane.

[7] In the hardcoat film described in any one of [1] to [6], the hardcoat layer preferably contains g) antifoulant.

[8] In the hardcoat film described in [7], g) antifoulant preferably contains a fluorine-containing compound, the fluorine-containing compound preferably has a perfluoropolyether group and polymerizable unsaturated groups, and the fluorine-containing compound preferably has the plurality of polymerizable unsaturated groups in one molecule.

[9] In the hardcoat film described in any one of [1] to [8], the support is preferably a plastic transparent support.

[10] In the hardcoat film described in any one of [1] to [9], the support preferably includes at least one kind of film selected from the group consisting of an acryl resin film and a polycarbonate resin film.

[11] In the hardcoat film described in any one of [1] to [9], the support is preferably a cellulose acylate film, and the cellulose acylate film preferably contains at least a compound represented by the following Formula I;

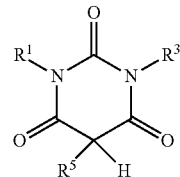

Formula I in Formula I, $R^1$, $R^3$, and $R^5$ each independently represent a hydrogen atom, an alkyl group, a cycloalkyl group, an alkenyl group, or an aromatic group, the alkyl group, the cycloalkyl group, the alkenyl group, and the aromatic group may have a substituent, and any one of $R^1$, $R^3$, and $R^5$ is an alkyl group or a cycloalkyl group substituted with a group having a ring structure, and the number of ring structures existing in $R^1$, $R^3$, and $R^5$ is equal to or greater than 3 in total.

[12] In the hardcoat film described in any one of [1] to [11], a film thickness of the support is preferably equal to or greater than 200 μm.

[13] A polarizing plate comprising a polarizer and at least one sheet of the hardcoat film described in any one of [11] to [12].

[14] A liquid crystal display comprising a liquid crystal cell and the polarizing plate described in [13] disposed on at least one surface of the liquid crystal cell, in which the hardcoat film is disposed on at least one uppermost surface of the liquid crystal display.

[15] A method for manufacturing a hardcoat film having a support and a hardcoat layer disposed on at least one surface of the support, comprising a step of forming the hardcoat layer by curing a composition for forming a hardcoat layer containing at least the following a), the following b), the following c), and the following d) such that a film thickness of the hardcoat layer exceeds 20 μm, in which the support contains a resin as a main component, and in a case where a total solid content of the composition for forming a hardcoat layer is regarded as being 100% by mass, the composition contains a) in an amount of 15% to 70% by mass, b) in an amount of 25% to 80% by mass, c) in an amount of 0.1% to 10% by mass, and d) in an amount of 0.1% to 10% by mass.

a) compound which has one alicyclic epoxy group and one ethylenically unsaturated double bond group in a molecule and has a molecular weight equal to or less than 300 b) compound which has 3 or more ethylenically unsaturated double bond groups in a molecule c) radical polymerization initiator d) cationic polymerization initiator According to the present invention, it is possible to provide a hardcoat film which has high pencil hardness and excellent smoothness and is inhibited from experiencing a change of external appearance of the film after being left in a moist-heat environment for a long period of time.

DESCRIPTION OF THE PREFERRED EMBODIMENTS

In the following section, constituents will be described based on typical embodiments of the present invention in some cases, but the present invention is not limited to the embodiments. In the present specification, a range of numerical values described using "to" means a range including the numerical values listed before and after "to" as a lower limit and an upper limit. "Acryl resin" means a resin obtained by polymerizing a derivative of methacrylic acid or acrylic acid and a resin containing the derivative thereof. Furthermore, unless otherwise specified, "(meth)acrylate" represents acrylate and methacrylate, and "(meth)acryl" represents acryl and methacryl. By definition, "(meth)acryloyl group" includes an acryloyl group and a methacryloyl group. By definition, "(meth)acrylic acid" includes acrylic acid and methacrylic acid. By definition, "(di)penta" includes penta and dipenta.

[Hardcoat Film]

A hardcoat film of the present invention has a support and a hardcoat layer disposed on at least one surface of the support, in which the support contains a resin as a main component, a film thickness of the hardcoat layer exceeds 20 μm, the hardcoat layer contains at least a structure derived from the following a), a structure derived from the following b), the following c), and the following d), and in a case where a total solid convent of the hardcoat layer is regarded as being 100% by mass, the hardcoat layer contains the structure derived from the following a) in an amount of 15% to 70% by mass, the structure derived from the following b) in an amount of 25% to 80% by mass, the following c) in an amount of 0.1% to 10% by mass, and the following d) in an amount of 0.1% to 10% by mass;

a) compound which has one alicyclic epoxy group and one ethylenically unsaturated double bond group in a molecule and has a molecular weight equal to or less than 300;

b) compound which has 3 or more ethylenically unsaturated double bond groups in a molecule;

c) radical polymerization initiator; and d) cationic polymerization initiator.

Due to the above constitution, the hardcoat film of the present invention has high pencil hardness and excellent smoothness and is inhibited from experiencing a change of external appearance of the film after being left in a moist-heat environment for a long period of time.

In the present invention, the hardcoat layer preferably has hard coat properties. In the present specification, the hard coat properties mean that, in a case where the hardcoat layer is used as an uppermost surface protective film of an image display as a hardcoat film substituting glass, the hardcoat layer has a pencil hardness equal to or higher than 7H. The pencil hardness of the hardcoat layer is preferably equal to or higher than 8H.

It is preferable that the hardcoat film of the present invention constituted as above is manufactured by a method for manufacturing a hardcoat film of the present invention that will be described later.

<Constitution>

The hardcoat film of the present invention has a support and a hardcoat layer disposed on at least one surface of the support. The hardcoat film of the present invention preferably has a constitution in which the hardcoat layer is formed on at least one surface of the support by coating. The hardcoat film of the present invention is formed by curing a composition for forming a hardcoat layer containing a), b), c), and d). In a case where a total solid content of the composition for forming a hardcoat layer is regarded as being 100% by mass, the composition more preferably contains a) in an amount of 15% to 70% by mass, b) in an amount of 25% to 80% by mass, c) in an amount of 0.1% to 10% by mass, and d) in an amount of 0.1% to 10% by mass.

The hardcoat film according to an aspect of the present invention includes at least a hardcoat layer and a support, and may optionally include one or more other layers. Examples of the optional layers include, but are not limited to, an easy-adhesive layer, air antireflection layer (laminated film consisting of one or more layers of high refractive index and one or more layers of levy refractive index), and the like. Regarding these layers, for example, paragraphs [0069] to [0091] and the like in JP5048304B can be referred to. A decorative layer may also be provided.

Examples of preferred layer constitutions of the hardcoat film of the present invention will be shown below, but the present invention is not particularly limited to these layer constitutions.

Support/hardcoat layer

Support/hardcoat layer/layer of low refractive index

Support/hardcoat layer/antiglare layer (antistatic layer)/layer of low refractive index Support/hardcoat layer/antiglare layer/antistatic layer/layer of low refractive index Support/hardcoat layer/antistatic layer/antiglare layer/layer of low refractive index Support/hardcoat layer (antistatic layer)/antiglare layer/layer of low refractive index Support/hardcoat layer/layer of high refractive index/antistatic layer/layer of low refractive index Support/hardcoat layer/layer of high refractive index (antistatic layer)/layer of low refractive index Support/hardcoat layer/antistatic layer/layer of high refractive index/layer of low refractive index Support/hardcoat layer/layer of medium refractive index/layer of high refractive index (antistatic layer)/layer of low refractive index Support/hardcoat layer/layer of medium refractive index (antistatic layer)/layer of high refractive index/layer of low refractive index Support/hardcoat layer (antistatic layer)/layer of medium refractive index/layer of high refractive index/layer of low refractive index Support/antistatic layer/hardcoat, layer/layer of medium refractive index/layer of high refractive index/layer of low refractive index Antistatic layer/support/hardcoat layer/layer of medium refractive index/layer of high refractive index/layer of low refractive index Herein, the antistatic layer and the antiglare layer may have hard coat properties.

(Layer of Low Refractive Index)

For the purpose of imparting a reflectivity reducing effect, a layer of low refractive index may be formed on the hardcoat layer. The refractive index of the layer of low refractive index is lower than that of the hardcoat layer. The thickness of the layer of low refractive index is preferably 50 to 200 nm, more preferably 70 to 150 nm, and most preferably 80 to 120 nm.

The refractive index of the layer of low refractive index is lower than that of a layer immediately below the layer of low refractive index. The refractive index of the layer of low refractive index is preferably 1.20 to 1.55, more preferably 1.25 to 1.46, and particularly preferably 1.30 to 1.40. The thickness of the layer of low refractive index is preferably 50 to 200 nm, and more preferably 70 to 100 nm. The layer of low refractive index is preferably obtained by curing a curable composition for forming a layer of low refractive index.

Examples of preferred aspects of the curable composition for forming a layer of low refractive index include (1) composition containing a fluorine-containing compound having a cross-linkable or polymerizable functional group, (2) composition containing a hydrolytic condensate of a fluorine-containing organosilane material as a main component, (3) composition containing monomer having two or more ethylenically unsaturated groups and inorganic particles (particularly preferably inorganic particles having a hollow structure), and the like.

It is preferable that (1) and (2) also contain inorganic particles. From the viewpoint of a change in refractive index or from the viewpoint of adjusting the amount of the inorganic particles added and the refractive index, it is particularly preferable to use inorganic particles having a hollow structure with a low refractive index.

(1) Fluorine-containing compound having cross-linkable or polymerizable functional group Examples of the fluorine-containing compound having a cross-linkable or polymerizable functional group include copolymers of a fluorine-containing monomer and a monomer basing a cross-linkable or polymerizable functional group. Specific examples of these fluorine-containing polymers are described in JP2003-222702A, JP2003-183322A, and the like.

As described in JP2000-17028A, a curing agent having a polymerizable unsaturated group may be appropriately used in combination with the aforementioned polymers. Furthermore, as described in JP2002-145952A, a compound having a fluorine-containing polyfunctional polymerizable unsaturated group is preferably used in combination. Examples of the compound having a polyfunctional polymerizable unsaturated group include a monomer having two or more ethylenically unsaturated groups described as a curable resin compound of the aforementioned antiglare layer. The hydrolytic condensate of organosilane described in JP2004-170901A is also preferable, and particularly, a hydrolytic condensate of organosilane containing a (meth)acryloyl group is preferable. Particularly, in a case where the compound having a polymerizable unsaturated group is used as the main body of the polymer, these compounds are preferable because they bring about an excellent scratch resistance improving effect by being used in combination.

In a case where the polymer itself does not have sufficient curing properties alone, by mixing the polymer with a cross-linkable compound, it is possible to impart necessary curing properties. For example, in a case where the main body of the polymer contains a hydroxyl group, it is preferable to use various amino compounds as a curing agent.

The amino compound used as a cross-linkable compound is, for example, a compound containing either or both of two or more hydroxyalkylamino groups and two or more alkoxyalkylamino groups in total. Specific examples of the amino compound include a melamine-based compound, a urea-based compound, a benzoguanamine-based compound, a glycoluril-based compound, and the like. For curing these compounds, it is preferable to use an organic acid or a salt thereof.

(2) Composition containing hydrolytic condensate of fluorine-containing organosilane material as main component The composition containing a hydrolytic condensate of a fluorine-containing organosilane compound as a main component is also preferable because this composition has a high refractive index and enables the surface of a coating film to have high hardness. As the composition, a condensate of tetraalkoxysilane and a compound containing hydrolytic silanol on one terminal or both terminals with respect to a fluorinated alkyl group is preferable. The composition is specifically described in JP2002-265866A and JP317152B.

(3) Composition containing monomer having two or more ethylenically unsaturated groups and inorganic particles having hollow structure As another preferred aspect, a layer of low refractive index formed of particles of low refractive index and a binder can be exemplified. The particles of low refractive index may be organic or inorganic. As such particles, particles having internal holes are preferable. Specific examples of the hollow particles include silica-based particles described in JP2002-79616A. The refractive index of the particles is preferably 1.15 to 1.40, and more preferably 1.20 to 1.30. Examples of the binder include the monomer having two or more ethylenically unsaturated groups described above in the page showing the antiglare layer.

It is preferable to acid a photoradical polymerization initiator or a thermal radical polymerization initiator to the composition for forming a layer of low refractive index used in the present invention. In a case where the composition contains a radically polymerizable compound, the polymerization initiator can be used in an amount of 1 to 10 parts by mass and preferably in an amount of 1 to 5 parts by mass with respect to the aforementioned compound.

In the layer of low refractive index used in the present invention, inorganic particles can be used in combination. In order to impart scratch resistance, it is possible to use particles having a particle size that is 15% to 150%, preferably 30% to 100%, and more preferably 45% to 60% of the thickness of the layer of low refractive index.

For the purpose of imparting properties such as antifouling properties, water resistance, chemical resistance, and lubricating properties, a known polysiloxane-based or fluorine-based anti foulard, a lubricant, and the like can be appropriately added to the layer of low refractive index used in the present invention.

As additives having a polysiloxane structure, it is preferable to acid reactive group-containing polysiloxane {for example, "KF-100T", "X-22-169AS", "KF-102", "X-22-37011E", "X-22-164B", "X-22-5002", "X-22-173B", "X-22-174D", "X-22-167B", and "X-22-161AS" (trade names) manufactured by Shin-Etsu Chemical Co., Ltd.; "AK-5", "AK-30", and "AK-32" (trade names) manufactured by TOAGOSEI CO., LTD.; and "SILAPLANE FM0725" and "SILAPLANE FM0721" (trade name) manufactured by CHISSO CORPORATION}, Furthermore, the silicone-based compounds described in Tables 2 and 3 in JP2003-112383A can also be preferably used.

As a fluorine-based compound, a compound having a fluoroalkyl group is preferable. The number of carbon atoms in the fluoroalkyl group is preferably 1 to 20, and more preferably 1 to 10. The fluoroalkyl group may have a linear structure (such as —$CF_2CF_3$, —$CH_2(CF_2)_4H$, —$CH_2(CF_2)_8CF_3$, or —$CH_2CH_2(CF_2)_4H$), a branched structure (such as $CH(CF_3)_2$, $CH_2CF(CF_3)_2$, $CH(CH_3)CF_2CF_3$, or $CH(CH_3)(CF_2)_5CF_2H$), or an alicyclic structure (preferably a 5- or 6-membered ring, such as a perfluorocyclohexyl group, a perfluorocyclopentyl group, or an alkyl group substituted with these), or may have an ether bond (such as $CH_2OCH_2CF_2CF_3$, $CH_2CH_2OCH_2C_4F_8H$, $CH_2CH_2OCH_2CH_2C_8F_{17}$, or $CH_2CH_2OCF_2CF_2OCF_2CF_2H$). The fluorine-based compound may contain a plurality of fluoroalkyl groups in the same molecule.

It is preferable that the fluorine-based compound additionally has substituents which contribute to the formation of a bond with the film of the layer of low refractive index or contributes to the compatibility with the layer of low refractive index. It is preferable that the compound has a plurality of substituents, and the substituents may be the same as or different from each other. Examples of preferred substituents include an acryloyl group, a methacryloyl group, a vinyl group, an aryl group, a cinnamoyl group, an epoxy group, an oxetanyl group, hydroxyl group, a polyoxyalkylene group, a carboxyl group, an amino group, and the like. The fluorine-based compound may be a polymer or an oligomer with a compound which does not contain a fluorine atom, and the molecular weight of the fluorine-based compound is not particularly limited. The content of fluorine atoms in the fluorine-based compound is not particularly limited, but is preferably equal to or greater than 20% by mass, particularly preferably 30% to 70% by mass, and most preferably 40% to 70% by mass. Examples of preferred fluorine-based compounds include R-2020, M-2020, R-3833, M-3833, and OPTOOL DAC (all trade names) manufactured by DAIKIN INDUSTRIES, LTD, MEGAFACE F-171, F-172, and F-179A and DEFENSA MCF-300 and MCF-323 (all trade names) manufactured by DIC Corporation, and the like, but the present invention is not limited to these.

The polysiloxane fluorine-based compound or the compound having a polysiloxane structure is added preferably in an amount within a range of 0.1% to 10% by mass of the total solid content of the layer of few refractive index, and particularly preferably in an amount of within a range of 1% to 5% by mass of the total solid content of the layer of low refractive index.

<Hardcoat Layer and Composition for Forming Hardcoat Layer>

In the hardcoat film of the present invention, the film thickness of the hardcoat layer exceeds 20 μm.

The film thickness of the hardcoat layer is preferably greater than 20 μm and equal to or less than 50 μm, more preferably 25 to 45 μm, and particularly preferably 30 to 40 μm.

Hereinafter, each of the components contained in the hardcoat layer and the composition for forming a hardcoat layer will be specifically described.

[A] Compound which has One Alicyclic Epoxy Group and One Ethylenically Unsaturated Double Bond Group in Molecule and has Molecular Weight Equal to or Less than 300]

In the hardcoat film of the present invention, in a case where the total solid content of the hardcoat layer is regarded as being 100% by mass, the hardcoat layer contains a structure derived from the following a) in an amount of 15% to 70% by mass.

a) Compound which has one alicyclic epoxy group and one ethylenically unsaturated double bond group in molecule and has molecular weight equal to or less than 300

The hardcoat layer is formed by curing the composition for forming a hardcoat layer containing at least a), b), c), and d). In a case where the total solid content of the composition for forming a hardcoat layer is regarded as being 100% by mass, the composition preferably contains a) in an amount of 15% to 70% by mass.

a) Compound which has one alicyclic epoxy group and one ethylenically unsaturated double bond group in a molecule and has a molecular weight equal to or less than 300 that is contained in the composition for forming a hardcoat layer will be described. a) Compound which has one alicyclic epoxy group and one ethylenically unsaturated double bond group in a molecule and has a molecular weight equal to or less than 300 will be referred to as "a) component" as well.

Examples of the ethylenically unsaturated double bond group include polymerizable functional groups such as a (meth)acryloyl group, a vinyl group, a styryl group, and an allyl group. Among these, a (meth)acryloyl group and —C(O)OCH=$CH_2$ are preferable, and a (meth)acryloyl group is particularly preferable. Because the compound has the ethylenically unsaturated double bond group, high hardness can be maintained, and moist heat resistance can be imparted.

In the present invention, a molecule of the compound contains one epoxy group and one ethylenically unsaturated double bond group, for the following reason. In a case where the number of each functional group contained is one, the number of functional groups (the epoxy group and the ethylenically unsaturated double bond group) is smaller than in a case where the number of each functional group contained is equal to or greater than two. Accordingly, the molecular weight is reduced, and the pencil hardness can be improved.

The molecular weight of a) component is equal to or less than 300, preferably equal to or less than 210, and more preferably equal to or less than 200.

By setting the molecular weight to be equal to or less than 300, the moiety other than the epoxy group or the ethylenically unsaturated double bond group becomes small, and hence the pencil hardness can be improved.

From the viewpoint of inhibiting volatilization at the time of forming the hardcoat layer, the molecular weight of a) component is preferably equal to or greater than 100, and more preferably equal to or greater than 150.

a) Component is not limited as long as the component has one alicyclic epoxy group and one ethylenically unsaturated double bond group in a molecule and has a molecular weight equal to or less than 300. However, a) component is preferably a compound represented by the following Formula (1).

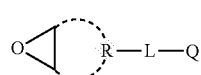

(1)

In Formula (1), R represents a monocyclic hydrocarbon or a cross-linked hydrocarbon, L represents a single bond or a divalent linking group, and Q represents an ethylenically unsaturated double bond group.

In a case where R in Formula (1) is a monocyclic hydrocarbon, the monocyclic hydrocarbon is preferably alicyclic hydrocarbons. Among these, an alicyclic group having 4 to 10 carbon atoms is more preferable, an alicyclic group having 5 to 7 carbon atoms is even more preferable, and an alicyclic group having 6 carton atoms is particularly preferable. Specifically, a cyclobutyl group, a cyclopentyl group, a cyclohexyl group, and a cycloheptyl group are preferable, and a cyclohexyl group is particularly preferable.

In a case where R in Formula (1) is a cross-linked hydrocarbon, a bicyclic crosslink (bicyclo ring) and a tricyclic crosslink (tricyclo ring) are preferable. Examples thereof include cross-linked hydrocarbons having 5 to 20 carbon atoms such as a norbornyl group, a bornyl group, an isobornyl group, a tricyclodecyl group, a dicyclopentenyl group, dicyclopentanyl group, a tricyclopenlenyl group, a tricyclopentanyl group, an adamantyl group, an adamantyl group substituted with a lower alkyl group, and the like.

In a case where L represents a divalent linking group, the divalent linking group is preferably a divalent aliphatic hydrocarbon group. The number of carbon atoms in the divalent aliphatic hydrocarbon group is preferably 1 to 6, more preferably 1 to 3, and even more preferably 1. The divalent aliphatic hydrocarbon group is preferably a linear, branched, or cyclic alkylene group, more preferably a linear or branched alkylene group, and even more preferably a linear alkylene group.

Examples of Q include polymerizable functional groups such as a (meth)acryloyl group, a vinyl group, a styryl group, and an allyl group. Among these, a (meth)acryloyl group and —C(O)OCH=$CH_2$ are preferable, and a (meth) acryloyl group is particularly preferable.

The specific compound as a) component is not particularly limited as long as it is a compound which has one alicyclic epoxy group and one ethylenically unsaturated double bond group in a molecule and has a molecular weight equal to or less than 300. As the compound, it is possible to use the compound described in paragraph [0015] in JP1998-17614A (JP-H10-17614A), a compound represented by the following Formula (1A) or (1B), 1,2-epoxy-4-vinylcyclohexane, and the like.

Among these, the compound represented by the following Formula (1A) or (1B) is more preferable, and the compound represented by the following Formula (1A) having a low molecular weight is even more preferable. An isomer of the compound represented by the following Formula (1A) is also preferable. In the following Formula (1A), $L_2$ represents a divalent aliphatic hydrocarbon group having 1 to 6 carbon atoms. The number of carbon atoms in $L_2$ is more preferably 1 to 3. From the viewpoint of improving smoothness, the number of carbon atoms in $L_2$ is even more preferably 1 (that is, a) component is even more preferably epoxycyclohexyl methyl (meth)acrylate).

By using these compounds, it is possible to simultaneously achieve both of high pencil hardness and excellent smoothness at a higher level.

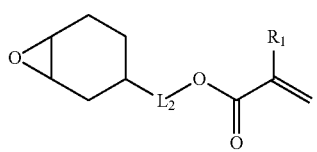
(1A)

In Formula (1A), $R_1$ represents a hydrogen atom or a methyl group, and $L_2$ represents a divalent aliphatic hydrocarbon group having 1 to 6 carbon atoms.

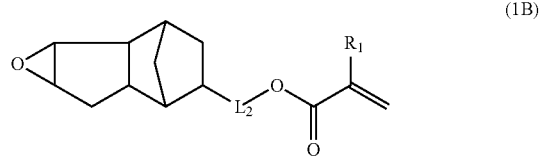
(1B)

In Formula (1B), $R_1$ represents u hydrogen, atom or a methyl group, and $L_2$ represents a divalent aliphatic hydrocarbon group having 1 to 3 carbon atoms.

The number of carbon atoms in the divalent aliphatic hydrocarbon group represented by $L_2$ in Formulae (1A) and (1B) is 1 to 6, more preferably 1 to 3, and even more preferably 1. The divalent aliphatic hydrocarbon group is preferably a linear, branched, or cyclic alkylene group, more preferably a linear or branched alkylene group, and even more preferably a linear alkylene group.

In a case where the total solid content of the hardcoat layer is regarded as being 100% by mass, the hardcoat layer contains the structure derived from a) in an amount of 15% to 70% by mass. In a case where the total solid content of the composition for forming a hardcoat layer in the present invention is regarded as being 100% by mass, the composition contains a) component in an amount of 15% to 70% by mass. In a case where the content of the structure derived from a) or a) component with respect to the hardcoat layer or the composition for forming a hardcoat layer is equal to or greater than 15% by mass, a sufficient surface smoothness-improving effect is obtained. In contrast, in a case where the content of the structure derived from a) or a) component with respect to the hardcoat layer or the composition for forming a hardcoat layer is equal to or less than 70% by mass, the surface hardness can be sufficiently improved.

In a case where the total solid content of the hardcoat layer is regarded as being 100% by mass, the content of the structure derived from a) is preferably 18% to 70% by mass, more preferably 22% to 70% by mass, and even more preferably 45% to 70% by mass. In a case where the total solid content of the composition for forming a hardcoat layer in the present invention is regarded as being 100% by mass, the content of a) component is preferably 18% to 70% by mass, more preferably 22% to 70% by mass, and even more preferably 45% to 70% by mass.

[b) Compound which has 3 or More Ethylenically Unsaturated Double Bond Groups in Molecule]

In a case where the total solid content of the hardcoat layer of the hardcoat film of the present invention is regarded as being 100% by mass, the hardcoat layer contains a structure derived from the following b) in an amount of 25% to 80% by mass.

b) Compound which has 3 or more ethylenically unsaturated double bond groups in a molecule It is preferable that the hardcoat film is formed by curing a composition for forming a hardcoat layer containing at least a), b), c), and d). In a case where the total solid content of the composition for forming a hardcoat layer is regarded as being 100% by mass, the composition for forming a hardcoat layer preferably contains b) in an amount of 25% to 80% by mass.

b) Compound which has 3 or more ethylenically unsaturated double bond groups in a molecule that is contained in the composition for forming a hardcoat layer in the present invention will be described, b) Compound which has 3 or more ethylenically unsaturated double bond groups in a molecule will be referred to as "b) component" as well.

b) Component can express high hardness by having 3 or more ethylenically unsaturated double bond groups in a molecule.

Examples of b) component include an ester of a polyhydric alcohol and (meth)acrylic acid, vinyl benzene and a derivative thereof, vinyl sulfone, (meth)acrylamide, and the like. Among these, from the viewpoint of hardness, a compound having 3 or more (meth)acryloyl groups is preferable. Examples of the compound include acrylate-based compounds forming a cured substance with high hardness that is widely used in the field of the related art. Examples of such a compound include a compound which is an ester of a polyhydric alcohol and (meth)acrylic acid and has 3 or more ethylenically unsaturated double bond groups in a molecule. Examples of this compound include (di)pentacrythritol tetra(meth)acrylate, (di)pentacrythritol tri(meth)acrylate, trimethylolpropane tri(meth)acrylate, EO-modified trimethylolpropane tri(meth)acrylate, PO-modified trimethylolpropane tri(meth)acrylate, EO-modified phosphoric acid tri(meth) acrylate, trimethylolethanc tri(meth)acrylate, di trimethylolpropane tetra(meth)acrylate, dipentacrythritol tetra(meth)acrylate, (di)pentacrythritol penta(meth)acrylate, dipentacrythritol hexa(meth)acrylate, pentacrythritol hexa(meth)acrylate, 1,2,3-cyclohexanetetramethacrylate, polyurethane polyacrylate, polyester polyacrylate, caprolactone-modified tris(acryloxyethyl)isocyanurate, tripentacrythritol triacrylate, tripeniacrythritol hexatriacrylate, 1,2,4-cyclohexanetetra(meth)acrylate, pentaglycerol triacrylate, and the like.

Furthermore, a resin (oligomer or prepolymer) having 3 or more (meth)acryloyl groups, polyfunctional (meth)acrylate having 3 or more (meth)acryloyl groups, urethane (meth)acrylate are also preferable.

Examples of the resin (oligomer or prepolymer) having 3 or more (meth)acryloyl groups include oligomers or prepolymers of polyfunctional compounds such as a polyester resin, a polyether resin, an acryl resin, an epoxy resin, a urethane resin, an alkyd resin, a spiroacetal resin, a polybutathene resin, a polythiol polyene resin, and a polyhydric alcohol.

Specific examples of the polyfunctional (meth)acrylate having 3 or more (meth)acryloyl groups include the example compounds described in paragraph [0096] in JP2007-256844A.

Examples of specific compounds of the poly functional acrylate-based compounds having 3 or more (meth)acryloyl groups include KAYARAD DPHA, KAYARAD DPHA-2C, KAYARAD PET-30, KAYARAD TMPTA, KAYARAD TPA-320, KAYARAD TPA-330, KAYARAD RP-1040, KAYARAD T-1420, KAYARAD D-310, KAYARAD DPCA-20, KAYARAD DPCA-30, KAYARAD DPCA-60, and KAYARAD GPO-303 manufactured by Nippon Kayaku Co., Ltd. and esterified substances of a polyol and (meth)acrylic acid such as V #400 and V #36095D manufactured by OSAKA ORGANIC CHEMICAL INDUSTRY LTD. Furthermore, it is possible to suitably use urethane acrylate compounds having 3 or more functional groups such as SHIKOH UV-1400B, SHIKOH UV-1700B, SHIKOH UV-6300B, SHIKOH UV-7550B, SHIKOH UV-7600B, SHIKOH UV-7605B, SHIKOH UV-7610B, SHIKOH UV-7620EA, SHIKOH UV-7630B, SHIKOH UV-7640B, SHIKOH UV-6630B, SHIKOH UV-7000B, SHIKOH UV-7510B, SHIKOH UV-7461TE, SHIKOH UV-3000B, SHIKOH UV-3200B, SHIKOH UV-3210EA, SHIKOH UV-3310EA, SHIKOH UV-3310B, SHIKOH UV-3500BA, SHIKOH UV-3520TL, SHIKOH UV-3700B, SHIKOH UV-6100B, SHIKOH UV-6640B, SHIKOH UV-2000B, SHIKOH UV-2010B, SHIKOH UV-2250EA, and SHIKOH UV-2750B (manufactured by NIPPON GOHSEI), UL-503LN (manufactured by KYOEISHA CHEMICAL Co., LTD.), UNIDIC 17-806, UNIDIC 17-813, UNIDIC V-4030, and UNIDIC V-4000BA (manufactured by DIC Corporation). EB-1290K, EB-220, EB-5129, EB-1830, and EB-4358 (manufactured by Daicel-UCB Company, Ltd.), HICORP AU-2010 and HICORP AU-2020 (manufactured by TOKUSHIKI Co., Ltd.), ARONIX M-1960 (manufactured by TOAGOSEI CO., LTD.), ART RESIN UN-3320HA, UN-3320HC, UN-3320HS, UN-904, and HDP-4T, polyester compounds having 3 or more functional groups such as ARONIX M-8100, M-8030, and M-9050 (manufactured by TOAGOSEI CO., LTD.) and KBM-8307 (manufactured by Daicel SciTech), and the like.

b) Component may be constituted with a single compound, or a plurality of compounds can be used as b) component by being combined with each other.

In a case where the total solid content of the hardcoat layer is regarded as being 100% by mass, the content of the structure derived from b) is 25% to 80% by mass. In a case where the total solid content of the composition for forming a hardcoat layer in the present invention is regarded as being 100% by mass, the content of b) component is 25% to 80% by mass. In a case where the content of the structure derived from b) or b) component with respect to the hardcoat layer or the composition for forming a hardcoat layer is equal to or greater than 20% by mass, sufficient hardness can be obtained. In contrast, in a case where the content of the structure derived front b) or b) component with respect to the hardcoat layer or the composition for forming a hardcoat layer is equal to or less than 80% by mass, the content of the structure derived from a) or a) component is reduced, and accordingly, smoothness becomes sufficient.

In a case where the total solid content of the hardcoat layer is regarded as being 100% by mass, the content of the structure derived from b) is preferably 40% to 75% by mass, and more preferably 60% to 75% by mass. In a case where the total solid content of fee composition for forming a hardcoat layer in the present invention is regarded as being 100% by mass, the content of b) component is preferably 40% to 75% by mass, and more preferably 60% to 75% by mass.

(Other Curable Compounds)

The composition for forming a hardcoat layer may contain curable compounds other than a) component or b) component (hereinafter, referred to as other curable compounds as well). As other curable compounds, it is possible to use various compounds having a polymerizable group which can be cured (polymerized) by a curing treatment. Examples of the polymerizable group include a polymerizable group which can cause a polymerization reaction by being irradiated with light, electron beams, or radiation, and a polymerizable group which can cause a polymerization reaction by heating. As the polymerizable group, a photopolymerizable group is preferable. The aforementioned other curable compounds can be monomers, oligomers, prepolymers, and the like.

Specific examples of the aforementioned polymerizable group include polymerizable unsaturated groups such as a (meth)acryloyl group, a vinyl group, a styryl group, and an allyl group or ring opening polymerization-type polymerizable group such as an epoxy group. Among these, from the viewpoint of curing properties and the like, a (meth)acryloyl group is preferable.

Specific examples of other curable compounds contained in the composition for forming a hardcoat layer include the following compounds: (methlacrylic acid diesters of alkylene glycol such as neopentyl glycol acrylate, 1,6-hexanediol (meth)acrylate, propylene glycol di(meth)acrylate; (meth)acrylic acid diesters of polyoxyalkylene glycol such as triethetylene glycol di(meth)acrylate, dipropylene glycol di(meth)acrylate, polyethylene glycol di(meth)acrylate, and polypropylene glycol di(meth)acrylate; (meth)acrylic acid diesters of polyhydric alcohol such as pentacrythritol di(meth)acrylate; (meth)acrylic acid diesters of an ethylene oxide adduct or propylene oxide adduct such as 2,2-bis{4-(acryloxy.diethoxy)phenyl}propane and 2,2-bis{4-(acryloxy.polypropoxy)phenyl}propane; urethane (meth)acrylates; polyester (meth)acrylates; isocyanuric acid acrylates; and epoxy (meth)acrylates.

Examples of the urethane (meth)acrylate include urethane (meth)acrylate obtained in a manner in which an alcohol, a polyol, and/or a hydroxyl group-containing compound such as hydroxyl group-containing acrylate are reacted with an isocyanate, and then, if necessary, a polyurethane compound obtained by the reaction is esterified using (meth)acrylic acid. Specific examples of the urethane (meth)acrylate include various commercially available products exemplified in paragraph [0017] in JP2007-256844A.

From the viewpoint of suppressing shrinkage resulting from curing, the composition for forming a hardcoat layer can contain, as other curable compounds, an epoxy-based compound having an epoxy group as a polymerizable group. As the epoxy-based compound, a polyfunctional epoxy-based compound containing two or more epoxy groups in one molecule is preferable. Specific examples thereof include the epoxy-based compounds described in JP2004-264563A, JP2004-264564A, JP2005-37737A, JP2005-37738A, JP2005-140862A, JP2005-140863A, and JP2002-322430A. Furthermore, it is preferable to use a compound such as glycidyl (meth)acrylate containing both of an epoxy group and an acryl-based polymerizable group.

From the viewpoint of hardness of the hardcoat film, in a case where the total solid content of the composition for forming a hardcoat layer is regarded as being 100% by mass, the content of other curable compounds with respect to the total amount of solid content of the composition for forming a hardcoat layer is preferably equal to or less than 15% by mass, more preferably equal to or less than 10% by mass, particularly preferably equal to or less than 1% by mass, more particularly preferably equal to or less than 0.01% by mass. It is even more particularly preferable that the composition practically does not contain other curable compounds.

[c) Radical Polymerization Initiator]

In the hardcoat film of the present invention, in a case where the total solid content of the hardcoat layer is regarded as being 100% by mass, the hardcoat layer contains the following c) in an amount of 0.1% to 10% by mass.

c) Radical polymerization initiator c) Radical polymerization initiator contained in the hardcoat layer or the composition for forming a hardcoat layer in the present invention will be described. c) Radical polymerization initiator will be referred to as "c) component" as well.

The compound having an ethylenically unsaturated group can be polymerized by irradiation of ionizing radiation or heating in the presence of a photoradical polymerization initiator or a thermal radical polymerization initiator. As the photopolymerization initiator and the thermal polymerization initiator, commercially available compounds can be used. The compounds are described in "The Latest UV Curing Technology" (p. 159, publisher; Kazuhiro Takausu, publishing company; TECHNICAL INFORMATION INSTITUTE CO., LTD., 1991) or a catalog from BASF SE.

As c) component, specifically, it is possible to use alkylphenone-based photopolymerization initiators (Irgacure 651, Irgacure 184, DAROCURE 1173, Irgacure 2959, Irgacure 127, DAROCURE MBF, Irgacure 907, Irgacure 369, and Irgacure 379EG), acrylphosphine oxide-based photopolymerization initiators (Irgacure 819 and LUCIRIN TPO), others (Irgacure 784, Irgacure OXE01, Irgacure OXE02, and Irgacure 754), and the like.

In a case where the total solid content of the hardcoat layer or the composition for forming a hardcoat layer in the present invention is regarded as being 100% by mass, the amount of c) component added is within a range of 0.1% to 10% by mass, preferably 1% to 5% by mass, and more preferably 2% to 4% by mass. In a case where the total solid content of the hardcoat layer or the composition for forming a hardcoat layer is regarded as being 100% by mass, if the amount of c) component added is equal to or greater than 0.1% by mass, the compound is sufficiently polymerized, and the pencil hardness of the hardcoat layer can be improved. In contrast, in a case where the total solid content of the hardcoat layer or the composition for forming a hardcoat layer is regarded as being 100% by mass, if the amount of c) component added is equal to or less than 10% by mass, UV rays reaches the inside of the film, and the pencil hardness of the hardcoat layer can be improved. One kind of c) radical polymerization initiator may be used singly, or plural kinds thereof can be used in combination.

[d) Cationic Polymerization Initiator]

In the hardcoat film of the present invention, in a case where the total solid content of the hardcoat layer is regarded as being 100% by mass, the hardcoat layer contains the following d) in an amount of 0.1% to 10% by mass.

d) Cationic polymerization initiator d) Cationic polymerization initiator contained in the hardcoat layer and the composition for forming a hardcoat layer in the present invention will be described, d) Cationic polymerization initiator will be referred to as "d) component" as well.

Examples of d) component include known compounds such as a photoinitiator of photo-cationic polymerization, a photo-decoloring agent of coloring agents, a photo-color changing agent, a known acid generator used in micro resist, a mixture of these, and the like.

Examples of d) component include an onium compound, an organic halogen compound, and a disulfone compound. Specific examples of the organic halogen compound and the disulfone compound include the same compounds as described above as the compounds generating a radical.

Examples of the onium compound include a diazonium salt, an ammonium salt, an iminium salt, a phosphonium salt, an iodonium salt, a sulfonium salt, an arsonium salt, a selenonium salt, and the like. Examples of these include the compounds described in paragraphs [0058] and [0059] in JP2002-29162A.

In the present invention, examples of particularly suitably used cationic polymerization initiator include an onium salt. In view of optical sensitivity of the photopolymerization initiator, the material stability of the compound, and the like, a diazonium salt, an iodonium salt, a sulfonium salt, and an iminium salt are preferable. Among these, from the viewpoint of light fastness, an iodonium salt is most preferable.

In the present invention, specific examples of onium salts which can be suitably used include the aminated sulfonium sail described in paragraph [0035] in JP1997-268205A (JP-H09-268205A), the diaryl iodonium salt or the triaryl sulfonium salt described in paragraphs [0010] and [0011] in JP2000-71366A, the sulfonium salt of thiobenzoic acid S-phenyl ester described in paragraph [0017] in JP2001-288205A, the onium salt described in paragraphs [0030] to [0033] in JP2001-133696A, and the like.

Examples of d) component also include compounds such as the organic metal/organic halide described in paragraphs [0059] to [0062] in JP2002-29162A, a photoacid generator having an ortho-nitrobenzyl type protecting group, and a compound (such as iminosulfonate) generating a sulfonic acid by being optically decomposed.

As specific compounds of the iodonium salt-based cationic polymerization initiator it is possible to use B2380 (manufactured by TOKYO CHEMICAL INDUSTRY CO., LTD.), BBI-102 (manufactured by Midori Kagaku Co., Ltd.), WPI-113 (manufactured by Wako Pure Chemical Industries, Ltd.), WPI-124 (manufactured by Wako Pure Chemical Industries, Ltd.), WPI-169 (manufactured by Wako Pure Chemical Industries, Ltd.), WPI-170 (manufactured by Wako Pure Chemical Industries, Ltd.), and DTBPI-PFBS (manufactured by Toyo Gosei Co., Ltd).

Preferred examples of the iodonium salt-based cationic polymerization initiator also include the following compounds FK-1 and FK-2.

Photo-cationic polymerization initiator (iodonium salt compound) FK-1

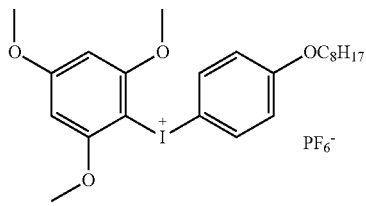

Photo-cationic polymerization initiator (iodonium salt compound) FK-2

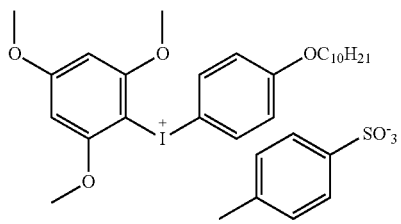

Only one kind of d) component may be used, or two or more kinds of d) components nay be used in combination.

In a case where the total solid content of the hardcoat layer or the composition for brining a hardcoat layer in the present invention is regarded as being 100% by mass, d) component is added in a proportion within a range of 0.1% to 10% by mass, and preferably in a proportion of 0.5% to 3.0% by mass. In view of the stability of the curable composition, the polymerization reactivity, and the likes the amount of d) component added is preferably within the above range.

[e] Inorganic Particles Reactive with Epoxy Group or Ethylenically Unsaturated Double Bond Group]

It is preferable that e) inorganic particles reactive with an epoxy group or an ethylenically unsaturated double bond group are added to the hardcoat layer or the composition for forming a hardcoat layer in the present invention, e) Inorganic particles reactive with an epoxy group or an ethylenically unsaturated double bond group wilt be referred to as e) component as well.

The addition of the inorganic particles makes it possible to reduce the amount of shrinkage of the hardcoat layer (cured layer) resulting from curing, and accordingly, smoothness can be improved. Furthermore, the use of the inorganic particles reactive with an epoxy group or an ethylenically unsaturated double bond group makes it possible to improve pencil hardness. Examples of the inorganic particles include silica particles, titanium dioxide particles, zirconium oxide particles, aluminum oxide particles, and the like. Among these, silica particles are preferred as e) inorganic particles reactive with an epoxy group or an ethylenically unsaturated double bond group.

Generally, inorganic particles have low affinity with organic components such as a polyfunctional vinyl monomer. Therefore, simply by mixing the inorganic particles with the composition, in some cases, aggregates are formed or the hardcoat layer obtained after curing easily cracks. Therefore, in order to enhance the affinity of the inorganic particles as e) component with organic components, it is preferable to treat the surface of the inorganic particles with a surface modifier containing an organic segment.

As the surface modifier, the compounds are preferable which have, in the same molecule, a functional group being able to form a bond with the inorganic particles or to be adsorbed onto the inorganic particles and a functional group having high affinity with organic components. As the surface modifier having a functional group being able to be bonded to or adsorbed onto the inorganic particles, a surface modifier of metal alkoxide such as silane, aluminum, titanium, or zirconium or a surface modifier having an anionic group such as a phosphoric acid group, a sulfuric acid group, a sulfonic acid group, or a carboxylic acid group is preferable. The functional group having high affinity with organic components may be simply obtained by combining an organic component with hydrophilicity and hydrophobicity. However, as the functional group, a functional group which can be chemically bonded to organic components is preferable, and an ethylenically unsaturated double bond group or a ring-opening polymerizable group is particularly preferable.

In the present invention, the preferred surface modifier for the inorganic particles is a curable resin which has a metal alkoxide, an anionic group and an ethylenically unsaturated double bond group, or a ring-opening polymerizable group in the same molecule. By chemically bonding the functional group with organic components, the cross-linking density of the hardcoat layer is improved, and pencil hardness can be improved.

Typical examples of these surface modifiers include a coupling agent containing an unsaturated double bond, an organic curable resin containing a phosphoric acid group, an organic curable resin containing a sulfuric acid group, an organic curable resin containing a carboxylic acid group, and the like shown below.

$$H_2C=C(X)COOC_3H_6Si(OCH)_3 \quad\quad S-1$$

$$H_2C=C(X)COOC_2H_4OTi(OC_2H_5)_3 \quad\quad S-2$$

$H_2C=C(X)COOC_2H_4OCOC_5H_{10}OPO(OH)_2$  S-3

$(H_2C=C(X)COOC_2H_4OCOC_5H_{10}O)_2POOH$  S-4

$H_2C=C(X)COOC_2H_4OSO_3H$  S-5

$H_2C=C(X)COO(C_5H_{10}COO)_2H$  S-6

$H_2C=C(X)COOC_5H_{10}COOH$  S-7

$CH_2CH(O)CH_2OC_3H_6Si(OCH_3)_3$  S-8

(X represents a hydrogen atom or $CH_3$)

The surface modification of the inorganic particles is preferably performed in a solution. The surface modification may be performed by a method in which the inorganic particles are finely dispersed in a mechanical manner under the presence of a surface modifier, a method in which the inorganic particles are finely dispersed, a surface modifier is then added thereto, and the inorganic particles are stirred, or a method in which the surface modification is performed before the inorganic particles are finely dispersed (if necessary, after the inorganic panicles are warmed up and dried, heating or pH modification is performed) and then the inorganic particles are finely dispersed. The solution for dissolving the surface modifier is preferably an organic solvent having high polarity. Specific examples thereof include known solvents such as an alcohol, a ketone, and an ester.

In a case where the total solid content of the hardcoat layer or the composition for forming a hardcoat layer in the present invention is regarded as being 100% by mass, considering the balance between the hardness and brittleness of the coating film, the amount of e) component added is preferably 5% to 40% by mass, and more preferably 10% to 30% by mass.

The size (average primary particle size) of the inorganic particles is preferably 10 nm to 100 nm, and more preferably 10 to 60 nm. The average particle size of the panicles can be determined from an electron micrograph. In a case where the particle size of the inorganic particles is equal to or greater than the lower limit, a hardness improving effect is obtained, and in a case where the particle size is equal to or less than the upper limit, an increase in haze can be inhibited.

The inorganic particles may have a spherical shape or a non-spherical shape. From the viewpoint of imparting hardness, non-spherical particles in which 2 to 10 inorganic particles are linked to each other are preferable. Presumably, by using the inorganic particles in which several particles are linked in the form of a chain, a strong network structure of particles may be formed, and hardness may be improved.

Specific examples of the inorganic particles include ELECOM V-8802 (spherical silica particles having an average primary particle size of 12 nm manufactured by JGC CORPORATION), ELECOM V-8803 (silica particles of irregular shapes manufactured by JGC CORPORATION), MiBK-SD (spherical silica particles having an average primary particle size of 10 to 20 nm manufactured by NISSAN CHEMICAL INDUSTRIES. LTD.), MEK-AC-2140Z (spherical silica particles having an average primary particle size of 10 to 20 nm manufactured by NISSAN CHEMICAL INDUSTRIES. LTD.), MEK-AC-4130 (spherical silica particles having an average primary particle size of 40 to 50 nm manufactured by NISSAN CHEMICAL INDUSTRIES, LTD.), MiBK-SD-L (spherical silica particles having an average primary particle size of 40 to 50 nm manufactured by NISSAN CHEMICAL INDUSTRIES, LTD.), MEK-AC-5140Z (spherical silica particles having an average primary particle size of 70 to 100 nm manufactured by NISSAN CHEMICAL INDUSTRIES, LTD.), and the like. Among these, from the viewpoint of imparting surface hardness, ELECOM V-8803 having irregular shapes is preferable.

[f) Polyester Urethane]

From the viewpoint of improving brittleness, it is preferable that the hardcoat layer or the composition for forming a hardcoat layer in the present invention contains f) polyester urethane, f) Polyester urethane wall be referred to as F) component as well.

The polyester urethane is a polymer having an ester bond and a urethane bond (—O—CO—NH—) in one molecule.

As f) polyester urethane, polyester urethane having a tensile strength equal to or higher than 25 MPa and a tensile elongation equal to or higher than 200% is preferable. The polyester urethane having a tensile strength equal to or higher than 25 MPa and a tensile elongation equal to or higher than 200% is considered to be able to contribute to the improvement of hardness of the hardcoat layer and to the impartation of appropriate flexibility. The inventors of the present invention assume that these properties of the polyester urethane may contribute to the improvement of hardness and brittleness of the hardcoat layer.

In a case where the content of the polyester urethane is equal to or greater than 1 part by mass with respect to the total amount of 100 parts by mass of the solid content of the hardcoat layer or the composition for forming a hardcoat layer, the aforementioned effects obtained by the addition of the polyester urethane can be sufficiently obtained. In a case where the content of the polyester urethane is equal to or less than 10 parts by mass, the hardness of the cured layer can be maintained. Accordingly, the content of the polyester urethane with respect to the total amount of 100 parts by mass of the solid content of the hardcoat layer or the composition for forming a hardcoat layer is set to be within a range of 1 to 10 parts by mass. From the viewpoint of improving brittleness and inhibiting a decrease in transparency, the content of the polyester urethane is more preferably equal to or greater than 2 parts by mass. From the viewpoint of maintaining the hardness of the hardcoat layer, the content of the polyester urethane is more preferably equal to or less than 8 parts by mass.

By using the polyester urethane having the aforementioned tensile strength and tensile elongation, appropriate flexibility is imparted to the hardcoat layer, and this makes a contribution to simultaneously improving both of hardness and brittleness. The tensile strength is more preferably equal to or higher than 40 MPa, and even more preferably equal to or higher than 50 MPa. The tensile strength is preferably equal to or lower than 70 MPa, because then the polyester urethane becomes stably compatible with the composition for forming a hardcoat layer. The tensile elongation is preferably equal to or higher than 450%, and more preferably equal to or higher than 600%. From the viewpoint of securing pencil hardness which is one of the indices of film hardness, the tensile elongation is preferably equal to or lower than 1,000%. The method for measuring pencil hardness will be described later in examples. The tensile strength and the tensile elongation of the polyester urethane are values measured according to JIS K 6251 by using a tensile strength tester.

The polyester urethane can be obtained by polymerizing monomer components including at least a diol, dicarboxylic acid, and diisocyanate. These 3 kinds of monomers preferably have a structure in which a hydroxyl group (—OH), a carboxyl group (—COOH), and an isocyanate group (—NCO) are bonded to each of both terminals of a hydrocarbon group having an unbranched structure.

The hydrocarbon group having an unbranched structure is preferably an alkylene group, an alkenylene group, an alkynylene group, an arylene group, or a combination of these.

It is preferable that the alkylene group, the alkenylene group, and the alkynylene group have a linear structure.

In a case where the aforementioned hydrocarbon group is an alkylene group, air alkenylene group, or an alkynylene group, the number of carbon atoms in the hydrocarbon group is preferably 1 to 8, more preferably 2 to 6, and even more preferably 2 to 4.

The arylene group may have an alkyl group having 1 to 8 carbon atoms as a substituent.

The arylene group is preferably a phenylene group or a naphthylene group, more preferably a phenylene group, and even more preferably a para-phenylene group.

The hydrocarbon group is particularly preferably the aforementioned alkylene group, the aforementioned arylene group, or a combination of these.

As the diol used as a monomer of the polyester urethane, ethylene glycol, 1,3-propanediol, 1,4-butanediol, neopentyl glycol, 1,6-hexanediol, 1,4-cyclohexanedimethanol, and 1,5-pentanediol are preferable.

As the dicarboxylic acid, terephthalic acid, isophthalic acid, naphthalenedicarboxylic acid, 1,4-cyclohexanedicarboxylic acid, succinic acid, glutaric acid, adipic acid, oxalic acid, and malonic acid are preferable.

As the diisocyanate, ethylene diisocyanate, trimethylene diisocyanate, tetramethylene diisocyanate, hexamethylene diisocyanate, meta-xylylene diisocyanate, para-phenylene diisocyanate, tolylene diisocyanate, 4,4'-diphenylmethane diisocyanate, and 1,5-naphthalene diisocyanate are preferable.

From the viewpoint of the affinity with a granular filler, the number-average molecular weight (Mn) of the polyester urethane is preferably equal to or greater than 5,000, and more preferably equal to or greater than 10,000. From the viewpoint of compatibility with the curable compound, the number-average molecular weight is preferably equal to or less than 50,000.

In an aspect, the polyester urethane may have a reactive group. The reactive group is preferably a polymerizable unsaturated group. Specific examples thereof are as described above for the reactive group that the granular filler can have.

As the polyester urethane described so far, those synthesized by a known methods or commercially available products may be used. Examples of the commercially available products include a VYLON (registered trademark) series (trade name) manufactured by Toyobo Co., Ltd. and the like. It is possible to preferably use VYLON UR-2300, VYLON UR-3200, VYLON UR-3210, VYLON UR-3260, VYLON UR-5537, 300 VYLON UR-8300, VYLON UR-8700, and the like.

[g) Antifoulant]

It is preferable that the hardcoat layer or the composition for forming a hardcoat layer in the present invention contains g) antifoulant, because then the adhesion of finger print or contaminant is suppressed, the contaminant that has adhered can be wiped off in a simple way, and scratch resistance can be improved by enhancing lubricating properties of the surface of the hardcoat layer, g) Antifoulant will be referred to as g) component as well.

In the hardcoat film of the present invention, g) antifoulant preferably contains a fluorine-containing compound, the fluorine-containing compound preferably has a perfluoropolyether group and polymerizable unsaturated groups, and the antifoulant has a plurality of polymerizable unsaturated groups in one molecule.

g) Antifoulant which can be used in the present invention will be described.

[Fluorine-Containing Compound Having Polymerizable Unsaturated Group]

Hereinafter, a case will be described in which g) antifoulant is a compound (hereinafter, referred to as "fluorine-containing antifoulant" as well) containing a fluorine-containing compound, the fluorine-containing compound has a perfluoropolyether group and polymerizable unsaturated groups, and the fluorine-containing compound has a plurality of polymerizable unsaturated groups in one molecule.

The fluorine-containing antifoulant is preferably a fluorine-based compound containing a structure represented by the following Formula (F).

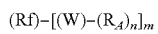   Formula (F):

(In the formula, Rf represents a (per)fluoroalkyl group or a (per)fluoroether group, W represents a linking group, $R_A$ represents a polymerizable unsaturated group, n represents an integer of 1 to 3, and m represents an integer of 1 to 3.)

It is considered that the fluorine-containing antifoulant brings about the following effects (1) to (3) by having the polymerizable unsaturated groups.

(1) It is considered that, because the solubility of the antifoulant in an organic solvent and the compatibility of the antifoulant with a compound having an unsaturated double bond are improved, the antifoulant can be evenly localized on the surface of the hardcoat layer without forming an aggregate. Furthermore, it is possible to prevent the occurrence of defect resulting from the aggregate.

(2) Even if the fluorine-containing antifoulant is localized on the surface of the hardcoat layer, through a photopolymerization reaction, a covalent bond can be formed between the molecules of the fluorine-containing antifoulant or between the fluorine-containing antifoulant and a compound having an unsaturated double bond. Therefore, it is possible to prevent the antifoulant from being peeled off due to friction and to prevent deterioration of antifouling properties.

(3) It is possible to prevent the loss of antifouling properties or the deterioration of the external appearance that is caused by the bleed-out and precipitation of the antifoulant.

In Formula (F), $R_A$ represents a polymerizable unsaturated group. The polymerizable unsaturated group is not particularly limited as long as it is a group which can cause a radical polymerization reaction by being irradiated with active energy rays such as ultraviolet rays or electron beams. Examples of the polymerizable unsaturated group include a (meth)acryloyl group, a (meth)acryloyloxy group, a vinyl group, an allyl group, and the like. As the polymerizable unsaturated group, a (meth)acryloyl group, a (meth)acryloyloxy group, and a group obtained when any hydrogen atom in these groups is substituted with a fluorine atom are preferably used.

As specific examples of the polymerizable unsaturated group, the following groups are preferable.

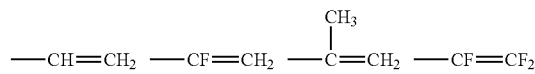

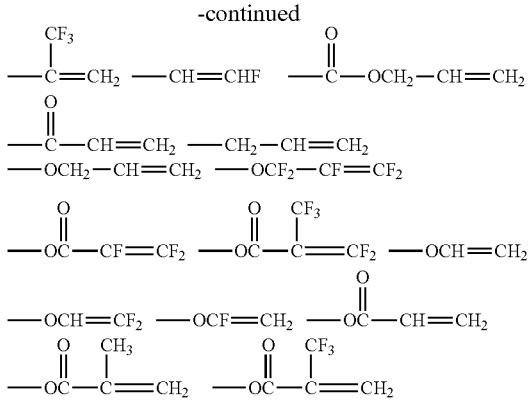

In Formula (F), Rf represents a (per)fluoroalkyl group or a (per)fluoropolyether group.

Herein, the (per)fluoroalkyl group represents at least one kind of group between a fluoroalkyl group and a perfluoroalkyl group, and the (per)fluoropolyether group represents at least one kind of group between a fluoropolyether group and a perfluoropolyether group. From the viewpoint of antifouling properties, it is preferable that a fluorine content rate in Rf is high.

The (per)fluoroalkyl group is preferably a group having 1 to 20 carbon atoms, and more preferably a group having 1 to 10 carbon atoms.

The (per)fluoroalkyl group may have a linear structure (such as $-CF_2CF_3-$, $-CF_2(CF_2)_4H$, $-CH_2(CF_2)_8CF_3$, or $-CH_2CH_2(CF_2)_4H$), a branched structure (such as $CH(CF_3)_2$, $CH_2CF(CF_3)_2$, $CH(CH_3)CF_2CF_3$, or $CH(CH_3)(CF_2)_5 CF_2H$), or an alicyclic structure (preferably a 5- or 6-membered ring, such as a perfluorocyclohexyl group, a perfluorocyclopentyl group, or an alkyl group substituted with these).

The (per)fluoropolyether group refers to a (per)fluoroalkyl group having an ether bond, and may be a monovalent group or a group having a valency equal to or higher than 2. Examples of the fluoropolyether group include $-CH_2OCH_2CF_2CF_3$, $-CH_2CH_2OCH_2C_4F_8H$, $CH_2CH_2OCH_2CH_2C_8F_{17}$, $CH_2CH_2OCF_2CF_2OCF_2CF_2H$, a fluorocycloalkyl group having 4 to 20 carbon atoms with 4 or more fluorine atoms. Examples of the perfluoropolyether group include $-(CF_2O)_p-(CF_2CF_2O)_q-$, $-[CF(CF_3)CF_2O]_p-[CF_2(CF_3)]-$, $-(CF_2CF_2CF_2O)_p-$, $-(CF_2CF_2O)_p-$, and the like.

p plus q preferably equals 1 to 83 in total, more preferably 1 to 43 in total, and most preferably 5 to 23 in total.

From the viewpoint of excellent antifouling properties, the fluorine-containing antifoulant particularly preferably has a perfluoropolyether group represented by $-(CF_2O)_p-(CF_2CF_2O)_q-$, p and q each independently represent an integer of 0 to 20. Here, p+q equals an integer equal to or greater than 1.

It is preferable that the fluorine-containing antifoulant has a perfluoropolyether group and has a plurality of polymerizable unsaturated groups in one molecule, because then the effects (1) to (3) are more markedly exhibited.

In Formula (F), W represents a linking group. Examples of W include an alkylene group, an arylene group, a heteroalkylene group, or a linking group obtained by combining these. These linking groups may additionally have an oxy group, a carbonyl group, a carbonyloxy group, a carbonylimino group, a sulfonamide group, or a functional group obtained by combining these.

W is preferably an ethylene group, more preferably an ethylene group bonded to a carbonylimino group.

The product of n and m (n×m) in Formula (F) is preferably equal to or greater than 2 and more preferably equal to or greater than 4, because then the effects (1) to (3) are more markedly exhibited.

In a case where n and m in Formula (F) simultaneously represent 1, specific examples of the following preferred aspects include Formulae (F-1) to (F-3) described below.

Formula (F-1): $Rf^2(CF_2CF_2)_pR'^2CH_2CH_2R^2OCOCR^1=CH_2$ (In the formula, $Rf^2$ represents any one of a fluorine atom and a fluoroalkyl group having 1 to 10 carbon atoms, $R^1$ represents a hydrogen atom or a methyl group, $R^2$ represents a single bond or an alkylene group, $R'^2$ represents a single bond or a divalent linking group, p represents an integer showing a degree of polymerization, and the degree of polymerization p is equal to or higher than k (k is an integer equal to or greater than 3).)

In a case where $R'^2$ represents a divalent linking group, examples of the divalent linking group include the same groups as represented by W described above.

Examples of a fluorine atom-containing telomere-type acrylate represented by Formula (F-1) include alkyl ester derivatives in which (meth)acrylic acid is partially or completely flourinated.

Specific examples of the compound represented by Formula (F-1) will be shown below, but the present invention is not limited thereto.

a-5
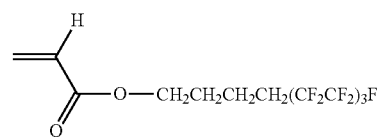

a-6
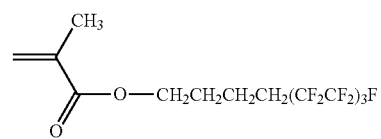

a-9
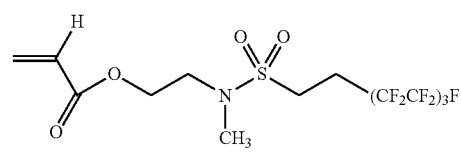

a-10
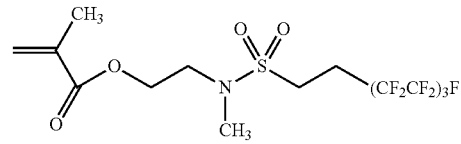

In a case where telomerization is used at the time of synthesizing the compound represented by Formula (F-1), depending on the telomerization condition, the reaction mixture separation condition, and the like, in some cases, the compound includes a plurality of fluorine-containing (meth) acrylic acid esters in which p of a group $Rf^2(CF_2CF_2)_p R'^2CH_2CH_2R^2O-$ represented by Formula (F-1) is k, k+1, k+2, and the like.

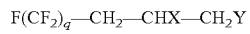

Formula (F-2): $F(CF_2)_q-CH_2-CHX-CH_2Y$ (In the formula, q represents an integer of 1 to 20, X and Y each independently represent any one of a (meth)acryloyloxy group and a hydroxyl group, and at least one of X and Y is a (meth)acryloyloxy group.)

The fluorine-containing (meth)acrylic acid ester represented by Formula (F-2) has a fluoroalkyl group having 1 to 20 carbon atoms that contains a trifluoromethyl group ($CF_3$—) on the terminal. The trifluoromethyl group is effectively aligned on the surface of the hardcoat layer even if the amount of the fluorine-containing (meth)acrylic acid ester is small.

In view of antifouling properties and case of manufacturing, q is preferably 6 to 20, and more preferably 8 to 10. The water repellency and oil repellency of the fluorine-containing (meth)acrylic acid ester having a fluoroalkyl group having 8 to 10 carbon atoms are better than the water repellency and oil repellency of fluorine-containing (meth)acrylic acid esters having a fluoroalkyl group having a different chain length. Therefore, the fluorine-containing (meth)acrylic acid ester having a fluoroalkyl group having 8 to 10 carbon atoms is excellent in antifouling properties.

Specific examples of the fluorine-containing (meth)acrylic acid ester represented by Formula (F-2) include 1-(meth)acryloyloxy-2-hydroxy-4,4,5,5,6,6,7,7,8,8,9,9,10,10,11,11,12,12,13,13-heneicosafluorotridecane, 2-(meth)acryloyloxy-1-hydroxy-4,4,5,5,6,6,7,7,8,8,9,9,10,10,11,11,12,12,13,13-heneicosafluorotridecane, and 1,2-bis(meth)acryloyloxy-4,4,5,5,6,6,7,7,8,8,9,9,10,10,11,11,12,12,13,13-heneicosafluorotridecane, and the like. In the present invention, 1-acryloyloxy-2-hydroxy-4,4,5,5,6,6,7,7,8,8,9,9,10,10,11,11,12,12,13,13-heneicosafluorotridecane is preferable.

$$F(CF_2)_rO(CF_2CF_2O)_8CF_2CH_2OCOCR^3{=}CH_2 \quad \text{Formula (F-3)}:$$

(In the formula, $R^3$ represents a hydrogen atom or a methyl group, s represents an integer of 1 to 20, and r represents an integer of 1 to 4.)

The fluorine atom-containing mono functional (meth)acrylate represented by Formula (F-3) can be obtained by reacting a fluorine atom-containing alcohol compound represented by the following Formula (FG-3) with a (meth)acrylic acid halide.

$$F(CF_2)_rO(CF_2CF_2O)_sCF_2CH_2OH \quad \text{Formula (FG-3)}:$$

(In Formula (FG-3), s represents an integer of 1 to 20, and r represents an integer of 1 to 4.)

Specific examples of the fluorine atom-containing alcohol compound represented by Formula (FG-3) include) 1H,1H-perfluoro-3,6-dioxaheptan-1-ol, 1H,1H-perfluoro-3,6-dioxaoctan-1-ol, 1H,1H-perfluoro-3,6-dioxadecan-1-ol, 1H,1H-perfluoro-3,6,9-trioxadecan-1-ol, 1H,1H-perfluoro-3,6,9-trioxaundecan-1-ol, 1H,1H-perfluoro-3,6,9-trioxatridecan-1-ol, 1H,1H-perfluoro-3,6,9,12-tetraoxatridecan-1-ol 1H,1H-perfluoro-3,6,9,12-tetraoxatetradecan-1-ol, 1H,1H-perfluoro-3,6,9,12-tetraoxahexadecan-1-ol, 1H,1H-perfluoro-3,6,9,12,15-pentaoxahexadecan-1-ol, 1H,1H-perfluoro-3,6,9,12,15-pentaoxaheptadecan-1-ol, 1H,1H-perfluoro-3,6,9,12,15-pentaoxanonadecan-1-ol, 1H,1H-perfluoro-3,6,9,12,15,18-hexaoxaeicosan-1-ol, 1H,1H-perfluoro-3,6,9,12,15,18-hexaoxadocosan-1-ol, 1H,1H-perfluoro-3,6,9,12,15,18,21-heptaoxatricosan-1-ol, 1H,1H-perfluoro-3,6,9,12,15,18,21-heptaoxapentacosan-1-ol, and the like.

These can be obtained from the market, and specific examples thereof include 1H,1H-perfluoro-3,6-dioxaheptan-1-ol (trade name: "C5GOL" manufactured by Exfluor Research Corporation), 1H,1H-perfluoro-3,6,9-trioxadecan-1-ol (trade name: "C7GOL", manufactured by Exfluor Research Corporation), 1H,1H-perfluoro-3,6-dioxadecan-1-ol (trade name: "C8GOL", manufactured by Exfluor Research Corporation), 1H,1H-perfluoro-3,6,9-trioxatridecan-1-ol (trade name: "C10GOL", manufactured by Exfluor Research Corporation), 1H,1H-perfluoro-3,6,9,12-tetraoxahexadecan-1-ol (trade name: "C12GOL", manufactured by Exfluor Research Corporation), and the like.

In the present invention, it is preferable to use 1H,1H-perfluoro-3,6,9,12-tetraoxatridecan-1-ol.

Examples of the (meth)acrylic acid halide reacted with the fluorine atom-containing alcohol compound represented by Formula (FG-3) include (meth)acrylic acid fluoride, (meth)acrylic acid chloride, (meth)acrylic acid bromide, and (meth)acrylic acid iodide. Front the viewpoint of case of availability, (meth)acrylic acid chloride is preferable.

Specific examples of compounds preferred as the compound represented by Formula (F-3) will be shown below, but the present invention is not limited thereto. The specific examples of compounds preferred as the compound represented by Formula (F-3) are also described in JP2007-264221 A.

$$F_9C_4OC_2F_4OC_2F_4OCF_2CH_2OCOCH{=}CH_2 \quad (b\text{-}1):$$

$$F_9C_4OC_2F_4OC_2F_4OCF_2CH_2OCOC(CH_3){=}CH_2 \quad (b\text{-}2):$$

In addition to the compound represented by Formula (F-3), a compound represented by the following Formula (F-3)' can be preferably used.

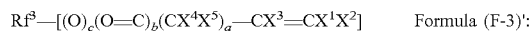

$$Rf^3{-}[(O)_c(O{=}C)_b(CX^4X^5)_a{-}CX^3{=}CX^1X^2] \quad \text{Formula (F-3)}':$$

(In the formula, $X^1$ and $X^2$ each independently represent H or F, $X^3$ represents H, F, $CH_3$, or $CF_3$, $X^4$ and $X^5$ each independently represent H, F, or $CF_3$, a, b, and c each independently represent 0 or 1, and $Rf^3$ represents a fluorine-containing alkyl group containing an ether bond having 18 to 200 carbon atoms.)

The compound represented by Formula (F-3)' is a fluorine-containing unsaturated compound having 6 or more repealing units represented by Formula (FG-3)': —($CX^6_2CF_2CF_2O$)— (in the formula, $X^6$ represents F or H) in the $Rf^3$ group.

Examples of the fluorine-containing polyether compound represented by Formula (F-3)' include (c-1) $Rf^3{-}[(O)(O{=}C)_b{-}CX^3{=}CX^1X^2]$, (c-2) $Rf^3{-}[(O)_c(O{=}C){-}CX^3{=}CX^1X^2]$, (c-3) $Rf^3{-}[(O)_c(O{=}C){-}CF{=}CH_2]$, and the like. As the polymerizable unsaturated group of the above fluorine-containing polyether compound, those having the following structures can be preferably used. The symbols m (c-1) to (c-3) have the same definition as the symbols in Formula (FG-3)'.

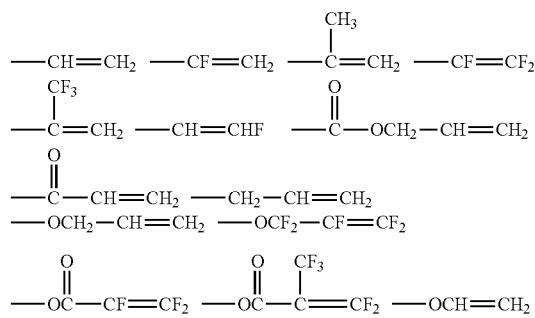

-continued

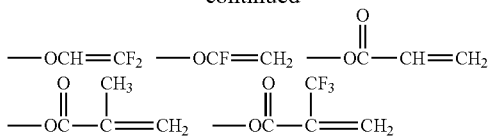

The fluorine-containing polyether compound represented by Formula (F-3)' may have a plurality of polymerizable unsaturated groups, and examples thereof preferably include the following structures.

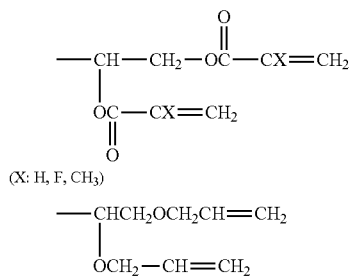

(X: H, F, CH₃)

In the present invention, the compound having a structure represented by —O(C=O)CF=CH₂ is preferable because this compound exhibits particularly high polymerization (curing) reactivity and makes it possible to obtain a cured substance with excellent efficiency.

Regarding the Rf³ group in the fluorine-containing polyether compound represented by Formula (F-3)', it is important for Rf³ to contain 6 or more fluorine-containing polyether chains represented by Formula (FG-3) as repeating units. By adopting this constitution, antifouling properties can be imparted to the hardcoat layer.

More specifically, the compound may be a mixture containing 6 or more fluorine-containing polyether chains as repeating units. In a case where the compound is used in the form of a mixture, the compound is preferably a mixture in which the proportion of a fluorine-containing unsaturated compound having 6 or more polyether chains as repeating units is the highest in a distribution of a fluorine-containing unsaturated compound having less than 6 repeating units and a fluorine-containing unsaturated compound having 6 or more repeating units.

The number of repeating units which are fluorine-containing polyether chains represented by Formula (FG-3)' is preferably equal to or greater than 6, more preferably equal to or greater than 10, even more preferably equal to or greater than 18, and particularly preferably equal to or greater than 20. In a case where the number of repeating units is as described above, not only water repellency but also antifouling properties, particularly, removability of contaminants containing oil components can be improved. Furthermore, gas permeability can be more effectively imparted. The fluorine-containing polyether chain may be on the terminal of the Rf³ group or in the middle of the chain of the Rf³ group.

Specifically, the Rf³ group is preferably a structure represented by Formula (c-4):

$R^4—(CX^6{}_2CF_2CF_2O)_1—(R^5)_e—$ 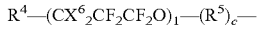

(In the formula, $X^6$ is the same as Formula (FG-3)', $R^4$ represents at least one kind of group selected from a hydrogen atom, a halogen atom, an alkyl group, a fluorine-containing alkyl group, an alkyl group containing an ether bond, and a fluorine-containing alkyl group containing an ether bond, $R_5$ represents an organic group having a valency equal to or higher than 2, t represents an integer of 6 to 66, and e represents 0 or 1.)

That is, the Rf³ group is a fluorine-containing organic group which is bonded to a reactive carbon-carbon double bond through the organic group $R^5$ having a valency equal to or higher than 2 and has $R^4$ on the terminal.

$R^5$ is not limited as long as it is an organic group which enables the fluorine-containing polyether chain represented by Formula (FG-3)' to be bonded to a reactive carbon-carbon double bond. For example, $R_5$ is selected from an alkylene group, a fluorine-containing alkylene group, an alkylene group containing an ether bond, and a fluorine-containing alkylene group containing an ether bond. Among these, in view of transparency and low refractive index, a fluorine-containing alkylene group and a fluorine-containing alkylene group containing an ether bond are preferable.

Specifically, as the fluorine-containing polyether compound represented by Formula (F-3)', for example, the compounds exemplified in the pamphlet of WO2003/022906A and the like are preferably used. In the present invention, $CH_2$=CF—COO—$CH_2CF_2CF_2$—$(OCF_2CF_2CF_2)_7OC_3F_7$ can be particularly preferably used.

In a case where n and m in Formula (F) do not simultaneously represent 1, the following Formulae (F-4) and (F-5) can be exemplified as preferred aspects.

$(Rf^1)—[(W)—(R_4)_n]_m$ 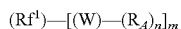 Formula (F-4):

(In Formula (F-4), $Rf^1$ represents a (per)fluoroalkyl group or a (per)fluoropolyether group, W represents a linking group, $R_4$ represents a functional group having an unsaturated double bond, n represents 1 to 3, m represents an integer of 1 to 3, and n and m do not simultaneously represent 1.)

It is preferable to adopt an aspect in which n is 2 or 3 and m is 1 to 3, more preferable to adopt an aspect in which n is 2 or 3 and m is 2 or 3, and most preferable to adopt an aspect in which n is 3 and m is 2 or 3, because then water repellency and oil repellency become excellent and are excellently maintained (antifouling durability).

As $Rf^1$, a group having a valency of 1 to 3 can be used. In a case where $Rf^1$ is monovalent, as a terminal group thereof, $(C_nF_{2n+1})$—, $(C_nF_{2n+1}O)$—, $(XC_nF_{2n}O)$—, or $(XC_nF_{2n+1})$— (in the formula, X represents hydrogen, chlorine, or bromine, and n represents an integer of 1 to 10) is preferable. Specifically, it is possible to preferably use $CF_3O(C_2F_4O)_pCF_2$—, $C_3F_7O(CF_2CF_2CF_2O)_pCF_2CF_2$—, $C_3F_7(CF(CF_3)CF_2O)_pCF(CF_3)$—, $F(CF(CF_3)CF_2O)_pCF(CF_3)$—, and the like.

Herein, the average of p is 0 to 50. The average of p is preferably 3 to 30, more preferably 3 to 20, and most preferably 4 to 15.

In a case where $Rf^1$ is divalent, it is possible to preferably use —$(CF_2O)_q(C_2F_4O)_rCF_2$—, —$(CF_2)_3O(C_4F_8O)_r(CF_2)_3$—, —$CF_2O(C_2F_4O)_rCF_2$—, —$C_2F_4O(CF_3F_6O)_rC_2F_4$—, —$CF(CF_3)(OCF_2CF(CF_3))_sOC_rF_{2r}O(CF(CF_3)CF_2O)_rCF(CF_3)$—, and the like.

Herein, in the formulae, the average of q, r, and s is 0 to 50. The average of q, r, and s is preferably 3 to 30, more preferably 3 to 20, and most preferably 4 to 15. t is an integer of 2 to 6. Specific examples of compounds preferred as the compound represented by Formula (F-4) or the synthesis methods thereof are described in WO2005/113690A.

Hereinafter, $F(CF(CF_3)CF_2O)_pCF(CF_3)$— in which Use average of p is 6 or 7 is described as "HFPO—", and —$(CF(CF_3)CF_2O)_pCF(CF_3)$— in which the average of p is 6 or 7 is described as "—HFPO—". In this way, specific compounds represented by Formula (F-4) will be shown below, but the present invention is not limited thereto.

(d-1): HFPO—CONH—C—(CH$_2$OCOCH=CH$_2$)$_2$CH$_2$CH$_3$ (d-2): HFPO—CONH—C—(CH$_2$OCOCH=CH$_2$)$_2$H (d-3): compound obtained by Michael addition polymerization using HFPO—CONH—C$_3$H$_6$NHCH$_3$ and trimethylolpropane triacrylate at 1:1

(d-4): (CH$_2$=CHCOOCH$_2$)$_2$H—C—CONH—HFPO—CONH—C—(CH$_2$OCOCH=CH$_2$)$_2$H (d-5): (CH$_2$=CHCOOCH$_2$)$_3$—C—CONH—HFPO—CONH—C—(CH$_2$OCOCH=CH$_2$)$_3$

As the compound represented by Formula (F-4), a compound represented by the following Formula (F-5) can also be used.

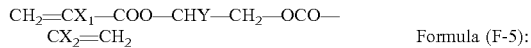

$$CH_2=CX_1-COO-CHY-CH_2-OCO-CX_2=CH_2 \quad \text{Formula (F-5):}$$

(In the formula, X$_1$ and X$_2$ each independently represent a hydrogen atom or a methyl group, and Y represents a fluoroalkyl group having 2 to 20 carbon atoms containing 3 or more fluorine atoms or a fluorocycloalkyl group having 4 to 20 carbon atoms containing 4 or more fluorine atoms.)

In the present invention, the compound containing (meth) acryloyloxy groups as polymerizable unsaturated groups may have a plurality of (meth)acryloyloxy groups. In a case where the fluorine-containing antifoulant contains a plurality of (meth)acryloyloxy groups, when the compound is cured, 3-dimensional network structure is established, the glass transition temperature becomes high, the transferability of the antifoulant becomes low, and the durability of being able to endure the repetitive operation of wiping off contaminants can be improved. Furthermore, it is possible to obtain a cured film having excellent heat resistance and weather fastness.

Specific examples of the compound represented by Formula (F-5) preferably include di(meth)acrylic acid-2,2,2-trifluoroethyl ethylene glycol, di(meth)acrylic acid-2,2,3,3,3-pentafluoropropyl ethylene glycol, di(meth)acrylic acid-2,2,3,3,4,4,4-heptafluorobutyl ethylene glycol, di(meth)acrylic acid-2,2,3,3,4,4,5,5,5-nonafluoropentyl ethylene glycol, di(meth)acrylic acid-2,2,3,3,4,4,5,5,6,6,6-undecafluorohexyl ethylene glycol, di(meth)acrylic acid-2,2,3,3,4,4,5,5,6,6,7,7,7-tridecafluoroheptyl ethylene glycol, di(meth)acrylic acid-2,2,3,3,4,4,5,5,6,6,7,7,8,8,8-pentadecafluorooctyl ethylene glycol, di(meth)acrylic acid-3,3,4,4,5,5,6,6,7,7,8,8,8-tridecafluorooctyl ethylene glycol, di(meth)acrylic acid-2,2,3,3,4,4,5,5,6,6,7,7,8,8,9,9,9,-heptadecafluorononyl ethylene glycol, di(meth)acrylic acid-2,2,3,3,4,4,5,5,6,6,7,7,8,8,9,9,10,10,10-nonadecafluorodecyl ethylene glycol, di(meth)acrylic acid-3,3,4,4,5,5,6,6,7,7,8,8,9,9,10,10,10-heptadecafluorodecyl ethylene glycol, di(meth)acrylic acid-2-trifluoromethyl-3,3,3-trifluoropropyl ethylene glycol, di(meth)acrylic acid-3-trifluoromethyl-4,4,4-trifluorobutyl ethylene glycol, di(meth)acrylic acid-1-methyl-2,2,3,3,3-pentafluoropropyl ethylene glycol, di(meth)acrylic acid-1-methyl-2,2,3,3,4,4,4-heptafluorobutyl ethylene glycol, and the like. One kind of these compounds can be used singly, or a mixture of these compounds can be used. These di(meth)acrylic acid esters can be manufactured by known methods exemplified in JP1994-306326A (JP-H06-306326A). In the present invention, diacrylic acid-2,2,3,3,4,4,5,5,6,6,7,7,8,8,9,9-heptadecafluorononyl ethylene glycol is preferably used.

In the present invention, the compound having a (meth) acryloyloxy group as a polymerizable unsaturated group may be a compound having a plurality of (per)fluoroalkyl groups or (per) fluoropolyether groups in one molecule.

The fluorine-containing antifoulant in the present invention may be any one of a monomer, an oligomer, and a polymer.

It is preferable that the fluorine-containing antifoulant additionally has substituents that contribute to the formation of a bond or compatibility in the film of the hardcoat layer. It is preferable that the fluorine-containing antifoulant has a plurality of substituents, and the substituents may be the same as or different from each other. Examples of preferred substituents include an acryloyl group, a methacryloyl group, a vinyl group, an allyl group, a cinnamoyl group, an epoxy group, an oxetanyl group, a hydroxyl group, a polyoxyalkylene group, a carboxyl group, an amino group, and the like.

The fluorine-containing antifoulant may be a polymer or oligomer with a compound which does not contain a fluorine atom.

The fluorine-containing compound may contain a silicon atom in a molecule, may contain a siloxane structure, or may have a structure other than a siloxane structure. Here, in a case where the fluorine-containing compound having a polymerizable unsaturated group contains a siloxane structure, the weight-average molecular weight of the compound is less than 15,000.

In a case where the fluorine-containing compound contains a siloxane structure, the fluorine-containing compound is preferably represented by the following Formula (F-6).

$$R_a R^f_b R^A_c SiO_{(4-a-b-c)/2} \quad \text{Formula (F-6):}$$

(In the formula, R represents a hydrogen atom, a methyl group, an ethyl group, a propyl group, or a phenyl group, R$^f$ represents an organic group containing a fluorine atom, R$^A$ represents an organic group containing a polymerizable unsaturated group, 0<a, 0<b, 0<c, and a+b+c+<4.)

a is preferably 1 to 1.75, and more preferably 1 to 1.5. In a case where a is equal to or greater than 1, the compound can be easily synthesized in an industrial way. In a case where a is equal to or less than 1.75, curing properties and antifouling properties can be easily accomplished at the same time.

Examples of the polymerizable unsaturated group represented by R$^A$ include the same polymerizable unsaturated group as R$_A$ in Formula (F). R$^A$ is preferably a (meth) acryloyl group, a (meth)acryloyloxy group, and a group obtained when any hydrogen atom in these groups is substituted with a fluorine atom.

In a case where the fluorine-containing compound contains a siloxane structure, examples preferred siloxane structures include those having a substituent on the terminal and/or side chain of a compound containing a plurality of dimethylsilyloxy units as repeating units. The compound chain containing dimethylsilyloxy as a repeating unit, may contain a structural unit other than the dimethylsilyloxy. It is preferable that the compound has a plurality of substituents, and the substituents may be the same as or different from each other. Examples of preferred substituents include groups containing a (meth)acryloyl group, a (meth)acryloyloxy group, a vinyl group, an allyl group, a cinnamoyl group, an epoxy group, an oxetanyl group, a hydroxyl group, a fluoroalkyl group, a polyoxyalkylene group, a carboxyl group, an amino group, and the like. From the viewpoint of inhibiting bleed-out of the antifoulant, a (meth)acryloyloxy group is particularly preferable. From the viewpoint of improving localizing properties of the antifoulant and inhibiting bleed-out of the antifoulant, the number of substituents expressed as a functional group equivalent is preferably 1,500 to 20,000 g·mol$^{-1}$.

R$^f$ is an organic group containing a fluorine atom. R$^f$ is preferably a group represented by C$_x$F$_{2x+1}$(CH$_2$)$_p$— (in the formula, x represents an integer of 1 to 8, and p represents an integer of 2 to 10) or a perfluoropolyether-substituted alkyl group, b is preferably 0.2 to 0.4, and more preferably 0.2 to 0.25. In a case where b is equal to or greater than 0.2, antifouling properties are improved. In a case where b is equal to or less than 0.4, curing properties are improved. R$^f$ is preferably a perfluoroalkyl group having 8 carbon atoms.

R$^A$ is an organic group containing a (meth)acryl group. It is preferable that R$^A$ is bonded to a Si atom through a Si—O—C bond, because then the compound can be easily synthesized in an industrial way. c is preferably 0.4 to 0.8, and more preferably 0.6 to 0.8. In a case where c is equal to or greater than 0.4, curing properties are improved. In a case where c is equal to or less than 0.8, antifouling properties are improved.

a+b+c preferably equals 2 to 2.7, and more preferably equals 2 to 2.5. In a case where a+b+c equals a value smaller than 2, the antifoulant is not easily localized on the surface of the hardcoat layer. In a case where a+b+c equals a value greater than 2.7, curing properties and antifouling properties cannot be simultaneously accomplished.

In a case where the fluorine-containing containing contains a siloxane structure, the fluorine-containing compound contains 3 or more F atoms and 3 or more Si atoms in one molecule. It is preferable that the fluorine-containing compound contains 3 to 17 F atoms and 3 to 8 Si atoms. In a case where the compound has 3 or more F atoms, antifouling properties become sufficient. In a case where the compound has 3 or more Si atoms, the localization of the antifoulant on the surface of the hardcoat layer is accelerated, and antifouling properties become sufficient.

In a case where the fluorine-containing compound contains a siloxane structure, the fluorine-containing compound can be manufactured using known methods exemplified in JP2007-145884A.

In a case where the fluorine-containing compound contains a siloxane structure, the siloxane structure may be any one of linear, branched, and cyclic structures. Among these, branched and cyclic siloxane structures are particularly preferable, because these are excellently compatible with a compound having an unsaturated double bond that will be described later, do not cause cissing, and make it easy for the antifoulant to be localized on the surface of the hardcoat layer.

As the compound having branched siloxane structure, a compound represented by the following Formula (F-7) is preferable.

Formula (F-7):

(In the formula, R, R$^f$, and R$^A$ have the same definition as R, R$^f$, and R$^A$ described above, m=0, 1, or 2 and particularly, m=2, and k=0 or 1.)

As the compound having a cyclic siloxane structure, a compound represented by the following Formula (F-8) is preferable.

Formula (F-8):

(In the formula, R, R$^f$, and R$^A$ have the same definition as R, R$^f$, and R$^A$ described above, and n≥2. Particularly, 3≤n≤5.)

Specific examples of these fluorine-containing polysiloxane compounds include the following compounds and the like.

B-1
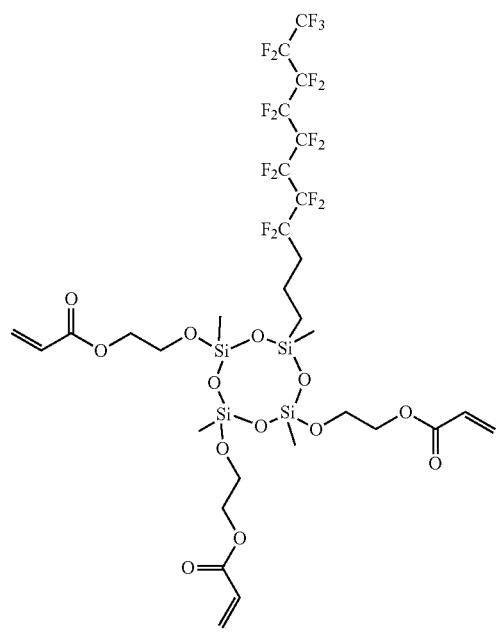

B-2
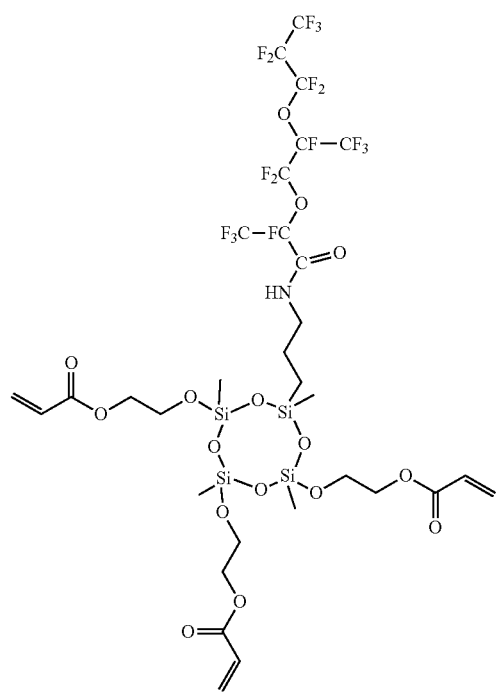

B-3

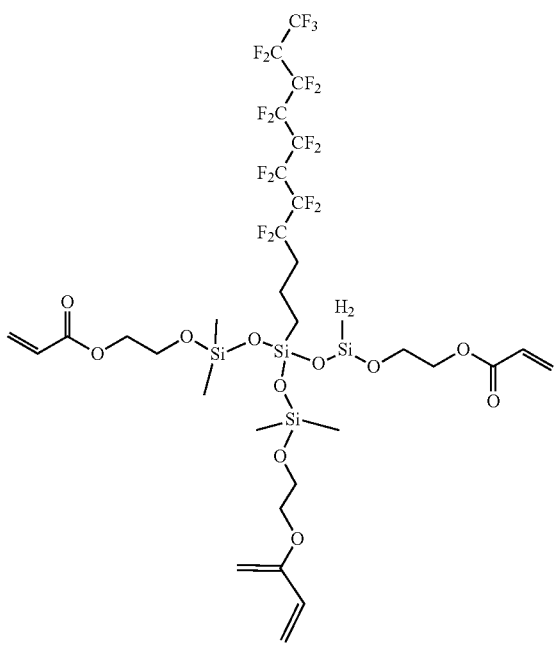

The weight-average molecular weight (Mw) of the fluorine-containing antifoulant can be measured by molecular exclusion chromatography, for example, gel permeation chromatography (GPC). Mw of the fluorine-containing antifoulant used in the present invention is preferably equal to or greater than 400 and less than 5,000, more preferably equal to or greater than 1,000 and less than 5,000, and even more preferably equal to or greater than 1,000 and less than 3,500. It is preferable that Mw is equal to or greater than 400, because then the antifoulant excellently migrates on the surface of the hardcoat layer. It is preferable that Mw is less than 5,000, because then the migration of the fluorine-containing antifoulant on the surface of the hardcoat layer is not hindered during the step of coating and curing, the fluorine-containing antifoulant can be easily evenly aligned on the surface of the hardcoat layer, and hence antifouling properties and film hardness are improved.

Here, in a case where the fluorine-containing compound contains a siloxane structure, Mw is less than 15,000, preferably equal to or greater than 1,000 and less than 5,000, and more preferably equal to or greater than 1,000 and less than 3,500.

The amount of the fluorine-containing antifoulant added, with respect to the total solid content in the hardcoat layer or the composition for forming a hardcoat layer, is preferably 1% to 20% by mass, more preferably 1% to 15% by mass, and even more preferably 1% to 10% by mass. In a case where the amount of the fluorine-containing antifoulant added is equal to or greater than 1% by mass with respect to the total solid content in the hardcoat layer or the composition for forming a hardcoat layer, the proportion of the antifoulant having water repellency and oil repellency becomes appropriate, and hence sufficient antifouling properties are obtained. It is preferable that the amount of the fluorine-containing antifoulant added is equal to or less than 20% by mass with respect to the total solid content in the hardcoat layer or the composition for forming a hardcoat layer, because then the antifoulant immiscible with a binder component is not precipitated on the surface of the hardcoat layer, and the whitening of the film or the generation of white powder on the surface of hardcoat layer does not occur.

The content of fluorine atoms in the fluorine-containing antifoulant is not particularly limited, but is preferably equal to or greater than 20% by mass, particularly preferably 30% to 70% by mass, and most preferably 40% to 70% by mass.

Examples of preferred fluorine-containing antifoulants include R-2020, M-2020, R-3833, M-3833, and OPTOOL DAC (all trade names) manufactured by DAIKIN INDUSTRIES, LTD., MEGAFACE F-171, F-172, and F-179A and DEFENSA MCF-300 and MCF-323 (all trade names) manufactured by DIC Corporation, and the like, but the present invention is not limited to these.

[Polysiloxane Compound Containing Polymerizable Unsaturated Group and Having Weight-Average Molecular Weight Equal to or Greater than 15,000]

Next, a polysiloxane compound containing a polymerizable unsaturated group and having a weight-average molecular weight, equal to or greater than 15,000 that can be used as g) component will be described. Hereinafter, the polysiloxane compound having a molecular weight equal to or greater than 15,000 will be referred to as "polysiloxane antifoulant".

As a preferred example aspect of the polysiloxane antifoulant, the compound represented by Formula (F-6) described above can be exemplified.

Preferred examples of the polysiloxane antifoulant include compounds having substituents on the terminal and/or side chain of a compound chain containing a plurality of dimethylsilyloxy units as repeating units, the compound chain containing dimethylsilyloxy as a repeating unit may contain a structural unit other than dimethylsilyloxy. The compound preferably has a plurality of substituents, and the substituent may be the same as or different from each other. Examples of preferred substituents include groups containing a (meth)acryloyl group, a (meth)acryloyloxy group, a vinyl group, an allyl group, a cinnamoyl group, an epoxy group, an oxetanyl group, a hydroxyl group, a fluoroalkyl group, a polyoxyalkylene group, a carboxyl group, an amino group and the like. From the viewpoint of inhibiting bleed-out of the antifoulant, a (meth)acryloyloxy group is particularly preferable. From the viewpoint of improving localizing properties of the antifoulant and inhibiting bleed-out of the antifoulant, the number of substituents expressed as a functional group equivalent is preferably 1,500 to 20,000 g-mol$^{-1}$.

The polysiloxane antifoulant contains 3 or more F atoms and 3 or more Si atoms in one molecule. It is preferable that, the polysiloxane antifoulant contains 3 to 17 F atoms and 3 to 8 Si atoms. In a case where the compound has 3 or more F atoms, antifouling properties become sufficient. In a case where the antifoulant has 3 or more Si atoms, the localization of the antifoulant on the surface of the hardcoat layer is accelerated, and antifouling properties become sufficient.

The polysiloxane antifoulant can be manufactured by known methods exemplified in JP2007-145884A.

As additives having a polysiloxane structure, it is preferable to acid reactive group-containing polysiloxane {for example, "KF-100T", "X-22-169AS", "KF-102", "X-22-370HE", "X-22-164C", "X-22-5002", "X-22-173B", "X-22-174D", "X-22-167B", and "X-22-161AS" (trade names) manufactured by Shin-Etsu Chemical Co., Ltd.; "AK-5", "AK-30", and "AK-32" (trade names) manufactured by TOAGOSEI CO., LTD.; and "SILAPLANE FM0725" and "SILAPLANE FM0721" (trade name) manufactured by CHISSO CORPORATION; and "DMS-U22", "RMS-033", and "UMS-182" (trade names) manufactured by Gelest, Inc}. Furthermore, the silicone-based compounds described in Tables 2 and 3 in JP2003-112383A can be preferably used.

The siloxane structure contained in the polysiloxane antifoulant may be any one of linear, branched, and cyclic structures. Among these, branched and cyclic siloxane structures are particularly preferable, because these are excellently compatible with a compound having an unsaturated double bond that will be described later, do not cause cissing, and make it easy for the antifoulant to be localized on the surface of the hardcoat layer.

The weight-average molecular weight of the polysiloxane antifoulant is equal to or greater than 15,000, preferably equal to or greater than 15,000 and equal to or less than 50,000, and more preferably equal to or greater than 18,000 and equal to or less than 30,000. It is undesirable for the weight-average molecular weight of the polysiloxane antifoulant to be less than 15,000, because then the surface localizing properties of polysiloxane are reduced, antifouling properties deteriorate, and hardness is reduced. Here, in a case where the aforementioned fluorine-containing compound having a polymerizable unsaturated group has a polysiloxane structure, the above problems do not occur.

The weight-average molecular weight of the polysiloxane antifoulant can be measured using molecular exclusion chromatography, for example, gel permeation chromatography (GPC).

The amount of the polysiloxane antifoulant added, with respect to the total solid content of the hardcoat layer or the composition for forming a hardcoat layer, is preferably equal to or greater than 1% by mass and less than 25% by mass, more preferably equal to or greater than 1% by mass and less than 20% by mass, even more preferably equal to or greater than 1% by mass and less than 15% by mass, and most preferably equal to or greater than 1% by mass and less than 10% by mass. In a case where the amount of the polysiloxane antifoulant added is equal to or greater than 1% by mass with respect to the total solid content of the hardcoat layer or the composition for forming a hardcoat layer, the proportion of the antifoulant having water repellency and oil repellency becomes appropriate, and hence sufficient antifouling properties are obtained, it is preferable that the amount of the polysiloxane antifoulant added is less than 25% by mass with respect to the total solid content in the hardcoat layer or the composition for forming a hardcoat layer, because then the antifoulant immiscible with a binder component is not precipitated on the surface of the hardcoat layer, and the whitening of the film or the generation of white powder on the surface of hardcoat layer does not occur.

The antifoulant is preferably distributed within the hardcoat layer in a film thickness direction in such a state that, provided that the amount of fluorine or silicone in the vicinity of the surface of the hardcoat layer is denoted by X, and the amount of fluorine or silicone in the entirety of the hardcoat layer is denoted by Y, X and Y satisfy 51%<X/Y<100%. It is preferable that X/Y is higher than 51%, because then the antifoulant is not distributed into the interior of the film of the hardcoat layer, and antifouling properties and film hardness are improved. The vicinity of the surface of the hardcoat layer refers to a region extending to a portion less than 1 μm deep beneath the surface of the hardcoat layer, and can be analyzed based on a proportion of a F fragment or a $Si_2C_5H_{15}O^+$ fragment measured by time-of-flight secondary ion mass spectrometry (TOF-SIMS).

It is preferable that g) antifoulant dissolves in a liquid or a solvent at a temperature of 20° C. As the solvent, an organic solvent is preferable which is miscible with dimethyl carbonate that can be appropriately selected according to the polarity of the compound. Examples of the solvent include solvents based on aliphatic or aromatic alcohol, ketone, ester, and ether, and solvents dissolving in dimethyl carbonate are particularly preferable.

From the viewpoint of antifouling properties, the surface tension of g) antifoulant is preferably equal to or less than 25.0 mN/m, more preferably equal to or less than 23.0 mN/m, and even more preferably equal to or less than 16.0 mN/m.

The surface tension of the antifoulant is the surface tension measured in a single film, and can be measured as below.

(Method for Measuring Surface Tension of Antifoulant)

A quartz substrate was spin-coated with the antifoulant. In a case where the antifoulant contained a solvent, the solvent was dried, thereby preparing a film. Then, by using a contact angle meter ["CA-X" type contact angle meter, manufactured by Kyowa Interlace Science Co., LTD.], in dry state (20° C./65% RH), a liquid droplet having a diameter of 1.0 mm was formed at the tip of the stylus by using pure water as a liquid. The stylus was brought into contact with the surface of the aforementioned spin-coated film such that a liquid droplet was formed on the film. The angle formed between a tangent touching the liquid surface and the film surface at a spot in which the film contacted the liquid was taken as a contact angle of a liquid-containing side and measured. Furthermore, by using methylene iodide instead of water, a contact angle was measured, and surface free energy was calculated from the following equations.

The surface free energy ($\gamma s^v$: unit, mN/m) was defined by a value $\gamma s^v$ ($=\gamma s^d + \gamma s^h$) expressed as the sum of $\gamma s^d$ and $\gamma s^h$ calculated from the following simultaneous equations a and b from contact angles $\theta_{H2O}$ and $\theta_{CH2I2}$ of each of pure water $H_2O$ and methylene iodide $CH_2I_2$ experimentally measured on an antireflection film with reference to D. K. Owens: J. Appl. Polym. Sci., 13, 1741 (1969).

$$1+\cos\theta_{H2O} = 2\sqrt{\gamma s^d}(\sqrt{\gamma_{H2O}^d/\gamma_{H2O}^v}) + 2\sqrt{\gamma s^h}(\sqrt{\gamma_{H2O}^h/\gamma_{H2O}^v}) \qquad \text{a.}$$

$$1+\cos\theta_{CH2I2} = 2\sqrt{\gamma s^d}(\sqrt{\gamma_{CH2I2}^d/\gamma_{CH2I2}^v}) + 2\sqrt{\gamma s^h}(\sqrt{\gamma_{CH2I2}^h/\gamma_{CH2I2}^v}) \qquad \text{b.}$$

$$\gamma_{H2O}^d = 21.8, \gamma_{H2O}^h = 51.0, \gamma_{H2O}^v = 72.8$$

$$\gamma_{CH2I2}^d = 49.5, \gamma_{CH2I2}^h = 1.3, \gamma_{CH2I2}^v = 50.8$$

As g) antifoulant described so far, those synthesized by known methods or commercially available products may be used. As the commercially available products. RS-90, RS-78, and the like manufactured by DIC Corporation can be preferably used.

(Solvent)

The composition for forming a hardcoat layer in the present invention may contain a solvent. As the solvent, it is possible to use various solvents selected from, the viewpoint of the ability to dissolve or disperse each component, the ability to easily form a uniform surface in the coating step and the drying step, the ability to secure liquid preserving properties, the property of having appropriate saturated vapor pressure, and the like.

Two or more kinds of solvents can be used by being mixed together. Particularly, from the viewpoint of drying load, it is preferable that the mixture contains a solvent having a boiling point equal to or lower than 100° C. at normal pressure and room temperature as a main component and contains a small amount of solvent having a boiling point of higher than 100° C. for adjusting the drying rate.

In the composition for forming a hardcoat layer of the present invention, in order to prevent particle sedimentation, the amount of the solvent having a boiling point equal to or lower than 80° C. contained in the coating composition is preferably 30% to 80% by mass and more preferably 50% to 70% by mass of the total amount of solvents. In a case where the proportion of the solvent having a boiling point equal to or lower than 80° C. is as described above, the impregnation of the support with the resin component is appropriately inhibited, the rate of viscosity increase resulting from drying is increased, and accordingly, the particle sedimentation can be inhibited.

The solvent having a boiling point equal to or lower than 100° C. includes, for example, hydrocarbons such as hexane (boiling point: 68.7° C.), heptanone (98.4° C.), cyclohexane (80.7° C.), and benzene (80.1° C.), halogenated hydrocarbons such as dichloromethane (39.8° C.), chloroform (61.2° C.), carbon tetrachloride (76.8° C.), 1,2-dichloroethane (83.5° C.), and trichloroethylene (87.2° C.), ethers such as diethyl ether (34.6° C.), diisopropyl ether (68.5° C.), dipropyl ether (90.5° C.), and tetrahydrofuran (66° C.), esters such as ethyl formate (54.2° C.), methyl acetate (57.8° C.), ethyl acetate (77.1° C.), and isopropyl acetate (89° C.), ketones such as acetone (56.1° C.), and 2-butanone (methyl ethyl ketone, same as MEK, 79.6° C.), alcohols such as methanol (64.5° C.), ethanol (78.3° C.), 2-propanol (82.4° C.), and 1-propanol (97.2° C.), cyano compounds such as acetonitrile (81.6° C.) and propionitrile (97.4° C.), and carbon disulfide (46.2° C.). Among these, ketones and esters are preferable, and ketones are particularly preferable. Among ketones, 2-butanone is particularly preferable.

The solvent having a boiling point higher than 100° C. include, for example, octane (125.7° C.), toluene (110.6° C.), xylene (138° C.), tetrachloroethylene (121.2° C.), chlorobenzene (131.7° C.), dioxane (101.3° C.), dibutylether (142.4° C.), isobutyl acetate (118° C.), cyclohexanone (155.7° C.), 2-methyl-4-pentatone (same as MIBK, 115.9° C.), 1-butanol (117.7° C.), N,N-dimethylformamide (153° C.), N,N-dimethylacetamide (166° C.), and dimethylsulfoxide (189° C.). Among these, cyclohexanone and 2-methyl-4-pentanone are preferable.

(Surfactant)

In the hardcoat layer or the composition for forming a hardcoat layer in the present invention, it is also suitable to use various surfactants or wind irregularity preventing agents (hereinafter, collectively referred to as a surfactant as well). Generally, the surfactants or wind irregularity preventing agents can inhibit film thickness unevenness that results when the film is non-uniformly dried due to the localized distribution of drying air.

Specifically, it is preferable that the hardcoat layer or the composition for forming a hardcoat layer contains a fluorine-based surfactant, a silicone-based surfactant, or both of these as a surfactant. As the surfactant, an oligomer or polymer is more preferred than a low-molecular weight compound.

Examples of preferred fluorine-based surfactants include a fluoroaliphatic group-containing copolymer (hereinafter, simply described as "fluorine-based polymer" in some cases). As the fluorine-based polymer, an acryl resin or a methacryl resin, which contains a repeating unit corresponding to the following monomer (i) or contains the repeating unit corresponding to the monomer (i) and a repeating unit corresponding to the following monomer (ii), and a copolymer with a vinyl-based monomer which can be copolymerized with the aforementioned acryl and methacryl resins are useful.

(i) Fluoroaliphatic group-containing monomer represented by the following Formula A

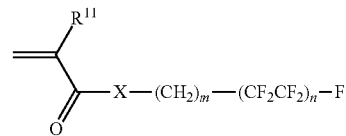

Formula A

In Formula A, $R^{11}$ represents a hydrogen atom or a methyl group, X represents an oxygen atom, a sulfur atom, or —N(R12)-, m represents an integer equal to or greater than 1 and equal to or less than 6, and n represents an integer of 2 to 4. R12 represents a hydrogen atom or an alkyl group having 1 to 4 carbon atoms. Specifically, R12 represents a methyl group, an ethyl group, a propyl group, or a butyl group, and preferably represents a hydrogen atom or a methyl group. X is preferably an oxygen atom.

(ii) Monomer represented by the following Formula B that can be copolymerized with aforementioned (i)

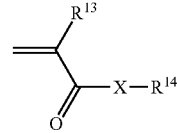

Formula B

In Formula B, $R^{13}$ represents a hydrogen atom or a methyl group, and Y represents an oxygen atom, a sulfur atom, or —N(R15)-. R15 represents a hydrogen atom or an alkyl group having 1 to 4 carbon atoms. Specifically, R15 represents a methyl group, an ethyl group, a propyl group, or a butyl group, and preferably represents a hydrogen atom or a methyl group. As Y, an oxygen atom, —N(H)—, and —N(CH$_3$)— are preferable.

$R^{14}$ represents a linear, branched, or cyclic alkyl group having 4 to 20 carbon atoms that may have a substituent. Examples of the substituent of the alkyl group represented by $R^{14}$ include a hydroxyl group, an alkylcarbonyl group, an arylcarbonyl group, a carboxyl group, an alkylether group, an arylether group, a halogen atom such as a fluorine atom, a chlorine atom, or a bromine atom, a nitro group, a cyano group, an amino group, and the like, but the present invention is not limited to these. As the linear, branched, or cyclic alkyl group having 4 to 20 carbon atoms, a butyl group, a pentyl group, a hexyl group, a heptyl group, an octyl group, a nonyl group, a decyl group, an undecyl group, a dodecyl group, a tridecyl group, a tetradecyl group, a pentadecyl group, an octadecyl group, and an eicosanyl group which may be linear or branched, a monocyclic cycloalkyl group such as a cyclohexyl group or a cycloheptyl group, and a polycyclic cycloalkyl group such as a bicycloheptyl group, a bicyclodecyl group, a tricycloundecyl group, a tetracyclododecyl group, an adamantyl group, a norbornyl group, or a tetracyclodecyl group are suitably used.

The amount of the fluoroaliphatic group-containing monomer represented by Formula A used in the fluorine-based polymer is, based on the monomers in the fluorine-based polymer, equal to or greater than 10 mol %, preferably 15 to 70 mol %, and even more preferably within a range of 20 to 60 mol %.

The weight-average molecular weight of the fluorine-based polymer is preferably 3000 to 100,000, and more preferably 5,000 to 80,000. The amount of the fluorine-based polymer added, with respect to 100 parts by mass of the coating solution, is preferably within a range of 0.001 to 5 parts by mass, more preferably within a range of 0.005 to 3 parts by mass, and even more preferably within a range of 0.01 to 1 part by mass. In a case w here the amount of the fluorine-based polymer added is equal to or greater than 0.001 parts by mass, the effect brought about by the addition of the fluorine-based polymer is sufficiently obtained, in a case where the amount of the fluorine-based polymer added is equal to or less than 5 parts by mass, it is possible to prevent a problem in that the coating film is not sufficiently dried or a problem in that the performance of the coating film is negatively affected.

Examples of preferred silicone-based compounds include "X-22-174DX", "X-22-2426", "X-22-164C", and "X-22-176D" (all trade names) manufactured by Shiu-Etsu Chemical Co., Ltd.; "FM-7725", "FM-5521", and "FM-6621" (all trade names) manufactured by CHISSO CORPORATION; "DMS-U22" and "RMS-033" (all trade names) manufactured by Gelest, Inc; "SH 200", "DC 11PA", "ST 80PA", "L 7604", "FZ-2105", "L-7604", "Y-7006", and "SS-2801" (all trade names) manufactured by Dow Corning Toray Co., Ltd.; "TSF 400" (trade name) manufactured by Momentive Performance Materials Japan LLC; and the like, but the present invention is not limited to these.

In a case where the total solid content of the composition for forming a hardcoat layer in the present invention is regarded as being 100% by mass, the content of the silicone-based surfactant is preferably 0.01% to 0.5% by mass, and more preferably 0.01% to 0.3% by mass.

(Mat Particles)

For the purpose of imparting internal scattering properties or surface irregularities, the hardcoat layer or the composition for forming a hardcoat layer may contain mat particles having an average particle size of 1.0 to 15.0 µm and preferably having an average particle size of 1.5 to 10.0 µm. Furthermore, in order to adjust the viscosity of the coating solution, the hardcoat layer or the composition for forming a hardcoat layer can contain a polymer compound, an inorganic lamellar compound, and the like. e) Component may be used as the mat particles.

<Support>

In the hardcoat film of the present invention, the support contains a resin as a main component. The main component of the support means a component that, accounts for 50% by mass or more of the support. The resin used as the main component of the support is various polymers or resins which will be described later or a polymer or resin used in various films which will be described later.

The pencil hardness of the support is not particularly limited, but in a case where the pencil hardness of the support is high, the pencil hardness of the hardcoat layer of the hardcoat film can be more easily increased. The pencil hardness of the support is preferably equal to or higher than 1H, and more preferably equal to or higher than 2H.

The film thickness of the support is preferably within a range of 10 to 1,000 µm, more preferably within a range of 20 to 500 µm, and particularly preferably within a range of 200 to 500 µm. From the viewpoint of improving smoothness and pencil hardness, it is preferable that the film thickness of the support of the hardcoat film of the present invention is preferably equal to or greater than 200 µm. In a case where the support is a laminated film, the film thickness thereof refers to a total thickness. An easy adhesion treatment such as a corona discharge treatment may be optionally performed on the surface of the support by a known method.

The support is preferably a transparent support, and more preferably a plastic transparent support.

As the material forming the support, a polymer excellent in transparency as optical performance, mechanical strength, thermal stability, isotropic properties, and the like is preferable. In the present invention, "transparent" means a visible light transmittance equal to or higher than 60%. The visible light transmittance is preferably equal to or higher than 80%, and particularly preferably equal to or higher than 90%. Examples of the aforementioned polymer include a polycarbonate-based polymer, a polyester-based polymer such as polyethylene terephthalate or polyethylene naphthalate, a (meth)acryl-based polymer such as polymethyl methacrylate, a styrene-based polymer such as polystyrene or an acrylonitrile-styrene copolymer (AS resin), and the like. Examples of the polymer also include a polyolefin such, as polyethylene or polypropylene, a polyolefin-based polymer such as au ethylene propylene copolymer, a vinyl chloride-based polymer, an amide-based polymer such as nylon or aromatic polyamide, an imide-based polymer, a sulfone-based polymer, a polyethersulfone-based polymer, a polyether ether ketone-based polymer, a polyphenylene sulfide-based polymer, vinylidene chloride-based polymer, a vinyl butyral-based polymer, an acrylate-based polymer, a polyoxymethylene-based polymer, an epoxy-based polymer, and a polymer obtained by mixing the above polymers together. Furthermore, a film obtained by laminating two or more layers of resin films can also be used.

In a preferred aspect, the support is a laminated film of two or more layers of resin films. Herein, the number of films laminated is 2 or 3 for example, but is not particularly limited.

(Material Forming Support)

As the material forming the support (resin used as the main component of the support), it is possible to preferably use a cellulose-based polymer (particularly preferably cellulose acylate) which has been used in the related art as a transparent protective film for a polarizing plate and is represented by triacetyl cellulose.

Furthermore, as the material forming the support, it is possible to preferably use an acryl resin used in an acryl resin film which has been proposed as a polarizing plate protective film to be used in the related art. In addition, a polycarbonate resin used in a polycarbonate resin film can also be preferably used.

In the hardcoat film of the present invention, the support preferably includes at least one kind of film selected from the group consisting of an acryl resin film and a polycarbonate resin film. Examples of the acryl resin film include a polymer or copolymer resin film containing one or more kinds of monomers selected from the group consisting of an acrylic acid ester and a methacrylic acid ester, such as a polymethyl methacrylate resin (PMMA) film.

(Compound Represented by Formula 1)

An aspect is preferable in which a film containing a compound represented by the following Formula I is used in the support. In the hardcoat film of the present invention, the support is more preferably a cellulose acylate film, and the cellulose acylate film more preferably contains at least a compound represented by the following Formula I. By using the film containing a compound represented by the following Formula 1 as the support, even in a case where the film thickness of the support is reduced, the visibility of a display can be improved, although detailed mechanism thereof is unclear. It is preferable to use the compound in combination with the composition for forming a hardcoat layer of the present invention, because then the compound can effectively function to inhibit the deteriorate of visibility of a display that is caused when the display is left in a moist-heat environment for a long period of time.

(Compound Represented by Formula 1)

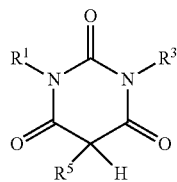

Formula I

In Formula I, $R^1$, $R^3$, and $R_5$ each independently represent a hydrogen atom, an alkyl group, a cycloalkyl group, an alkenyl group, or an aromatic group;

the alkyl group, the cycloalkyl group, the alkenyl group, and the aromatic group may have a substituent;

here, any one of $R^1$, $R^3$, and $R_5$ is an alkyl group or a cycloalkyl group in which a group having a ring structure is substituted, and the number of ring structures existing in $R^1$, $R^3$, and $R^5$ is equal to or greater than 3 in total.

The number of carbon atoms in the alkyl group represented by $R^1$, $R^3$, and $R_5$ is preferably 1 to 20, more preferably 1 to 10, even more preferably 1 to 5, and particularly preferably 1 to 3. The alkyl group is preferably a methyl group or an ethyl group. Here, in a case of the alkyl group in which a group having a ring structure is substituted, the number of carbon atoms in the alkyl group is preferably 7 to 20, more preferably 7 to 12, and even more preferably 7 to 10. The ring structure in the alkyl group having a ring structure may be an aromatic ring (including an aromatic heterocyclic ring) or an aliphatic ring, and is preferably an aromatic hydrocarbon ring or an aliphatic ring. The number of carbon atoms in the cycloalkyl group represented by $R^1$, $R^3$, and $R_5$ is preferably 3 to 20, more preferably 3 to 10, even more preferably 4 to 8, and particularly preferably 5 or 6. Specific examples of the cycloalkyl group include cyclopropyl, cyclopentyl, and cyclohexyl. Among these, cyclohexyl is particularly preferable.

The number of carbon atoms in the alkenyl group represented by $R^1$, $R^3$, and $R_5$ is preferably 2 to 20, more preferably 2 to 10, and even more preferably 2 to 5. Examples of the alkenyl group include vinyl and allyl.

The aromatic group represented by $R^1$, $R^3$, and $R^5$ may be an aromatic hydrocarbon group or an aromatic heterocyclic group, and is preferably an aromatic hydrocarbon group. The number of carbon atoms in the aromatic group is preferably 6 to 20, more preferably 6 to 16, and even more preferably 6 to 12.

The aromatic group, particularly, the aromatic hydrocarbon group is preferably phenyl or naphtyl, and more preferably phenyl.

Each of the groups represented by $R^1$, $R^3$, and $R_5$ may have a substituent.

The substituent is not particularly limited, and examples thereof include an alkyl group (preferably an alkyl group having 1 to 10 carbon atoms, such as methyl, ethyl, isopropyl, t-butyl, pentyl, heptyl, 1-ethylpentyl, or benzyl), an alkenyl group (preferably an alkenyl group having 2 to 20 carbon atoms, such as vinyl, allyl, or oleyl), an alkynyl group (preferably an alkynyl group having 2 to 20 carbon atoms, such as ethynyl, 2-butynyl, or phenylethynyl), a cycloalkyl group (preferably a cycloalkyl group having 3 to 20 carbon atoms, such as cyclopropyl, cyclopentyl, cyclohexyl, or 4-methylcyclohexyl), an aryl group (preferably an aryl group having 6 to 26 carbon atoms, such as phenyl, 1-naphthyl, 4-methoxyphenyl, 2-chlorophenyl, or 3-methylphenyl), a heterocyclic group (preferably a heterocyclic group having 0 to 20 carbon atoms, in which the heteroatom constituting the ring is preferably an oxygen atom, a nitrogen atom, or a sulfur atom; the heterocyclic group may be a 5- or 6-membered ring and condensed with a benzene ring or a hetero ring, and the ring may be a saturated ring, an unsaturated ring, or an aromatic ring; examples of the heterocyclic group include 2-pyridinyl, 3-pyridinyl, 4-pyridinyl, 2-imidazolyl, 2-benzimidazolyl, 2-thiazolyl, and 2-oxazolyl), an alkoxy group (preferably an alkoxy group having 1 to 20 carbon atoms, such as methoxy, ethoxy, isopropyloxy, or benzyloxy), an aryloxy group (preferably an aryloxy group having 6 to 26 carbon atoms, such as phenoxy, 1-naphthyloxy, 3-methylphenoxy, or 4-methoxyphenoxy), an alkylthio group (preferably an alkylthio group having 1 to 20 carbon atoms, such as methylthio, ethylthio, isopropylthio, or benzylthio), an arylthio group (preferably an arylthio group having 6 to 26 carbon atoms, such as phenylthio, 1-naphthylthio, 3-methylphenylthio, or 4-methoxyphenylthio), a phosphonyl group (preferably an alkylsulfonyl group or an arylsulfonyl group, preferably having 1 to 20 carbon atoms, such as methylsulfonyl, ethylsulfonyl, benzenesulfonyl, or toluenesulfonyl), an acyl group (including an alkyl carbonyl group, an alkenyl carbonyl group, an aryl carbonyl group, and a heterocyclic carbonyl group and preferably having 20 or less carbon atoms; examples of the acyl group include acetyl, pivalolyl, acryloyl, methacryloyl, benzoyl, and nicotinoyl), an alkoxycarbonyl group (preferably an alkoxycarbonyl group having 2 to 20 carbon atoms, such as ethoxycarbonyl or 2-ethoxyhexyloxycarbonyl), an aryloxycarbonyl group (preferably an aryloxycarbonyl group having 7 to 20 carbon atoms, such as phenyloxycarbonyl or naphthyloxycarbonyl), an amino group (including an amino group, an alkylamino group, an arylamino group, and a heterocyclic amino group and preferably having 0 to 20 carbon atoms; examples of the amino group include amino, N,N-dimethylamino, N,N-diethylamino, N-ethylamino, anilino, 1-pyrrolidinyl, piperidino, and morphonyl), a sulfonamide group (preferably an alkyl sulfonamide group or an aryl sulfonamide group, preferably having 0 to 20 carbon atoms, such as N,N-dimethylsulfonamide or N-phenylsulfonamide), a sulfamoyl group (preferably an alkyl sulfamoyl group or an aryl sulfmaoyl group, preferably having 0 to 20 carbon atoms, such as N,N-dimethylsulfamoyl or N-phenylsulfamoyl), an acyloxy group (preferably an acyloxy group having 1 to 20 carbon atoms, such as acetyloxy or benzoyloxy), a carbamoyl group (preferably an alkyl carbamoyl group or an aryl carbamoyl group, preferably having 1 to 20 carbon atoms, such as N,N-dimethyl carbamoyl or N-phenyl carbamoyl), an acylamino group (preferably an acylamino group having 1 to 20 carbon atoms, such as acetylamino, acryloylamino, benzoylamino, or nicotinamide), a cyano group, a hydroxyl group, a mercapto group, a carboxyl group, and a halogen atom (such as a fluorine atom, a chlorine atom, a bromine atom, or an iodine atom).

The above substituents may be further substituted with the above substituents. Examples of such substituents include a perfluoroalkyl group such as trifluoromethyl, an aralkyl group, an alkyl group substituted with an acyl group, and the like.

The above substituents are used not only as the substituents that each group represented by $R^1$, $R^3$, and $R_5$ may have but also as the substituents in the compounds described in the present specification.

Herein, among the above substituents that each group represented by $R^1$, $R^3$, and $R^5$ may have, an alkyl group, air aryl group, an alkoxy group, an alkylthio group, an alkylsulfonyl group, a halogen atom, and an acyl group are preferable, an alkyl group, an aryl group, an alkoxy group, and an acyl group are more preferable, and an alkyl group and an alkoxy group are even more preferable.

In the compound represented by Formula I, any one of $R^1$, $R^3$, and $R_5$ is an alkyl group or a cycloalkyl group substituted with a group having a ring structure. It is preferable that any one of $R^1$, $R^3$, and $R_5$ is an alkyl group substituted with a group having a ring structure.

Particularly, it is preferable that $R^5$ is an alkyl group or a cycloalkyl group substituted with a group having a ring structure.

Herein, the ring of the group having a ring structure is preferably a benzene ring, a naphthalene ring, a cyclopentane ring, a cyclohexane ring, or a nitrogen-containing hetero aromatic ring (for example, a pyrrole ring, a pyrazole ring, an imidazole ring, an oxazole ring, a thiazole ring, a pyridine ring, an indole ring, or an isoindole ring).

In the compound represented by Formula I, it is preferable that at least two out of $R^1$, $R^3$, and $R^5$ represent an alkyl group or a cycloalkyl group having a ring structure as a substituent. Particularly, it is preferable that $R_1$ and $R^3$ each independently represent an alkyl group which may have a substituent or an aromatic group or a cycloalkyl group which may have a substituent.

In the compound represented by Formula I, it is more preferable that the maximum number of ring structures existing in the substituent of $R^1$, $R^3$, and $R_5$ is 4 in total.

$R^5$ is preferably an alkyl group or a cycloalkyl group which may be substituted with a group having a ring structure or with an acyl group, more preferably an alkyl group substituted with an aryl group, an alkyl group or a cycloalkyl group substituted with an acyl group, and even more preferably an alkyl group or a cycloalkyl group substituted with an aryl group.

Hereinafter, the aforementioned alkyl group and cycloalkyl group preferred as $R_5$ will be more specifically described.

Among alkyl groups, as an unsubstituted alkyl group, methyl, ethyl, propyl, isopropyl, n-butyl, n-hexyl, 2-ethylhexyl, and n-octyl can be exemplified.

Examples of the alkyl group substituted with a group having a ring structure include an aralkyl group such as benzyl, phenethyl 3-phenylpropyl, and naphthylmethyl, methyl pyridin-2-yl, methyl pyridine-3-yl methyl pyridine-4-yl, and methyl indol-3-yl.

The acyl group in the alkyl group substituted with an acyl group is preferably an alkylcarbonyl group, a cycloalkylcarbonyl group, or an arylcarbonyl group, more preferably a cycloalkylcarbonyl group having a ring structure or an arylcarbonyl group, and particularly preferably an arylcarbonyl group.

Examples of the aforementioned alkylcarbonyl group include acetyl, propionyl, butyryl and pivaloyl. Examples of the aforementioned cycloalkcarbonyl group include cyclopropylcarbonyl, cyclopentylcarbonyl, and cyclohexylcarbonyl. Examples of the aforementioned arylcarbonyl group include benzoyl, toluoyl, and naphthoyl.

Examples of the alkyl group substituted with an acyl group include a 2-acylethyl group, a 3-acylpropyl group, and a 2-acylpropyl group. Among these, a 2-acylethyl group is preferable.

Examples of the cycloalkyl group include the groups exemplified above as $R^1$, $R^3$, and $R^5$.

It is considered that, by inhibiting the expansion of the conjugated structure resulting from $R^5$, the wavelength absorbed by the compound represented by Formula I is shortened, although the mechanism is unclear. It is considered that, in a case where such a compound is used, the compound effectively interacts with the material forming the support and contributes to the inhibition of coloring that occurs with the passage of time and to the improvement of the adhesiveness with respect to the hardcoat layer.

Examples of preferred compounds among the compounds represented by Formula I are as below.

A compound in which at least one of $R^1$, $R^3$, and $R_5$ is an alkyl group substituted with an aromatic ring Among the alkyl groups substituted with an aromatic ring, an alkyl group substituted with one or two aryl groups is preferable (in a case where the alkyl group is substituted with two aryl groups, it is preferable that the same carbon atoms are substituted). Furthermore, an alkyl group substituted with an aryl group and an acyl group (preferably an aryloyl group) is preferable.

A compound in which any one of $R^1$, $R^3$, and $R_5$ represent a group containing a cycloalkyl group and preferably represent a cycloalkyl group containing a cycloalkyl group In a case where "the number of ring structures existing in $R^1$, $R^3$, and $R_5$ is equal to or greater than 3 in total", as the ring structure, the basic skeleton of the substituent represented by $R^1$, $R^3$, or $R_5$ is adopted as the ring structure. Furthermore, as described above, an aspect is also adopted in which the substituent contained in $R^1$, $R^3$, or $R_5$ has a ring structure.

As the aforementioned ring structure, a cyclic saturated hydrocarbon structure or an aromatic ring structure (aromatic hydrocarbon structure or aromatic heterocyclic ring structure) is preferable. The ring structure may be a condensed ring structure.

In a case where the ring structure is a cyclic saturated hydrocarbon structure, the cyclic saturated hydrocarbon structure preferably exists as a cycloalkyl group having 3 to 20 carbon atoms. More specifically, the cyclic saturated hydrocarbon structure preferably exists as a cyclopropyl group, a cyclopentyl group, or a cyclohexyl group, and particularly preferably exists as a cyclohexyl group.

In a case where the ring structure is an aromatic ring structure, the aromatic ring structure is preferably an aromatic hydrocarbon structure. The aromatic hydrocarbon structure preferably exists as an aryl group having 6 to 20 carbon atoms. More specifically, the aromatic hydrocarbon structure more preferably exists as a benzene ring or a naphthalene ring, and particularly preferably exists as a benzene ring.

The ring structure may have a substituent. In a case where the ring structure has a substituent, a preferred range of the substituent is the same as the preferred range of the substituent that each group represented by $R^1$, $R^3$, and $R_5$ may have.

In the compound represented by Formula I, $R^1$, $R^3$, and $R_5$ more preferably represent an alkyl group, an alkenyl group, or an aryl group. $R^1$, $R^3$, and $R_5$ more preferably each have one or more ring structures, and even more preferably each have one ring structure.

The molecular weight of the compound represented by Formula I is preferably 250 to 1,200, more preferably 300 to 800, and particularly preferably 350 to 600.

In a case where the molecular weight is within the aforementioned preferred range, the volatilization of the compound represented by Formula I from the film is excellently inhibited, and a film with high transparency can be obtained.

Specific examples of the compound represented by Formula I that can be used in the present invention will be shown below, but the present invention is not limited thereto.

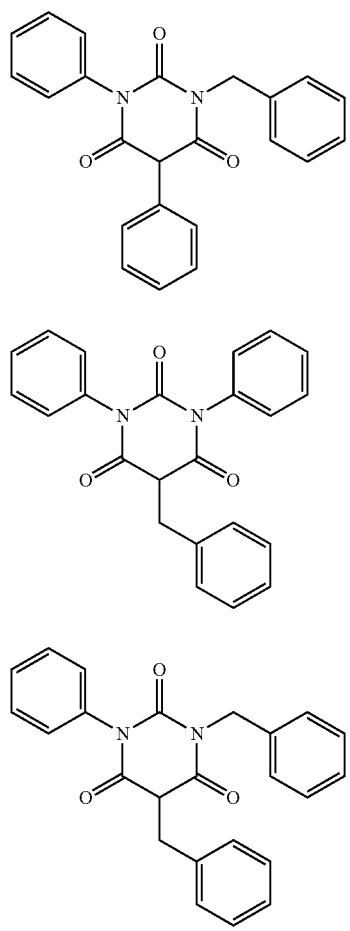

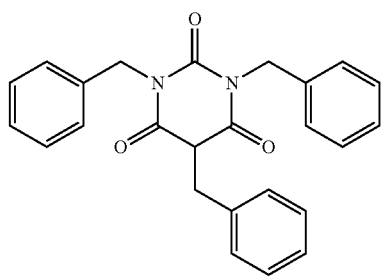

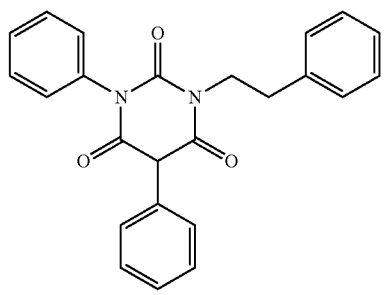

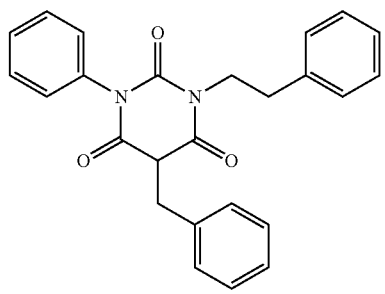

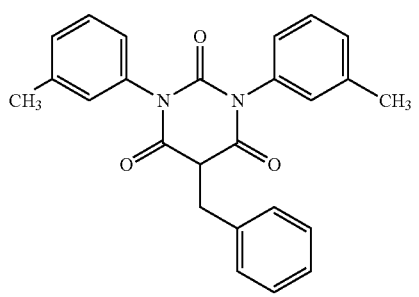

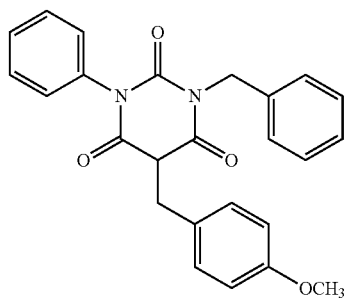

A-10
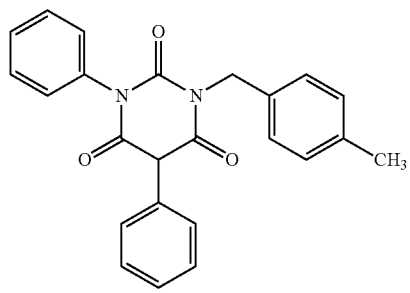
A-11
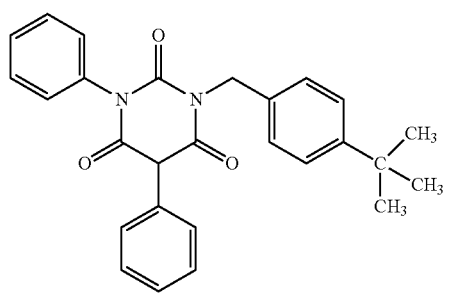
A-12
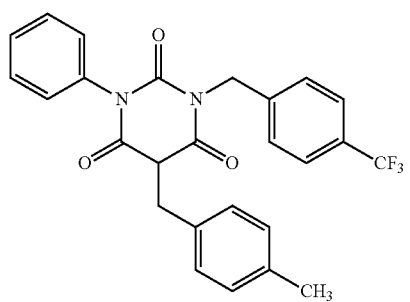
A-13
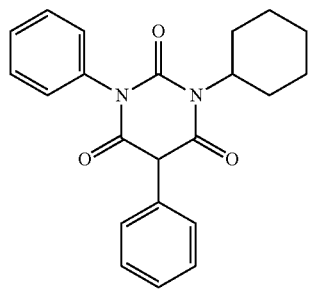
A-14
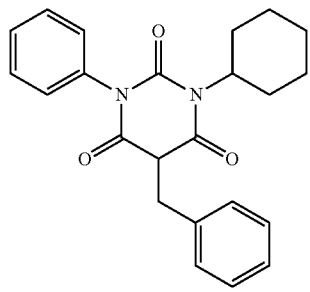
A-15
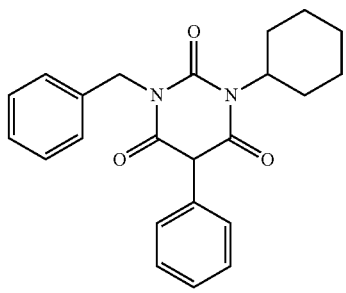
A-16
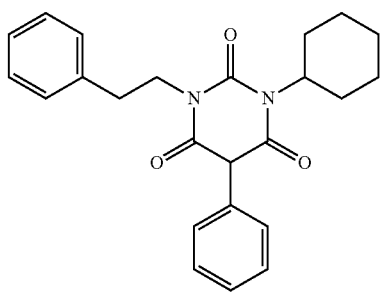
A-17
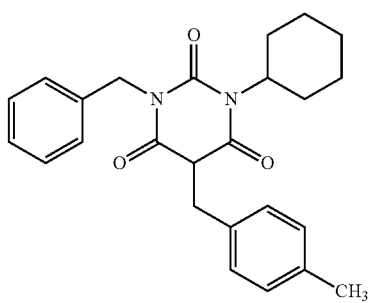
A-18
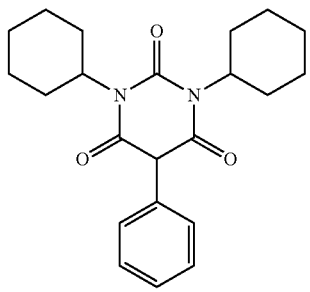
A-19
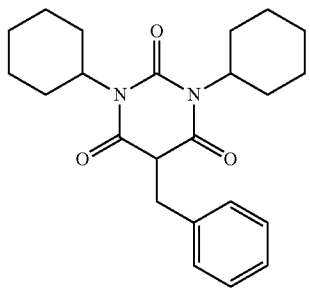

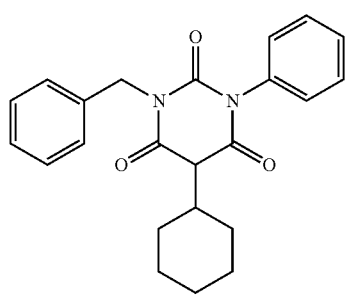
A-20
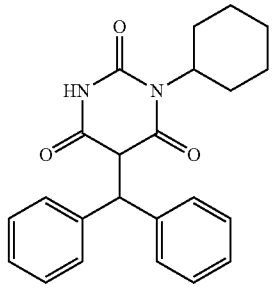
A-25
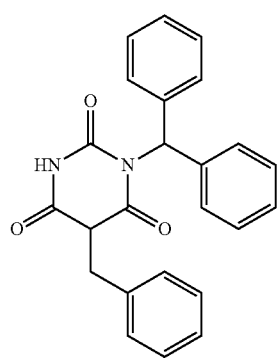
A-21
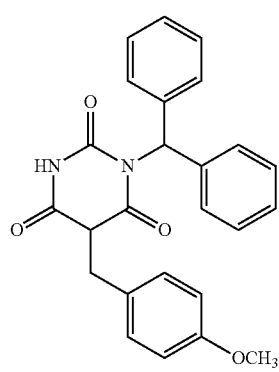
A-22
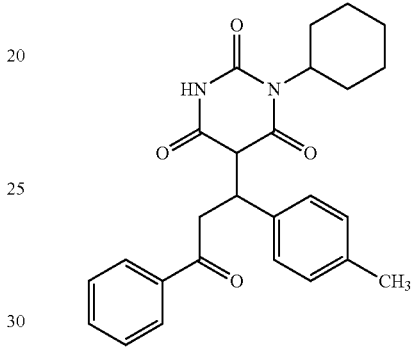
A-26
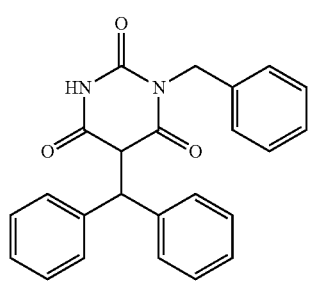
A-23
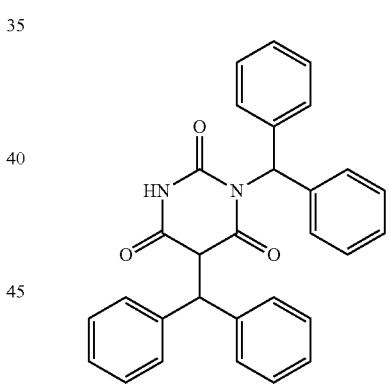
A-27
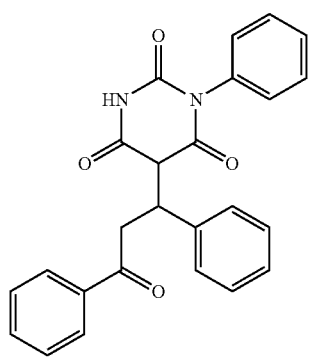
A-24
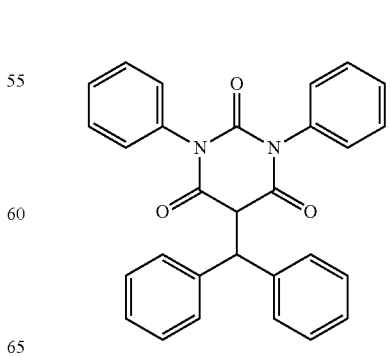
A-28

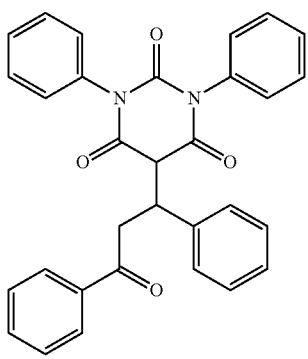
A-29
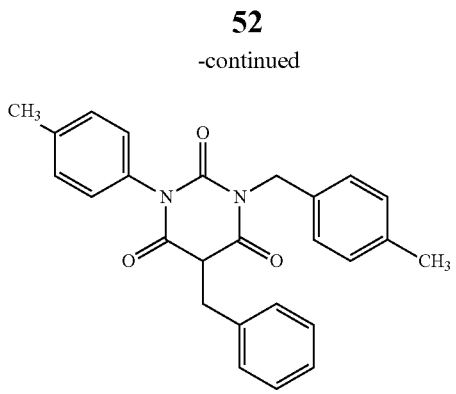
A-34
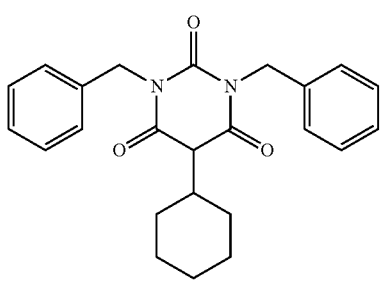
A-30
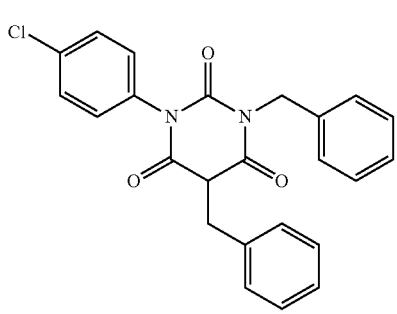
A-35
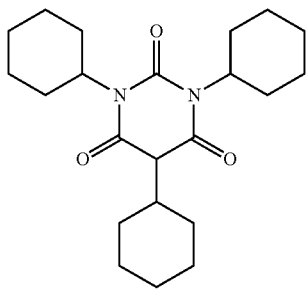
A-31
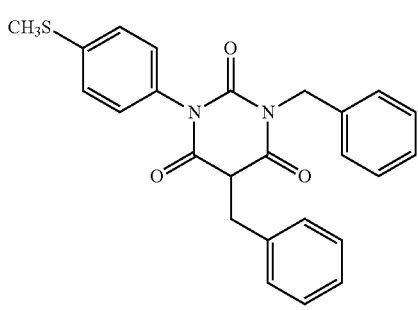
A-36
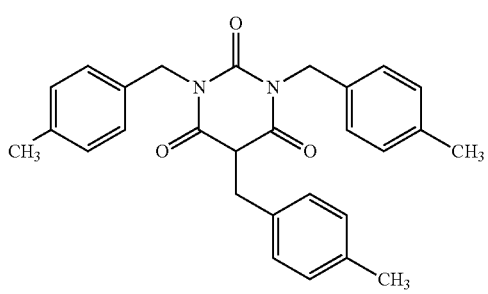
A-32
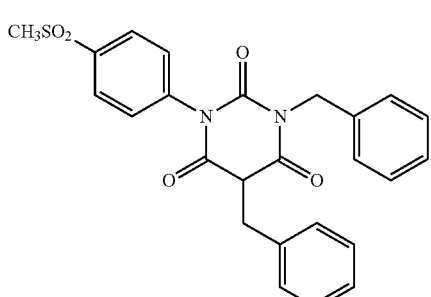
A-37
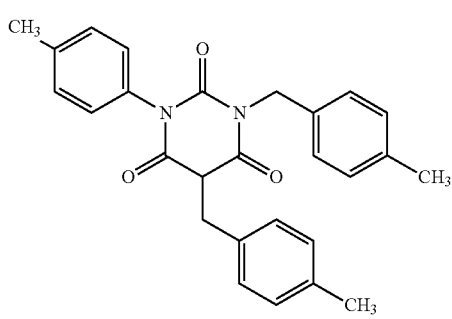
A-33
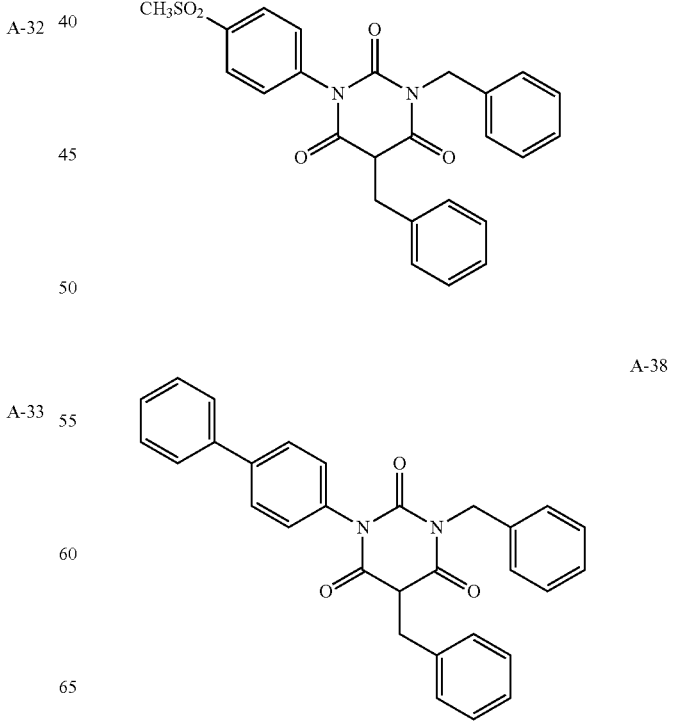
A-38

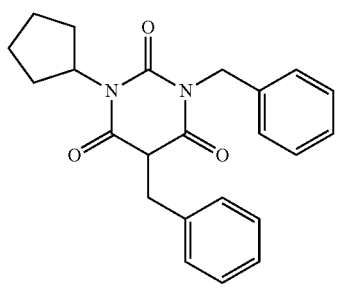
A-39
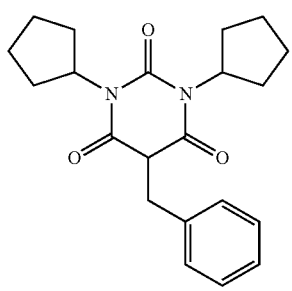
A-40
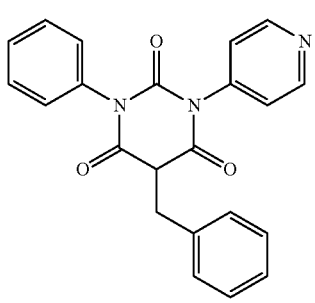
A-41
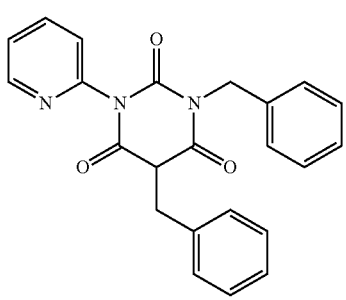
A-42
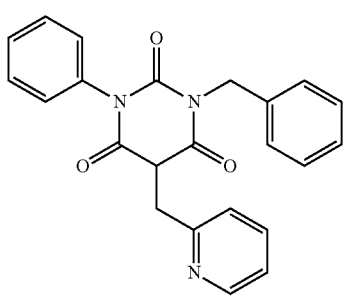
A-43
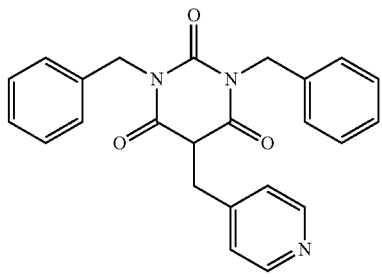
A-44
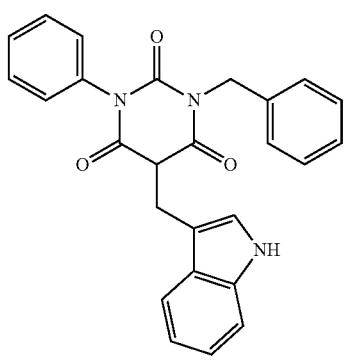
A-45
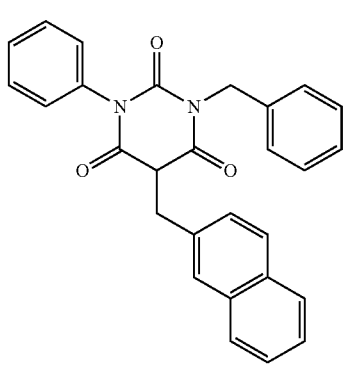
A-46
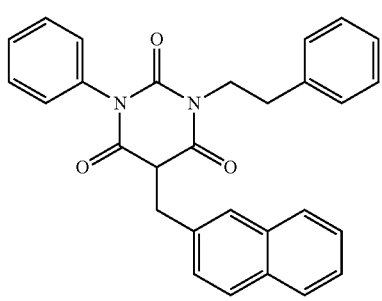
A-47
A-48

It is known that the compound represented by Formula I can be synthesized by a method for synthesizing a barbituric acid which condenses a urea derivative with a malonic acid derivative. The barbituric acid having two substituents on a nitrogen atom can be obtained by heating N,N'-disubstituted urea and malonic acid chloride or by mixing together N,N'-disubstituted urea, malonic acid, and an activator such as acetic anhydride. It is possible to preferably use the methods described in Journal of the American Chemical Society, Vol. 61, page 1015 (1939), Journal of Medicinal Chemistry, Vol. 54, page 2409 (2011), Tetrahedron Letters, Vol. 40, page 8029 (1999), pamphlet of WO2007/150011A, and the like.

The malonic acid used for condensation may be unsubstituted or have a substituent. In a case where the malonic acid having a substituent corresponding to $R_5$ is used, the compound represented by Formula I can be synthesized by constructing a barbituric acid. When the unsubstituted malonic acid is condensed with a urea derivative, a barbituric acid in which the 5-position is unsubstituted is obtained. Accordingly, by modifying the 5-position, the compound represented by Formula I may be synthesized.

As the method for modifying the 5-position, it is possible to use a nucleophilic substitution reaction with halogenated alkyl or an addition reaction such as a Michael addition reaction. Furthermore, it is also possible to preferably use a method of generating an alkylidene or arylidene compound through dehydrocondensation with an aldehyde or ketone and then reducing a double bond. For example, a reduction method using zinc is described in Tetrahedron Letters, Vol. 44, page 2203 (2003), a reduction method using catalytic reduction is described in Tetrahedron Letters, Vol. 42, page 4103 (2001) or Journal of the American Chemical Society, Vol. 119, page 12849 (1997), and a reduction method using $NaBH_4$ is described in Tetrahedron Letters, Vol. 28, page 4173 (1987) and the like. All of these methods are synthesis methods which can be preferably used in a case where the compound has an aralkyl group or a cycloalkyl group in the 5-position.

The synthesis method of the compound represented by Formula I is not limited to the above.

The content of the compound represented by Formula I in the support is not particularly limited. The content of the compound, with respect to 100 parts by mass of the resin forming the support, is preferably 0.1 to 20 parts by mass, more preferably 0.2 to 15 parts by mass, and particularly preferably 0.3 to 10 parts by mass.

In a case where the amount of the compound represented by Formula I added is within the above range, moisture permeability can be effectively reduced, and the occurrence of haze is suppressed.

The compound represented by Formula I may be added in the form of a hydrate, a solvate, or a salt. In the present invention, a hydrate may contain an organic solvent, and a solvate may contain water. That is, "hydrate" and "solvate" include a mixed solvate containing both water and an organic solvent.

Examples of the solvent that the solvate contains include all of the general organic solvents. Specifically, examples of the solvent include an alcohol (such as methanol ethanol, 2-propanol, 1-butanol, 1-methoxy-2-propanol, or t-butanol), an ester (such as ethyl acetate), a hydrocarbon (the hydrocarbon may be an aliphatic hydrocarbon or an aromatic hydrocarbon, such as toluene, hexane, or heptane), an ether (such as diethyl ether or tetrahydrofuran), a nitrite (such as acetonitrile), a ketone (such as acetone or 2-butanone), and the like. The solvent is preferably a solvate of an alcohol, and more preferably methanol, ethanol, 2-propanol, or 1-butanol. These solvents may be a reaction solvent which is used at the time of synthesis of the compound represented by Formula I, a solvent which is used at the time of crystallization and purification following the synthesis, or a mixed solvent of these.

The solvate may contain two or more kinds of solvents simultaneously. Furthermore, the solvent may contain water and a solvent (for example, water and alcohol (such as methanol, ethanol, or t-butanol), or the like).

The salt includes an acid addition salt formed using an inorganic or organic acid. Examples of the inorganic acid include a hydrohalogenic acid (hydrochloric acid or hydrobromic acid), sulfuric acid, phosphoric acid, and the like. Examples of the organic acid include acetic acid, trifluoroacetic acid, oxalic acid, citric acid, alkane sulfonic acid (methane sulfonic acid), and aryl sulfonic acid (benzene sulfonic acid, 4-toluene sulfonic acid, or 1,5-naphthalene sulfonic acid).

Examples of the salt include salts formed when an acidic portion existing in the parent compound is substituted with a metal ion (such as an alkali metal sail including a sodium or potassium salt, an alkaline earth metal salt including a calcium or magnesium salt, an ammonium salt alkali metal ion, an alkaline earth metal ion, or an aluminum ion) or adjusted using an organic base (ethanolamine, diethanolamine, triethanolamine, morpholine, or piperidine). However, the salt is not limited to these. Among these, a sodium salt and a potassium salt are preferable.

(Polycondensed Ester Plasticizer)

An aspect is also preferable in which a film additionally containing a polycondensed ester compound is used in the support. More specifically, the support preferably contains a polycondensed ester plasticizer as a polycondensed ester compound. By incorporating the polycondensed ester plasticizer into the support, the visibility of the display can be improved even in a case where the film thickness of the support is reduced.

The polycondensed ester plasticizer is obtained through the polycondensation of at least one kind of dicarboxylic acid represented by the following Formula (a) and at least one kind of diol represented by the following Formula (b).

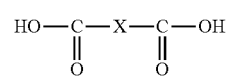

Formula (a)

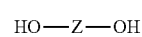

Formula (b)

In Formulae (a) and (b). X represents a divalent aliphatic group having 2 to 18 carbon atoms or a divalent aromatic group having 6 to 18 carbon atoms, and Z represents a divalent aliphatic group having 2 to 8 carbon atoms.

The divalent aliphatic group having 2 to 18 carbon atoms represented by X may be saturated or unsaturated and may be any of divalent chain-like and cyclic aliphatic groups (such as a cycloalkylene group). In a case where the divalent aliphatic group is a divalent chain-like aliphatic group, it may be linear or branched. The number of carbon atoms in the divalent aliphatic group is more preferably 2 to 12, and even more preferably 2 to 6. Particularly, the divalent aliphatic group having 2 to 18 carbon atoms is preferably a divalent chain-like saturated aliphatic group, more preferably a chain-like alkylene group, and even more preferably a linear alkylene group. Examples of the chain-like aliphatic group having 2 to 18 carbon atoms include ethylene, trimethylene, tetramethylene, pentamethylene, hexamethylene, heptamethylene, ocatmethylene, decamethlyene, dodecamethylene, propylene, 2-methyltrimethylene, 2,2-dimethyltrimethylene, cyclopentylene, cyclohexylene, and the like.

The divalent aromatic ring having 6 to 18 carbon atoms represented by X may be a divalent aromatic hydrocarbon group or a divalent aromatic heterocyclic group. The number of carbon atoms in the divalent aromatic group is preferably 6 to 15, and more preferably 6 to 12. The aromatic ring in the divalent aromatic hydrocarbon group is preferably a benzene ring, a naphthalene ring, an anthracene ring, a biphenyl ring, or a terphenyl ring, and more preferably a benzene ring, a naphthalene ring, or a biphenyl ring. It is preferable that the aromatic heterocyclic ring in the divalent aromatic heterocyclic group contains at least one of an oxygen atom, a nitrogen atom, and a sulfur atom as a ring-constituting atom. The aromatic heterocyclic ring is preferably a furan ring, a pyrrole ring, a thiophene ring, an imidazole ring, a pyrazole ring, a pyridine ring, a pyrazine ring, a pyridazine ring, a triazole ring, a triazine ring, an indole ring, an indazole ring, a purine ring, a thiazoline ring, a thiadiazole ring, an oxazoline ring, an oxazole ring, an oxadiazole ring, a quinoline ring, an isoquinoline ring, a phthalazine ring, a naphthyridine ring, a quinoxaline ring, a quinazoline ring, a cinnoline ring, a pteridine ring, an acridine ring, a phenanthroline ring, a phenazine ring, a tetrazole ring, a benzimidazole ring, a benzoxazole ring, a benzothiazole ring, a banzotriazole ring, or a tetrazaindene ring, and more preferably a pyridine ring, a triazine ring, or a quinoline ring.

Z represents a divalent aliphatic group having 2 to 8 carbon atoms. The divalent aliphatic group having 2 to 8 carbon atoms may be saturated or unsaturated, and may be any of divalent chain-like and cyclic aliphatic groups (such as a cycloalkylene group). In a case where the divalent aliphatic group is a divalent chain-like aliphatic group, it may be a divalent linear or branched aliphatic group. The number of carbon atoms in the divalent aliphatic group is more preferably 2 to 6, and even more preferably 2 to 4. Particularly, the divalent aliphatic group having 2 to 8 carbon atoms is preferably a divalent chain-like saturated aliphatic group, more preferably a chain-like alkylene group, and even more preferably a linear alkylene group. Examples of the chain-like alkylene group having 5 to 10 carbon atoms include ethylene, trimethylene, tetramethylene, pentamethylene, hexamethylene, heptamethylene, octamethylene, decamethylene, propylene, 2-methyltrimethylene, 2,2-dimethyltrimethylene, and the like.

Examples of the divalent cycloalkylene group include cyclopentylene and cyclohexylene.

The aliphatic diol represented by Formula (b) is more preferably at least one kind of diol selected from ethylene glycol, 1,2-propanediol, and 1,3-propanediol. From the viewpoint of preventing crystallization of the polycondensed ester plasticizer, the diol is particularly preferably at least one kind of diol selected from ethylene glycol and 1,2-propanediol.

The amount of an ethylene glycol residue contained in an aliphatic diol residue of the polycondensed ester plasticizer is preferably 10 mol % to 100 mol %, and more preferably 20 mol % to 100 mol %.

The polycondensed ester plasticizer is preferably a compound obtained from at least one kind of dicarboxylic acid (referred to as aromatic dicarboxylic acid as well) in which X represents the aforementioned divalent aromatic group and at least one kind of diol (referred to as aliphatic diol as well) in which Z represents the aforementioned aliphatic group. The average number of carbon atoms in the aliphatic diol used is preferably 2.5 to 8.0. Furthermore, a polycondensed ester plasticizer is also preferable which is obtained from a mixture of at least one kind of aromatic dicarboxylic acid and at least one kind of dicarboxylic acid (referred to as aliphatic dicarboxylic acid as well) in which X represents the aforementioned divalent aliphatic group and at least one kind of aliphatic diol in which the average number of carbon atoms is 2.5 to 8.0.

The average number of carbon atoms in the dicarboxylic acid or the dicarboxylic acid residue described regarding the polycondensed ester plasticizer is a value obtained by dividing the total number of carbon atoms contained in ail of the dicarboxylic acid used or in all of the dicarboxylic acid residues in the polycondensed ester plasticizer by the mole number of the dicarboxylic acids used or the mole number of the dicarboxylic acid residues in the polycondensed ester plasticizer. For example, in a case, where an adipic acid residue and a phthalic acid residue constituting all of the dicarboxylic acid residues each account for 50 mol % of the dicarboxylic acid residues, the average number of carbon atoms in the dicarboxylic acid residues becomes 7.0. The average number of carbon atoms in the diol or the diol residue is calculated in the same manner. For example, in a case where the diol residue is constituted with 50 mol % of an ethylene glycol residue and 50 mol % of 1,2-propanediol, the average number of carbon atoms in the diol residue becomes 2.5.

The number-average molecular weight (Mn) of the polycondensed ester plasticizer is preferably 500 to 2,000, more preferably 600 to 1,500, and even more preferably 700 to 1,200. In a case where the number-average molecular weight of the polycondensed ester plasticizer is equal to or greater than 500, the volatilizing properties are reduced. Accordingly, a defect in film or process contamination caused when the plasticizer volatizes under a high-temperature condition at the time of stretching the support is inhibited.

In a case where the number-average molecular weight is equal to or less than 2,000, the plasticizer becomes highly compatible with the support, and hence the bleed-out that occurs at the time of film formation or stretching with heating is inhibited.

The number-average molecular weight of the polycondensed ester plasticizer can be measured and evaluated by gel permeation chromatography. In a case of polyester polyol having an uncapped terminal, the number-average molecular weight can be calculated using the amount of hydroxyl groups per mass (hereinafter, referred to as hydroxyl number as well). In the present invention, the hydroxyl number can be obtained by acetylating the polyester polyol and then measuring the amount (mg) of potassium hydroxide necessary for neutralizing an excess of acetic acid.

In a case where the mixture of the aromatic dicarboxylic acid and the aliphatic dicarboxylic acid is used as a dicarboxylic acid component, the average number of carbon atoms in the dicarboxylic acid component is preferably 5.5 to 10.0, and more preferably 5.6 to 8.

In a case where the average number of carbon atoms is equal to or greater than 5.5, a polarizing plate having better durability can be obtained. In a case where the average number of carbon atoms is equal to or less than 10.0, the compatibility of the plasticizer with the support is further improved, and hence the bleed-out that occurs in the process of forming a film is inhibited.

The polycondensed ester obtained using the aromatic dicarboxylic acid contains an aromatic dicarboxylic acid residue.

The proportion of the aromatic dicarboxylic acid residue in the dicarboxylic acid residues in the polycondensed ester plasticizer is preferably equal to or higher than 40 mol %, and more preferably 40 mol % to 100 mol %.

If the proportion of the aromatic dicarboxylic acid residue in the dicarboxylic acid residues is 40 mol % to 100 mol %, in a case where the material forming the support is a cellulose-based polymer, the plasticizer is excellently compatible with the cellulose-based polymer, and the bleed-out is inhibited at the time of forming a film and at the time of stretching with heating.

The dicarboxylic acid residue is a partial structure of the polycondensed ester, and for example, a dicarboxylic acid residue formed of dicarboxylic acid $HOC(=O)—X—CO_2H$ is $—C(=O)—X—C(=O)—$.

The aromatic dicarboxylic acid which can be used for the synthesis of the polycondensed ester plasticizer is preferably at least one kind of compound selected from phthalic acid, terephthalic acid, isophthalic acid, 1,5-naphthalenedicarboxylic acid, 1,4-naphthalenedicarboxylic acid, 1,8-naphthalenedicarboxylic acid, 2,8-naphthalenedicarboxylic acid, and 2,6-naphthalenedicarboxylic acid. Among these, at least one kind of compound selected from phthalic acid, terephthalic acid, and 2,6-naphthalenedicarboxylic acid is more preferable, and at least one kind of compound selected from phthalic acid and terephthalic acid is even more preferable.

The polycondensed ester obtained using the aliphatic dicarboxylic acid contains an aliphatic dicarboxylic acid residue.

The aliphatic dicarboxylic acid used for the synthesis of the polycondensed ester plasticizer is preferably at least one kind of compound selected from oxalic acid, malonic acid, succinic acid, maleic acid, fumaric acid, glutaric acid, adipic acid, pimelic acid, suberic acid, azelaic acid, sebacic acid, dodecanedicarboxylic acid, and 1,4-cyclohexanedicarboxylic acid.

The average number of carbon atoms in the aliphatic dicarboxylic acid residue is preferably 5.5 to 10.0, more preferably 5.5 to 8.0, and even more preferably 5.5 to 7.0. In a case where the average number of carbon atoms in the aliphatic dicarboxylic acid residue is equal to or less than 10.0, the loss of the compound on heating can be reduced, and it is possible to prevent the occurrence of planar failure considered to be caused by the process contamination resulting from the bleed-out at the time of web drying. It is preferable that the average number of carbon atoms in the aliphatic dicarboxylic acid residue is equal to or greater than 5.5, because then the compatibility becomes excellent, and the precipitation of the polycondensed ester plasticizer does not easily occur.

Specifically, the aliphatic dicarboxylic acid residue in the polycondensed ester plasticizer preferably contains a succinic acid residue. In a case where the polycondensed ester plasticizer contains two or more kinds of aliphatic dicarboxylic acid residues, the aliphatic dicarboxylic acid residues preferably contain a succinic acid residue and an adipic acid residue.

The polycondensed ester plasticizer contains a diol residue.

The diol residue formed of the diol compound (HO—Z—OH) represented by Formula (b) is —O—Z—O—.

The polycondensed ester plasticizer preferably contains an aliphatic diol residue in which the average number of carbon atoms is 2.0 to 7.0, and more preferably contains an aliphatic diol residue in which the average number of carbon atoms is 2.0 to 4.0.

If the average number of carbon atoms of the aliphatic diol residue is equal to or less than 7.0, in a case where the material forming the support is a cellulose-based polymer, the compatibility between plasticizer and the cellulose-based polymer is improved, bleed-out does not easily occur. Furthermore, the loss of the compound on heating does not easily increase, and the occurrence of planar failure considered to be caused by the process contamination at the time of web drying is inhibited. In a case where the average number of carbon atoms in the aliphatic diol residue is equal to or greater than 2.0, the plasticizer is easily synthesized. Specifically, it is preferable that the aliphatic diol residue in the polycondensed ester plasticizer contains ethanediol propanediol, and cyclohexanedimethanol.

The terminal of the polycondensed ester plasticizer may remain as a diol or carboxylic acid without being capped (that is, the terminal of the polymer chain is —OH or —CO₂H). Alternatively, by reacting monocarboxylic acid with the —OH terminal and monoalcohol with the —CO₂H terminal, so-called end-capping may be performed. By capping the terminal of the polycondensed ester plasticizer, the plasticizer does not easily become a solid state at normal temperature, and handling of the plasticizer becomes excellent. Furthermore, even in a case where the film thickness of the support is reduced, the visibility of the display can be improved.

The monocarboxylic acid used for capping is preferably at least one kind of acid selected from acetic acid, propionic acid, butanoic acid, and benzoic acid is preferable. The monoalcohol used for capping is preferably at least one kind of alcohol selected from methanol, ethanol, propanol, isopropanol, butanol, and isobutanol, and most preferably methanol. In a case where the number of carbon atoms in the monocarboxylic acid used for the terminal of the polycondensed ester is equal to or less than 7, the loss of the compound on heating is reduced, and the occurrence of planar failure is excellently inhibited.

Specific examples J-1 to J-44 of the polycondensed ester plasticizer are shown in the following Table 1, but the present invention is not limited thereto.

TABLE 1

| | Dicarboxylic acid | | | diol | | | |
|---|---|---|---|---|---|---|---|
| No. | Aromatic dicarboxylic acid | Aliphatic dicarboxylic acid | Molar ratio between dicarboxylic acids (mol %) | Diol 1 | Diol 2 | Ratio between diols (mol %) | Terminal |
| J-1 | TPA | SA | 45/55 | Ethanediol | Propanediol | 45/55 | Acetyl ester group |
| J-2 | TPA | SA | 50/50 | Ethanediol | Propanediol | 45/55 | Acetyl ester group |
| J-3 | TPA | SA | 55/45 | Ethanediol | Propanediol | 45/55 | Acetyl ester group |

TABLE 1-continued

| | Dicarboxylic acid | | | diol | | | |
|---|---|---|---|---|---|---|---|
| No. | Aromatic dicarboxylic acid | Aliphatic dicarboxylic acid | Molar ratio between dicarboxylic acids (mol %) | Diol 1 | Diol 2 | Ratio between diols (mol %) | Terminal |
| J-4 | TPA | SA | 65/35 | Ethanediol | Propanediol | 45/55 | Acetyl ester group |
| J-5 | TPA | SA | 55/45 | Ethanediol | Propanediol | 25/75 | Acetyl ester group |
| J-6 | TPA | SA | 55/45 | Ethanediol | Propanediol | 10/90 | Acetyl ester group |
| J-7 | 2,6-NPA | SA | 50/50 | Ethanediol | Propanediol | 25/75 | Acetyl ester group |
| J-8 | 2,6-NPA | SA | 50/50 | Ethanediol | Propanediol | 45/55 | Acetyl ester group |
| J-9 | TPA/PA | SA | 45/5/50 | Ethanediol | Propanediol | 45/55 | Acetyl ester group |
| J-10 | TPA/PA | SA | 40/10/50 | Ethanediol | Propanediol | 45/55 | Acetyl ester group |
| J-11 | TPA | SA/AA | 50/30/20 | Ethanediol | Propanediol | 45/55 | Acetyl ester group |
| J-12 | TPA | SA/AA | 50/20/30 | Ethanediol | Propanediol | 45/55 | Acetyl ester group |
| J-13 | TPA | SA | 50/50 | Ethanediol | Propanediol | 25/75 | Acetyl ester group |
| J-14 | TPA | SA | 80/20 | Ethanediol | Propanediol | 45/55 | Acetyl ester group |
| J-15 | TPA | SA | 55/45 | Ethanediol | Cyclohexanedimethanol | 45/55 | Acetyl ester group |
| J-16 | TPA | SA | 45/55 | Ethanediol | Propanediol | 45/55 | Hydroxyl group |
| J-17 | TPA | SA | 50/50 | Ethanediol | Propanediol | 45/55 | Hydroxyl group |
| J-18 | TPA | SA | 55/45 | Ethanediol | Propanediol | 45/55 | Hydroxyl group |
| J-19 | TPA | SA | 65/35 | Ethanediol | Propanediol | 45/55 | Hydroxyl group |
| J-20 | TPA | SA | 55/45 | Ethanediol | Propanediol | 25/75 | Hydroxyl group |
| J-21 | TPA | SA | 55/45 | Ethanediol | Propanediol | 10/90 | Hydroxyl group |
| J-22 | 2,6-NPA | SA | 50/50 | Ethanediol | Propanediol | 25/75 | Hydroxyl group |
| J-23 | 2,6-NPA | SA | 50/50 | Ethanediol | Propanediol | 45/55 | Hydroxyl group |
| J-24 | 2,6-NPA | SA | 45/5/50 | Ethanediol | Propanediol | 25/75 | Hydroxyl group |
| J-25 | 2,6-NPA | SA | 40/10/50 | Ethanediol | Propanediol | 25/75 | Hydroxyl group |
| J-26 | TPA | SA/AA | 50/30/20 | Ethanediol | Propanediol | 25/75 | Hydroxyl group |
| J-27 | TPA | SA/AA | 50/20/30 | Ethanediol | Propanediol | 25/75 | Hydroxyl group |
| J-28 | TPA | SA | 50/50 | Ethanediol | Propanediol | 25/75 | Hydroxyl group |
| J-29 | TPA | SA | 80/20 | Ethanediol | Propanediol | 25/75 | Hydroxyl group |
| J-30 | TPA | SA | 55/45 | Ethanediol | Cyclohexanedimethanol | 25/75 | Hydroxyl group |
| J-31 | TPA | SA | 55/45 | Ethanediol | Propanediol | 45/55 | Propionyl ester group |
| J-32 | TPA | — | 100/0 | Ethanediol | Propanediol | 50/50 | Hydroxyl group |
| J-33 | TPA | — | 100/0 | Ethanediol | Propanediol | 40/60 | Acetyl ester group |
| J-34 | TPA | SA | 50/50 | Ethanediol | Propanediol | 45/55 | Benzoyl ester group |
| J-35 | TPA | SA | 55/45 | Ethanediol | Propanediol | 50/50 | Hydroxyl group |
| J-36 | TPA | SA | 55/45 | Ethanediol | Propanediol | 50/50 | Acetyl ester group |
| J-37 | TPA | SA | 80/20 | Ethanediol | Propanediol | 50/50 | Hydroxyl group |
| J-38 | TPA | SA | 80/20 | Ethanediol | Propanediol | 50/50 | Acetyl ester group |
| J-39 | PA | AA | 10/90 | Ethanediol | — | 100/0 | Acetyl ester group |
| J-40 | PA | AA | 25/75 | Ethanediol | — | 100/0 | Acetyl ester group |
| J-41 | PA | AA | 50/50 | Ethanediol | — | 100/0 | Acetyl ester group |
| J-42 | PA | — | 100/0 | Ethanediol | — | 100/0 | Acetyl ester group |
| J-43 | — | AA | 0/100 | Ethanediol | Propanediol | 70/30 | Acetyl ester group |
| J-44 | — | AA | 0/100 | Ethanediol | Propanediol | 50/50 | Acetyl ester group |

Regarding the abbreviations in Table 1, PA represents phthalic acid, TPA represents terephthalic acid, AA represents adipic acid, SA represents succinic acid, and 2,6-NPA represents 2,6-naphthalenedicarboxylic acid.

The polycondensed ester plasticizer can be easily synthesized by any method such as a thermal melt condensation method performed by causing an esterification reaction or an ester exchange reaction between a diol and dicarboxylic acid by a common method or an interfacial condensation method performed using acid chloride of the aforementioned acids and glycols. The polycondensed ester is specifically described in "Plasticizer, The Theory and Application" (Koichi Murai, SAWAI SHOBO, first edition published on Mar. 1, 1973), and the compounds described in the document can also be used.

In the present invention, as the polycondensed ester plasticizer, it is possible to use fee compounds described in JP1993-155809A (JP-H05-155809A), JP1993-155810A (JP-H05-155810A), JP1993-197073A (JP-H05-197073A), JP2006-259494A, JP1995-330670A (JP-H07-330670A), JP2006-342227A, JP2007-003679A, and the like.

(Carbohydrate Derivative Plasticizer)

An aspect is also preferable in which the film additionally containing a carbohydrate derivative plasticizer is used in the support. By incorporating the carbohydrate derivative plasticizer into the support, even in a case where the film thickness of the support is reduced, the visibility of the display can be improved.

The carbohydrate derivative plasticizer is preferably a derivative of carbohydrate containing monosaccharide or 2 to 10 monosaccharide units.

In the monosaccharide or polysaccharide preferably constituting the carbohydrate derivative plasticizer some or all of substitutable groups (for example, a hydroxyl group, a carboxyl group, an amino group, and a mercapto group) in a molecule are substituted with a substituent. Examples of the substituent that the carbohydrate derivative plasticizer can have include an alkyl group, an aryl group, an acyl group, and the like, and these will be specifically described later. Examples of the substituent also include an ether structure formed by substituting a hydroxyl group with an alkyl group or an aryl group, an ester structure formed by substituting a hydroxyl group with an acyl group, an amide or imide structure formed by substituting a hydroxyl group with an amino group, and the like.

As the carbohydrate containing monosaccharide or 2 to 10 monosaccharide units, erythrose, threose, ribose, arabinose, xylose, lyxose, allose, altrose, glucose, fructose, mannose, gulose, idose, galactose, talose, trehalose, isotrehalose, neotrehalose, trehalosamine, kojibiose, nigerose, maltose, maltitol, isomaltose, sophorose, laminaribiose, cellobiose, gentiobiose, lactose, lactosamine, lactitol, lactulose, melibiose, primeverose, rutinose, scillabiose, sucrose, sucralose, turanose, vicianose, cellotriose, chacotriose, gentianose, isomaltotriose, isopanose, maltolriose, manninotriose, melezitose, panose, planteose, raffinose, solatriose, umbelliferose, lycotetraose, maltotetraose, stachyose, maltopentaose, verbascose, maltohexaose, α-cyclodextrin, β-cyclodextrin, γ-cyclodextrin, δ-cyclodextrin, xylitol, sorbitol, and the like are preferable.

Among these, ribose, arabinose, xylose, lyxose, glucose, fructose, mannose, galactose, trehalose, maltose, cellobiose, lactose, sucrose, sucralose, α-cyclodextrin, β-cyclodextrin, γ-cyclodextrin, δ-cyclodextrin, xylitol, and sorbitol are more preferable, arabinose, xylose, glucose, fructose, mannose, galactose, maltose, cellobiose, sucrose, β-cyclodextrin, and γ-cyclodextrin are even more preferable, and xylose, glucose, fructose, mannose, galactose, maltose, cellobiose, sucrose, xylitol, and sorbitol are particularly preferable.

As the substituent that the carbohydrate derivative plasticizer has, an alkyl group (preferably an alkyl group having 1 to 22 carbon atoms, more preferably an alkyl group having 1 to 12 carbon atoms, and particularly preferably an alkyl group having 1 to 8 carbon atoms, such as a methyl, ethyl, propyl, hydroxyethyl, hydroxy propyl, 2-cyanoethyl, or benzyl group), an aryl group (preferably an aryl group having 6 to 24 carbon atoms, more preferably an aryl group having 6 to 18 carbon atoms, and particularly preferably an aryl group having 6 to 12 carbon atoms, such as phenyl or naphthyl), and an acyl group (including an alkylcarbonyl group, an arylcarbonyl group, or a heterocyclic carbonyl group; preferably an acyl group having 1 to 22 carbon atoms, more preferably an acyl group having 2 to 12 carbon atoms, and particularly preferably an acyl group having 2 to 8 carbon atoms, such as acetyl, propionyl, butyryl, pentanoyl, hexanoyl, octanoyl, benzoyl, toluyl, phthalyl, or naphtol) are preferable. Examples of preferred structures formed by substituting a hydroxyl group with an amino group include an amide structure (preferably amide having 1 to 22 carbon atoms, more preferably amide having 2 to 12 carbon atoms, and particularly preferably amide having 2 to 8 carbon atoms, such as formamide or acetamide) and an imide structure (preferably imide having 4 to 22 carbon atoms, more preferably imide having 4 to 12 carbon atoms, and particularly preferably imide having 4 to 8 carbon atoms, such as succinimide or phthalimide).

The substituent that the carbohydrate derivative plasticizer has is more preferably at least one kind of substituent selected from an alkyl group, an aryl group, and an acyl group, and even more preferably an acyl group.

Preferred examples of the carbohydrate derivative plasticizer include the following compounds, but the present invention is not limited thereto.

At least one kind of compound selected from xylose tetraacetate, glucose pentaacetae, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabutyrate, glucose pentabutyrate, fructose pentabutyrate, mannose pentabutyrate, galactose pentabutyrate, maltose octabutyrate, cellobiose octabutyrate, sucrose octabutyrate, xylitol pentabutyrate, sorbitol hexabutyrate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

More preferably, at least one kind of compound selected from xylose tetraacetate, glucose pentaacetae, fructose pentaacetate, mannose pentaacetate, galactose pentaacetate, maltose octaacetate, cellobiose octaacetate, sucrose octaacetate, xylitol pentaacetate, sorbitol hexaacetate, xylose tetrapropionate, glucose pentapropionate, fructose pentapropionate, mannose pentapropionate, galactose pentapropionate, maltose octapropionate, cellobiose octapropionate, sucrose octapropionate, xylitol pentapropionate, sorbitol hexapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

Even more preferably, at least one kind of compound selected from maltose octaacetate, cellobiose octaacetate, sucrose octaacetate, xylose tetrapropionate, glucose pentapropionate, fructose pentapropionate, mannose pentapropionate, galactose pentapropionate, maltose octapropionate, cellobiose octapropionate, sucrose octapropionate, xylose tetrabenzoate, glucose pentabenzoate, fructose pentabenzoate, mannose pentabenzoate, galactose pentabenzoate, maltose octabenzoate, cellobiose octabenzoate, sucrose octabenzoate, xylitol pentabenzoate, and sorbitol hexabenzoate.

It is preferable that the carbohydrate derivative plasticizer has a pyranose structure or a furanose structure.

As the carbohydrate derivative plasticizer, the following compounds are particularly preferable, but the carbohydrate derivative plasticizer which can be used in the present invention is not limited to the compounds.

In the following structures, R each independently represents an arbitrary substituent, and a plurality of R's may be the same as or different from each other.

Among the following Tables 2 to 5, for example, in Table 2, the compound consisting of 8 hydroxyl groups (all of R's represent a hydrogen atom) is acylated using two kinds of acylating agents, one of R's introduced into the compound by the two kinds of acylating agents is represented by "substituent 1", the other R is represented by "substituent 2", and a degree of substitution is represented by the number of substituents in the total of 8 hydroxyl groups.

The number of R's is 5 in total in Table 3 and 8 in total in Tables 4 and 5. Herein, "phenylacetyl" represents —C(=O)—CH$_2$—C$_6$H$_5$.

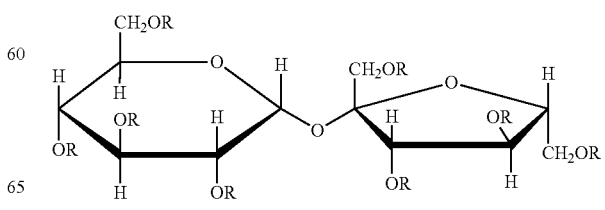

TABLE 2

| Compound | Substituent 1 Type | Degree of substitution | Substituent 2 Type | Degree of substitution | Molecular weight |
|---|---|---|---|---|---|
| K-101 | Acetyl | 7 | Benzyl | 1 | 727 |
| K-102 | Acetyl | 6 | Benzyl | 2 | 775 |
| K-103 | Acetyl | 7 | Benzoyl | 1 | 741 |
| K-104 | Acetyl | 6 | Benzyl | 2 | 802 |
| K-105 | Benzyl | 2 | N/A | 0 | 523 |
| K-106 | Benzyl | 3 | N/A | 0 | 613 |
| K-107 | Benzyl | 4 | N/A | 0 | 702 |
| K-108 | Acetyl | 7 | Phenyl-acetyl | 1 | 771 |
| K-109 | Acetyl | 6 | Phenyl-acetyl | 2 | 847 |
| K-110 | Benzoyl | 1 | N/A | 0 | 446 |
| K-111 | Benzoyl | 2 | N/A | 0 | 551 |
| K-112 | Benzoyl | 3 | N/A | 0 | 655 |
| K-113 | Benzoyl | 4 | N/A | 0 | 759 |
| K-114 | Benzoyl | 5 | N/A | 0 | 863 |
| K-115 | Benzoyl | 6 | N/A | 0 | 967 |
| K-116 | Benzoyl | 7 | N/A | 0 | 1071 |
| K-117 | Benzoyl | 8 | N/A | 0 | 1175 |

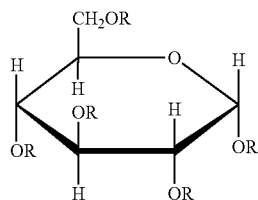

TABLE 3

| Compound | Substituent 1 Type | Degree of substitution | Substituent 2 Type | Degree of substitution | Molecular weight |
|---|---|---|---|---|---|
| K-201 | Acetyl | 4 | Benzoyl | 1 | 468 |
| K-202 | Acetyl | 3 | Benzoyl | 2 | 514 |
| K-203 | Acetyl | 2 | Benzoyl | 3 | 577 |
| K-204 | Acetyl | 4 | Benzyl | 1 | 454 |
| K-205 | Acetyl | 3 | Benzyl | 2 | 489 |
| K-206 | Acetyl | 2 | Benzyl | 3 | 535 |
| K-207 | Acetyl | 4 | Phenyl-acetyl | 1 | 466 |
| K-208 | Acetyl | 3 | Phenyl-acetyl | 2 | 543 |
| K-209 | Acetyl | 2 | Phenyl-acetyl | 3 | 619 |
| K-210 | Phenyl-acetyl | 1 | N/A | 0 | 298 |
| K-211 | Phenyl-acetyl | 2 | N/A | 0 | 416 |
| K-212 | Phenyl-acetyl | 3 | N/A | 0 | 535 |
| k-213 | Phenyl-acetyl | 4 | N/A | 0 | 654 |
| K-214 | Acetyl | 1 | Benzoyl | 4 | 639 |
| K-215 | Acetyl | 0 | Benzoyl | 5 | 701 |

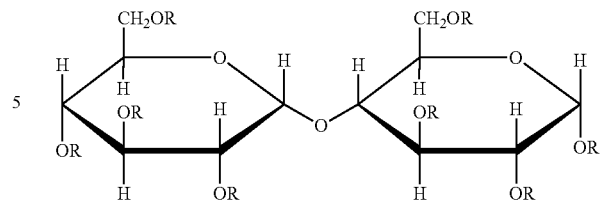

TABLE 4

| Compound | Substituent 1 Type | Degree of substitution | Substituent 2 Type | Degree of substitution | Molecular weight |
|---|---|---|---|---|---|
| K-301 | Acetyl | 6 | benzoyl | 2 | 803 |
| K-302 | Acetyl | 6 | Benzyl | 2 | 775 |
| K-303 | Acetyl | 6 | Phenyl-acetyl | 2 | 831 |
| K-304 | Benzoyl | 2 | N/A | 0 | 551 |
| K-305 | Benzyl | 2 | N/A | 0 | 522 |
| K-306 | Phenyl-acetyl | 2 | N/A | 0 | 579 |

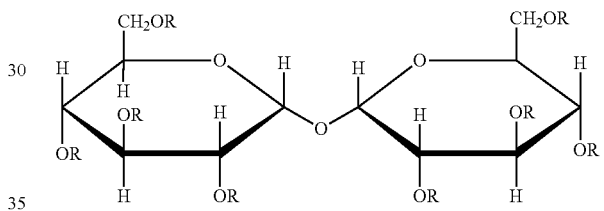

TABLE 5

| Compound | Substituent 1 Type | Degree of substitution | Substituent 2 Type | Degree of substitution | Molecular weight |
|---|---|---|---|---|---|
| K-401 | Acetyl | 6 | Benzoyl | 2 | 803 |
| K-402 | Acetyl | 6 | Benzyl | 2 | 775 |
| K-403 | Acetyl | 6 | Phenyl-acetyl | 2 | 831 |
| K-404 | Benzoyl | 2 | N/A | 0 | 551 |
| K-405 | Benzyl | 2 | N/A | 0 | 523 |
| K-406 | Phenyl-acetyl | 2 | N/A | 0 | 579 |

The carbohydrate derivative plasticizer can be obtained as commercially available products such as those manufactured by TOKYO CHEMICAL INDUSTRY CO., LTD. or Sigma-Aldrich Co. LLC. Furthermore, the carbohydrate derivative plasticizer can be synthesized by an esterification reaction (for example, the method described in JP1996-245678A (JP-H08-245678A)) of commercially available carbohydrate.

The content of the plasticizer in the support is preferably 1 to 20 parts by mass with respect to 100 parts by mass of the material forming the support. In a case where the content of the plasticizer is equal to or greater than 1 part by mass with respect to 100 parts by mass of the material forming the support, the improving effects of the present invention is easily obtained. In a case where the content of the plasticizer is equal to or less than 20 parts by mass, the occurrence of bleed-out is inhibited. The content of the plasticizer in the support, with respect to 100 parts by mass of the material forming the support, is preferably 2 to 15 parts by mass, and particularly preferably 5 to 15 parts by mass.

Two or more kinds of plasticizers described above may be added to the support, in a case where two or more kinds of plasticizers are added, specific examples of the amount of the plasticizer added and a preferred range thereof are the same as described above.

(Deterioration Preventing Agent)

An aspect is also preferable in which a film containing deterioration preventing agents (such as an antioxidant, a peroxide decomposer, a radical inhibitor, a metal deactivator, an acid scavenger, and amine) is used in the support. The ultraviolet absorber is one of fee deterioration preventing agents. The deterioration preventing agents are described in JP1985-235852A (JP-S60-235852A), JP1991-199201A (JP-H03-199201A), JP1993-1907073A (JP-H05-1907073A), JP1993-194789A (JP-H05-194789A), JP1993-271471A (JP-H05-271471A), JP1994-107854A (JP-H06-197854A), JP1994-118233A (JP-H06-118233A), JP1994-148430A (JP-H06-148430A). JP1995-11056A (JP-H07-11056A), JP1995-11055A (JP-H07-11055A). JP1996-29619A (JP-H08-29619A), JP1996-239509A (JP-H08-239509A), and JP2000-204173A.

Furthermore, all of the commercially available stabilizers described in pages 21 to 69 in "Handbook of Polymer Additives" (CMC Publishing CO., LTD.) can be preferably used.

(Antioxidant)

An aspect is also preferable in which a film containing an antioxidant is used in the support. In a case where the support contains an antioxidant, the compound represented by Formula I effectively acts, and hence better improving effects are obtained.

Examples of the antioxidant include phenol- and hydroquinone-based antioxidants such as 2,6-di-butyl-4-methylphenol, 4,4'-thiobis-(6-t-butyl-3-methylphenol), 1,1'-bis(4-hydroxyphenyl)cyclohexane, 2,2'-methylenebis(4-ethyl-6-t-butylphenol), 2,5-di-t-butylhydroquinone, and pentaerythrityl-tetrakis[3-(3,5-di-t-butyl-4-hydroxyphenyl) propionate].

It is also preferable to use phosphoric acid-based antioxidants such as tris(4-methoxy-3,5-diphenyl)phosphite, tris(nonylphenyl)phosphite, tris(2,4-di-t-butylphenyl)phosphite, bis(2,6-di-t-butyl-4-methylphenyl)pentaerythritol diphosphite, and bis(2,4-di-t-butylphenyl)pentacrythritol diphosphite and hydroxylamine-based antioxidants such as N,N-dioctadecylhydroxylamine and N,N-dibenzylhydroxylamine. As the hydroxylamine-based compound, it is possible to preferably use the compounds described in paragraphs [0005] to [0020] and [0022] to [0026] in JP1996-62767A (JP-H08-62767A).

In addition, reductones represented by the following Formula (A) or Formula (B) which will be described later are also preferable as antioxidants used in the support.

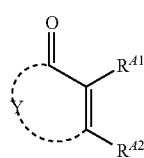

Formula (A)

In Formula (A), $R^{A1}$ and $R^{A2}$ each independently represent a hydroxyl group, an amino group, an acylamino group, an alkylsulfonylamino group, an arylsulfonylamino group, an alkoxycarbonylamino group, a mercapto group, or an alkylthio group. Y represents a group of nonmetallic atoms constituted with a carbon atom, an oxygen atom, and/or a nitrogen atom and constituting a 5- to 6-membered ring together with —C(=O)—C($R^{A1}$)=C($R^{A2}$)—.

$R^{A1}$ and $R^{A2}$ preferably represent a hydroxyl group, an amino group, an alkylsulfonylamino group, or an arylsulfonylamino group, more preferably represent a hydroxyl group or an amino group, and even more preferably represent a hydroxyl group.

It is preferable that Y has at least one —O— and is constituted with a combination of one kind or two or more kinds of groups among —C($R^{A3}$)($R^{A4}$)—, —C($R^{A5}$)=, —C(=O)—, —N(Ra)—, and —N=. $R^{A3}$ to $R^{A5}$ and Ra each independently preferably represent a hydrogen atom, an alkyl group having 1 to 10 carbon atoms that may have a substituent, an and group having 6 to 15 carbon atoms that may have a substituent, a hydroxyl group, or a carboxyl group.

Examples of the aforementioned 5- to 6-membered ring formed through Y include a cyclopentenone ring (2-cyclopenten-1-one ring; the formed compound is reductic acid), a furanone ring [2(5H)-furanone ring], a dihydropyranone ring [3,4-dihydro-2H-pyran-4-one ring (2,3-dihydro-4H-pyrone ring), 3,6-dihydro-2H-pyran-2-one ring, or 3,6-dihydro-2H-pyran-6-one ring (5,6-dihydro-2-pyrone ring)], and 3,4-dihydro-2H-pyrone ring. Among these, cyclopentenone ring, a furanone ring, and a dihydropyrone ring are preferable, a furanone ring and a dihydropyrone ring are more preferable, and furanone ring is particularly preferable.

These rings may be condensed, and the condensed ring may be any of saturated or unsaturated rings.

Among the reductones represented by Formula (A), compounds represented by the following Formula (A1) is preferable. Among these, a compound represented by the following Formula (A2) is preferable.

Formula (A1)

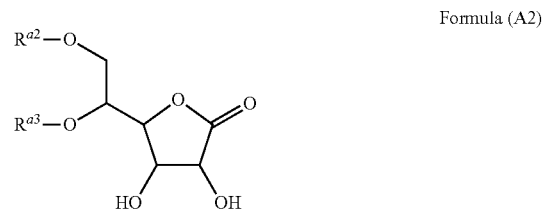

Formula (A2)

In Formula (A1), $R^{a1}$ represents a hydrogen atom, an alkyl group, an aryl group, or a heterocyclic group, and these may have a substituent.

$R^{a1}$ is preferably an alkyl group which may have a substituent, and more preferably —CH(OR$^{a3}$)CH$_2$OR$^{a2}$. In this case, the compound becomes the compound represented by Formula (A2).

In Formula (A2), $R^{a2}$ and $R^{a3}$ each independently represent a hydrogen atom, an alkyl group, an acyl group, or an alkoxycarbonyl group. $R^{a2}$ and $R^{a3}$ may form a ring by being bonded to each other, and the formed ring is preferably a 1,3-dioxolane ring. The ring may additionally have a substituent. The compound having a dioxolane ring can be synthesized through actualization or ketalization caused by a reaction between ascorbic acid and ketone or aldehydes. The ketones or aldehydes as raw materials can be used without particular limitation.

One of particularly preferred combinations of substituents is a compound in which $R^{a2}$ is an acyl group and $R^{a3}$ is a hydrogen atom. The acyl group may be either an aliphatic acyl group or an aromatic acyl group. In a case where the acyl group is an aliphatic acyl group, the number of carbon atoms therein is preferably 2 to 30, more preferably 4 to 24, and even more preferably 8 to 18. In a case where the acyl group is an aromatic acyl group, the number of carbon atoms therein is preferably 7 to 24, more preferably 7 to 22, and even more preferably 7 to 18. Specific examples of preferred acyl groups include butanoyl, hexanoyl, 2-ethylhexanoyl, decanoyl, lauroyl, myristoyl, palmitoyl, stearoyl, palmitoleyl, myristoleyl, oleoyl, benzoyl, 4-methylbenzoyl, and 2-methylbenzoyl.

As the antioxidant used in the support, in addition to the compound represented by Formula (A), a compound represented by the following Formula (B) is also preferable.

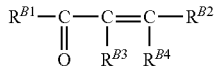

Formula (B)

In Formula (B), $R^{B1}$ and $R^{B2}$ each independently represent a hydrogen atom and alkyl group, an alkenyl group, a cycloalkyl group, an aryl group, an acyl group, a carboxyl group, an amino group, an alkoxy group, an alkoxycarbonyl group, or a heterocyclic group, and $R^{B3}$ and $R^{B4}$ each independently represent a hydroxyl group, an amino group, an acylamino group, an alkylsufonylamino group, an arylsulfonylamino group, an alkoxycarbonylamino group, or a mercapto group.

The alkyl group represented by $R^{B1}$ and $R^{B2}$ preferably has 1 to 10 carbon atoms, and is preferably methyl, ethyl, or t-butyl.

The alkyl group represented by $R^{B1}$ and $R^{B2}$ preferably has 1 to 10 carbon atoms.

The alkenyl group represented by $R^{B1}$ and $R^{B2}$ preferably has 2 to 10 carbon atoms, and is preferably vinyl or allyl and particularly preferably vinyl.

The cycloalkyl group represented by $R^{B1}$ and $R^{B2}$ preferably has 3 to 10 carbon atoms, and is preferably cyclopropyl, cyclopentyl, or cyclohexyl.

The alkyl group, the alkenyl group, and the cycloalkyl group may have a substituent. The substituent is preferably at least one kind of substituent selected from a hydroxyl group, a carboxyl group, and a sulfo group.

In a case where the alkenyl group is vinyl, a vinyl group substituted with a carboxyl group is also preferable.

The aryl group represented by $R^{B1}$ and $R^{B2}$ preferably has 6 to 12 carbon atoms. The aryl group may have a substituent, and the substituent is preferably at least one kind of substituent selected from an alkyl group, a hydroxyl group, a carboxyl group, a sulfo group, a halogen atom, a nitro group, and a cyano group.

The acyl group represented by $R^{B1}$ and $R^{B2}$ is preferably formyl, acetyl, isobutyryl, or benzoyl.

The amino group represented by $R^{B1}$ and $R^{B2}$ includes an amino group, an alkylamino group, and an arylamino group, and is preferably amino, methylamino, dimethylamino, ethylamino, diethylamino, dipropylamino, phenylamino, or N-methyl-N-phenylamino.

The alkoxy group represented by $R^{B1}$ and $R^{B2}$ preferably has 1 to 10 carbon atoms, and is preferably methoxy or ethoxy.

The alkoxycarbonyl group represented by $R^{B1}$ and $R^{B2}$ is preferably methoxycarbonyl.

The heterocyclic group represented by $R^{B1}$ and $R^{B2}$ preferably contains an oxygen atom, a sulfur atom, and a nitrogen atom as heteroatoms constituting the ring, and the ring structure thereof is preferably 5- or 6-membered ring. The heterocyclic group may be an aromatic heterocyclic group or a saturated heterocyclic group, and may be condensed.

The heterocyclic ring in the heterocyclic group is preferably a pyridine ring, a pyrimidine ring, a pyrrole ring, a furan ring, a thiophene ring, a pyrazole ring, a piperidine ring, a piperazine ring, or a morpholine ring.

$R^{B1}$ and $R^{B2}$ more preferably represent an alkyl group having 1 to 6 carbon atoms or an aryl group having 6 to 12 carbon atoms.

The amino group represented by $R^{B3}$ and $R^{B4}$ includes an amino group, an alkylamino group, and an arylamino group, and is preferably an amino group or an alkylamino group such as methylamino, ethylamino, n-butylamino, or hydroxyethylamino.

The acylamino group represented by $R^{B3}$ and $R^{B4}$ is preferably acetylamino or benzoylamino.

The alkylsulfonylamino group represented by $R^{B3}$ and $R^{B4}$ is preferably methylsulfonylamino.

The arylsulfonylamino group represented by $R^{B3}$ and $R^{B4}$ is preferably benzenesulfoneylamino or para-toluenesulfonylamino.

The alkoxycarbonylamino group represented by $R^{B3}$ and $R^{B4}$ is preferably methoxycarbonylamino.

$R^{B3}$ and $R^{B4}$ more preferably represent a hydroxyl group, an amino group, an alkylsulfonylamino group, and an arylsulfonylamino group.

As the antioxidant used in the present invention, reductones are more preferable, and specific examples thereof include the compounds exemplified in paragraphs [0014] to [0034] in JP-H06-27599A, the compounds exemplified in paragraphs [0012] to [0020] in JP1994-110163A (JP-H06-110163A), and the compounds exemplified in paragraphs [0022] to [0031] in JP1996-114899A (JP-H08-114899A).

Among these, a myristic acid ester, a palmitic acid ester, and a stearic acid ester of L-ascorbic acid are particularly preferable.

The liming of adding the antioxidant to the support is not particularly limited as long as the antioxidant is added at a point in time when the film is formed. For example, the antioxidant may be added at the last stage of mixing the support with a solvent or after a mixed solution of the support and a solvent is prepared.

The content of the antioxidant in the support is preferably 0.0001 to 5.0 parts by mass with respect to 100 parts by mass of the support. In a case where the content of the antioxidant is within the above range, a sufficient antioxidative effect and durability of a polarizing plate can be obtained. The content of the antioxidant in the support, with respect to 100 parts by mass of the support, is more preferably 0.001 to 1.0 part by mass, and even more preferably 0.01 parts by mass to 0.5 parts by mass.

(Radical Scavenger)

As the support, a film containing a radical scavenger is also preferably used. In a case where the support contains a radical scavenger, the decomposition of the compound represented by Formula I is inhibited, and better durability of a polarizer is obtained.

As the radical scavenger, a compound (HALS) represented by the following Formula (H) is preferable.

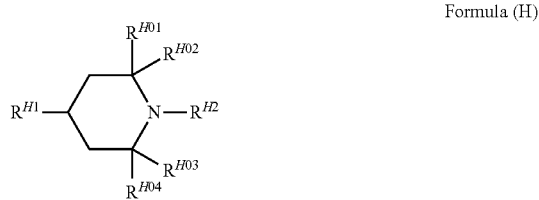

Formula (H)

In Formula (H), $R^{H1}$ and $R^{H2}$ each independently represent a hydrogen atom or a substituent, and $R^{H01}$ to $R^{H04}$ each independently represent an alkyl group.

The substituent represented by $R^{H1}$ is not particularly limited, but is preferably an alkyl group or a substituent bonded to a piperidine ring through a nitrogen atom or an oxygen atom. The substituent bonded to a piperidine ring through a nitrogen atom or an oxygen atom is preferably an amino group, an acylamino group, a hydroxyl group, an alkoxy group, an aryloxy group, or an acyloxy group. These groups may have a substituent.

The substituent represented by $R^{H1}$ is preferably an alkyl group, an aryl group, an amino group having a heterocyclic group, a hydroxyl group, an alkoxy group, or an acyloxy group.

The substituent represented by $R^{H2}$ is not particularly limited, but is preferably an alkyl group (preferably having 1 to 20 carbon atoms, more preferably having 1 to 12 carbon atoms, and even more preferably having 1 to 8 carbon atoms, such as methyl, ethyl, isopropyl, t-butyl, n-octyl, 2-ethylhexyl n-decyl, or n-hexadecyl), an alkenyl group (preferably having 2 to 20 carbon atoms, more preferably having 2 to 12 carbon atoms, and even more preferably having 2 to 8 carbon atoms; the alkenyl group is more preferably vinyl, allyl, 2-butenyl, or 3-pentenyl), an alkynyl group (preferably having 2 to 20 carbon atoms, more preferably having 2 to 12 carbon atoms, and even more preferably having 2 to 8 carbon atoms; the alkynyl group is more preferably propargyl or 3-pentynyl), a cycloalkyl group (preferably having 3 to 20 carbon atoms, more preferably having 3 to 12 carbon atoms, and even more preferably having 3 to 8 carbon atoms; the cycloalkyl group is more preferably cyclopropyl, cyclopentyl, or cyclohexyl), an aryl group (preferably having 6 to 30 carbon atoms, more preferably having 6 to 20 carbon atoms, and even more preferably having 6 to 12 carbon atoms; the aryl group is more preferably phenyl, biphenyl, or naphthyl), an amino group (including an amino group, an alkylamino group, and an arylamino group; the amino group preferably has 0 to 20 carbon atoms, more preferably has 0 to 10 carbon atoms, and even more preferably has 0 to 6 carbon atoms; the amino group is more preferably amino, methylamino, dimethylamino, diethylamino, phenylamino, N-methyl-N-phenylamino, or benzylamino), an alkoxy group (preferably having 1 to 20 carbon atoms, more preferably having 1 to 12 carbon atoms, and even more preferably having 1 to 8 carbon atoms; the alkoxy group is more preferably methoxy, ethoxy, or butoxy), a cycloalkyloxy group (the cycloalkyl ring in the cycloalkyloxy group is preferably a 3- to 8-membered ring; the cycloalkyloxy group preferably has 3 to 20 carbon atoms and is preferably cyclopropyloxy, cyclopentyloxy, or cyclohexyloxy), an acyl group (including an alkylcarbonyl group and an arylcarbonyl group; the acyl group preferably has 2 to 20 carbon atoms, more preferably has 2 to 16 carbon atoms, and even more preferably has 2 to 8 carbon atoms; the acyl group is more preferably acetyl, propionyl, 2-ethylhexanoyl, or benzoyl), a hydroxyl group, or an oxy radical group (—O—).

$R^{H01}$ to $R^{H04}$ preferably represent an alkyl group having 1 to 6 carbon atoms. It is more preferable that $R^{H01}$ to $R^{H04}$ represent ethyl or methyl. It is even more preferable that all of $R^{H01}$ to $R^{H04}$ represent methyl.

The compound represented by Formula (H) is preferably at least one kind of compound selected from 4-hydroxy-2,2,6,6-tetramethylpiperidine, 1-allyl-4-hydroxy-2,2,6,6-tetramethylpiperidine, 1-benzyl-4-hydroxy-2,2,6,6-tetramethylpiperidine, 1-(4-t-butyl-2-butenyl)-4-hydroxy-2,2,6,6-tetramethylpiperidine, 4-stearoyloxy-2,2,6,6-tetramethylpiperidine, 1-ethyl 4-salicyloyloxy-2,2,6,6-tetramethylpiperidine, 4-methacryloyloxy-1,2,2,6,6-pentamethylpiperidine, 1,2,2,6,6-pentamethylpiperidin-4-yl-β(3,5-di-t-butyl-4-hydroxyphenyl)-propionate, 1-benzyl-2,2,6,6-tetramethylpiperidin-4-yl maleate, bis(2,2,6,6-tetramethylpiperidin-4-yl)adipate, bis(2,2,6,6-tetramethylpiperidin-4-yl)sebacate, bis(1,2,3,6-tetramethyl-2,6-diethyl-piperidin-4-yl)sebacate, bis(1-allyl-2,2,6,6-tetramethyl-piperidin-4-yl)phthalate, 1-acetyl-4-acetoxy-2,2,6,6-tetramethylpiperidine, trimellitic acid-tris(2,2,6,-tetramethylpiperidin-4-yl)ester, 1-acryloyl-4-benzyloxy-2,2,6,6-tetramethylpiperidine, dibutyl malonic acid-bis(1,2,2,6,6-pentamethyl-piperidin-4-yl)ester, dibenzyl malonic acid-bis(1,2,3,6-tetramethyl-2,6-diethyl-piperidin-4-yl)ester, dimethyl-bis(2,2,6,6-tetramethylpiperidin-4-yloxy)-silane, tris(1-propyl-2,2,6,6-tetramethylpiperidin-4-yl)-phosphite, tris(1-propyl-2,2,6,6-tetramethylpiperidin-4-yl)-phosphate, N,N'-bis(2,2,6,6-tetramethylpiperidin-4-yl)-hexamethylene-1,6-diamine, tetrakis(2,2,6,6-tetramethylpiperidin-4-yl)-1,2,3,4-butane tetracarboxylate, tetrakis(1,2,2,6,6-pentamethylpiperidin-4-yl)-1,2,3,4-butane tetracarboxylate, N,N'-bis-(2,2,6,6-tetramethylpiperidin-4-yl)-hexamethylene-1,6-diacetamide, 1-acetyl-4-(N-cyclohexylacetamide)-2,2,6,6-tetramethyl-piperidine, 4-benzylamino-2,2,6,6-tetramethylpiperidine, N,N'-bis-(2,2,6,6-tetramethylpiperidin-4-yl)-N,N'-dibutyl adipamide, N,N'-bis(2,2,6,6-tetramethylpiperidin-4-yl) N,N'-dicyclohexyl-(2-hydroxy)propylene diamine, N,N'-bis-(2,2,6,6-tetramethylpiperidin-4-yl)-para-xylylene-diamine, 4-bis(2-hydroxyethyl)amino-1,2,2,6,6-pentamethyl piperidine, 4-methacrylamide-1,2,2,6,6-pentamethyl piperidine, and α-amino-β-methyl-β-[N-(2,2,6,6-tetramethylpiperidin-4-yl)]-amino-acrylic acid methyl ester.

Furthermore, it is preferable to suitably use high-molecular weight HALS in which a plurality of piperidine rings are bonded to each other through a triazine skeleton, such as N,N',N'',N'''-tetrakis-[4,6-bis-(butyl-(N-methyl-2,2,6,6-tetramethylpiperidin-4-yl)amino)-triazin-2-yl]-4,7-diazadecane-1,10-diamine, a polycondensate (CHIMASSORB 2020FDL manufactured by BASF SE) of dibutylamine, 1,3,5-triazine-N,N'-bis(2,2,6,6-tetramethyl-4-piperidyl)-1,6-hexamethylenediamine, and N-(2,2,6,6-tetramethyl-4-piperidyl)butylamine, a polycondensate of dibutylamine, 1,3,5-triazine, and N,N'-bis(2,2,6,6-tetramethyl-4-piperidyl) butylamine, poly[{(1,1,3,3-tetramethylbutyl)amino-1,3,5-triazine-2,4-diyl}{(2,2,6,6-tetramethyl-4-piperidyl) imino}hexamethylene{(2,2,6,6-tetramethyl-4-piperidyl) imino}] (CHIMASSORB 944FDL manufactured by BASF SE), a polycondensate of 1,6-hexanediamine-N,N'-bis(2,2, 6,6-tetramethyl-4-piperidyl) and morpholine-2,4,6-trichloro-1,3,5-triazine, and poly[(6-morpholino-s-triazine-2,4-diyl)][(2,2,6,6,-tetramethyl-4-piperidyl)imino]-hexamethylene[(2,2,6,6-tetramethyl-4-piperidyl)imino]], and high-molecular weight HALS in which piperidine rings are bonded to each other through an ester bond, such as a polycondensate of dimethyl succinate and 4-hydroxy-2,2,6,6-tetramethyl-1-piperidine ethanol and an esterified mixture of 1,2,3,4-butane tetracarboxylic acid, 1,2,2,6,6-pentamethyl-4-piperidinol, and 3,9-bis(2-hydroxy-1,1-dimethylethyl)-2,4,8,10-tetraoxaspiro[5,5]undecane. However, the present invention is not limited to these.

Among these, a compound is preferable which has a number-average molecular weight of 2,000 to 5,000 and is selected from a polycondensate of dibutylamine, 1,3,5-traizine, and N,N'-bis(2,2,6,6-tetramethyl-4-piperidyl)butylamine and a polycondensate of poly{(1,1,3,3-tetramethylbutyl)amino-1,3,5-triazine-2,4-diyl}{(2,2,6,6-tetramethyl-4-piperidyl)imino}hexamethylene{(2,2,6,6-tetramethyl-4-piperidyl)imino}, dimethyl succinate, and 4-hydroxy-2,2,6,6-tetramethyl-1-piperidine ethanol.

As the radical scavenger, a compound (trade name: Sunlizer HA-622 manufactured by SORT CO., LTD.) represented by the following structure (Hα) and a compound represented by the following structure (Hβ) are also suitable.

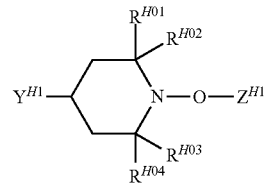

Formula (H1)

In Formula (H1), $Z^{H1}$ represents an alkyl group, a cycloalkyl group, or an aryl group, and $Y^{H1}$ represents a hydrogen atom or a substituent. $R^{H01}$ to $R^{H04}$ have the same definition as $R^{H01}$ to $R^{H04}$ in Formula (H), and the preferred aspect thereof is also the same.

$Z^{H1}$ is preferably an alkyl group which may have a substituent or a cycloalkyl group, more preferably an unsubstituted alkyl group having a branched structure, an alkyl group which may have an aryl group as a substituent, or a cycloalkyl group, and even more preferably a cycloalkyl group. The substituent that $Z^{H1}$ has is not particularly limited.

The number of carbon atoms in the alkyl group represented by $Z^{H1}$ is preferably 1 to 20, and more preferably 1 to 14. The number of carbon atoms in the cycloalkyl group

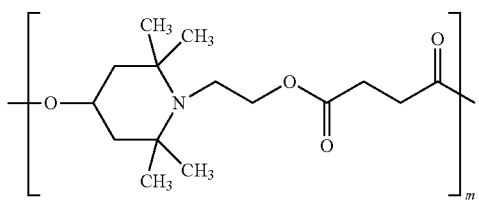

Structure (Hα)

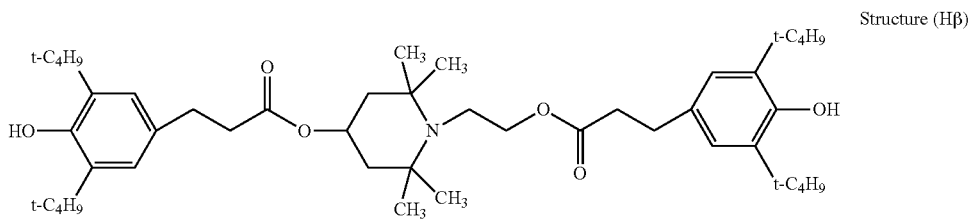

Structure (Hβ)

m in structure (Hα) is 2 to 30.

The compound of the structure (Hα) or (Hβ) is available as those on the market under the trade names of CHIMASSORB 2020FDL (CAS-No. 192268-64-7), CHIMASSORB 944FDL (CAS-No. 71878-19-8), and TINUVIN 770DF (CAS-No. 52829-07-9) manufactured by BASF SE (former Ciba Specialty Chemicals Inc) and under the trade names of CYASORB UV-3346 (CAS-No. 82541-48-7) and CYASORB UV-3529 (CAS-No. 193098-40-7) manufactured by SUN CHEMICAL COMPANY LTD.

A compound represented by the following Formula (H1) can be particularly preferably used as a support, because the compound has low basicity and has a small adverse effect on polarizing performance.

represented by $Z^{H1}$ is preferably 3 to 20, and more preferably 3 to 14. The number of carbon atoms of the aryl group represented by $Z^{H1}$ is preferably 6 to 20, and more preferably 6 to 14.

$Y^{H1}$ is preferably a substituent. The substituent represented by $Y^{H1}$ is not particularly limited, but is preferably a substituent bonded to a piperidine ring through a nitrogen atom or an oxygen atom. The substituent is more preferably an amino group which may have a substituent, a hydroxyl group, an alkoxy group (having 1 to 20 carbon atoms and more preferably having 1 to 14 carbon atoms), an aryloxy group (preferably having 6 to 20 carbon atoms and more preferably having 6 to 12 carbon atoms), or an acyloxy group (preferably having 2 to 20 carbon atoms and more preferably having 2 to 14 carbon atoms), and even more preferably an alkyl group having 1 to 10 carbon atoms, an aryl group having 6 to 12 carbon atoms, an amino group having a heterocyclic group as a substituent, a hydroxyl group, an alkoxy group having 1 to 10 carbon atoms, or an acyloxy group having 2 to 10 carbon atoms.

The compound represented by Formula (H1), particularly, nitrogen (N) of a piperidine ring is linked to an alkyl group, which may have the substituent represented by $Z^{H1}$, or an aryl group through an ether bond. In the present specification, the compound which contains the structure of "N—O—$Z^{H1}$" and has a piperidine ring skeleton represented by Formula (H1) is called "NOZ$^{H1}$ type".

In addition, a compound in which only hydrogen is directly bonded to nitrogen (N) of a piperidine ring is called "NH type", and a compound in which only a methyl group is directly bonded to nitrogen (N) is called "NCH$_3$ type". The basicity of the NH type and the NCH$_3$ type is stronger than the basicity of the NOZ$^{H1}$ type. In a case where the support is prepared using the NOZ$^{H1}$ type compound having weak basicity, it is possible to effectively inhibit site deterioration of polarizer performance caused when the polarizer is used for a long period of time in a high-temperature high-humidity environment in a state of being incorporated into a polarizing plate.

The NOZ$^{H1}$ type compound represented by Formula (H1) is not limited as long as the compound has a predetermined piperidine skeleton, but is preferably a compound represented by the following formula (H1-1) or (H1-2).

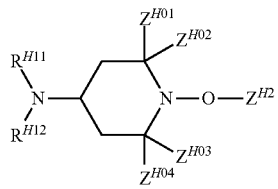

Formula (H1-1)

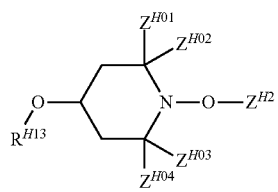

Formula (H1-2)

In Formula (H1-1) and (H1-2), $R^{H01}$ to $R^{H04}$ have the same definition as $R^{H01}$ to $R^{H04}$ in Formula (H), and the preferred range thereof is also the same. $Z^{H2}$ represents an alkyl group which may have a substituent or an aryl group. $R^{H11}$ and $R^{H12}$ each independently represent an alkyl group, an aryl group, an acyl group, or a heterocyclic group. $R^{H13}$ represents a hydrogen atom, an alkyl group, an acyl group, or an aryl group.

A preferred range of $Z^{H2}$ is the same as the preferred range of $Z^{H1}$ in Formula (H1).

$R^{H11}$ is more preferably a hydrogen atom or an alkyl group, even more preferably a hydrogen atom or an alkyl group having 1 to 6 carbon atoms, and particularly preferably a propyl group or a butyl group.

$R^{H12}$ is more preferably an alkyl group or a heterocyclic group, particularly preferably an alkyl group having 1 to 6 carbon atoms or a 1- or 2-membered heterocyclic group containing a nitrogen atom, and particularly preferably triazine.

$R^{H13}$ is preferably a hydrogen atom, an alkyl group having 1 to 12 carbon atoms, or an acyl group having 1 to 12 carbon atoms, and particularly preferably an acyl group having 1 to 12 carbon atoms.

Each of the groups represented by $R^{H11}$ to $R^{H13}$ may be substituted with a substituent. The substituent may be, for example, a substituent formed when $Y^{H1}$ is removed from Formula (H1).

The compound represented by Formula (H1-1) or (H1-2) is preferably a compound represented by any one of the following Formulae (H1-a) to (H1-c).

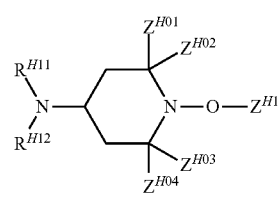

Formula (H1-a)

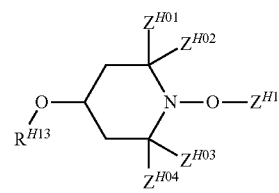

Formula (H1-b)

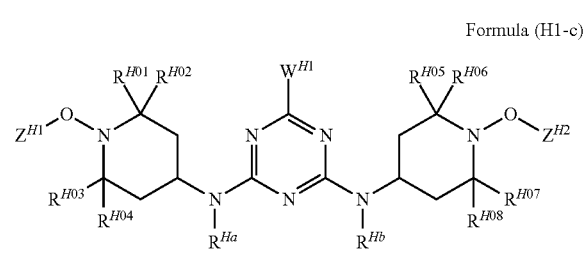

Formula (H1-c)

In Formulae (H1-a) to (H1-c), $R^{H11}$, $R^{H12}$, $R^{H13}$, $Z^{H1}$, and $Z^{H2}$ each have the same definition as $R^{H11}$, $R^{H12}$, $R^{H13}$, $Z^{H1}$, and $Z^{H2}$ described above, and the preferred range thereof is also the same. $R^{H01}$ to $R^{H04}$ have the same definition as $R^{H01}$ to $R^{H04}$ in Formula (H), and the preferred range thereof is also the same.

In Formula (H1-c). $R^{H05}$ to $R^{H08}$ each independently represent an alkyl group, $R^{Ha}$ and $R^{Hb}$ each independently represent a hydrogen atom, an alkyl group, an aryl group, or a heterocyclic group, and $W^{H1}$ represents a substituent.

Preferred examples of the compound represented by Formula (H) will be shown below, but the present invention is not limited thereto.

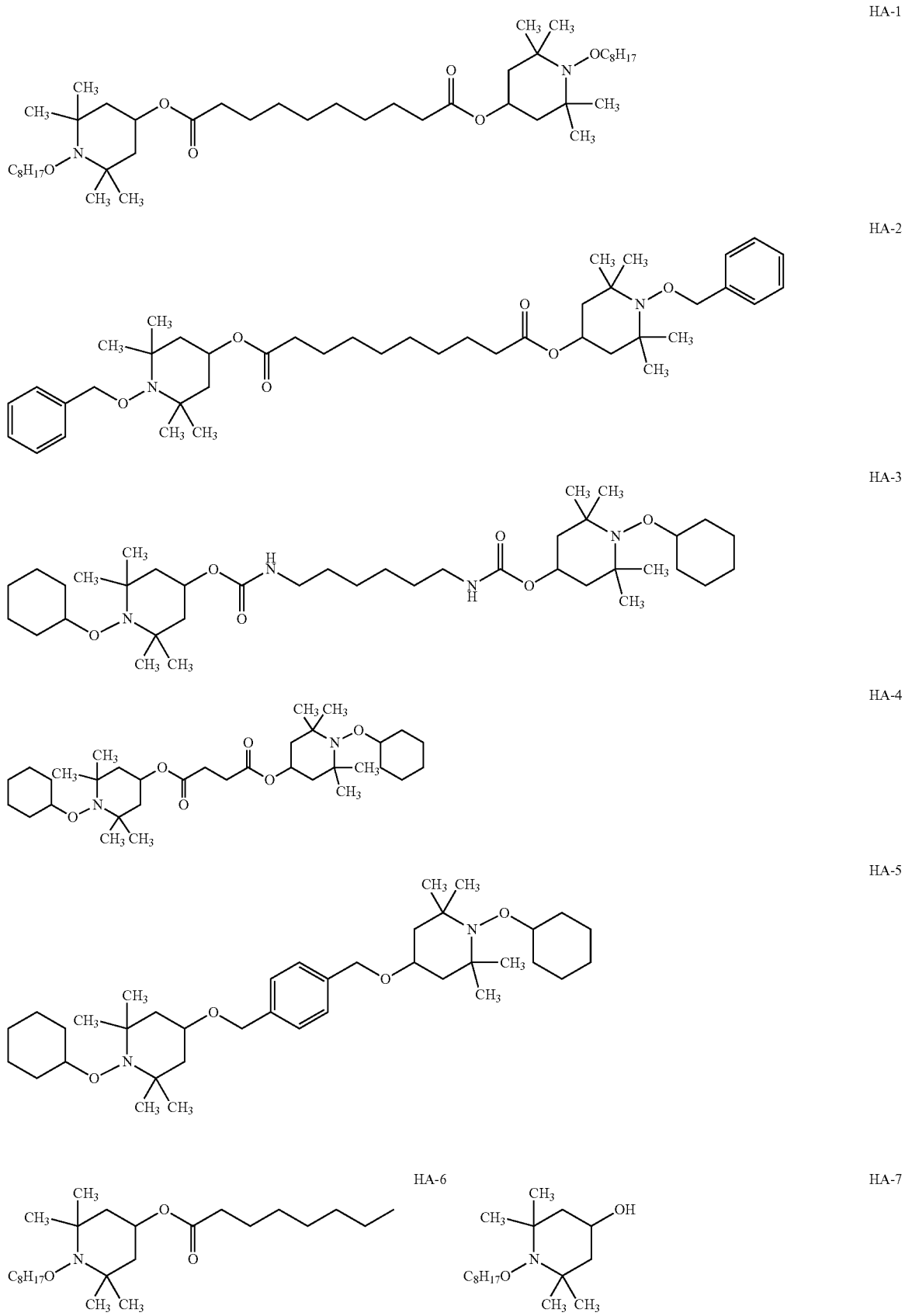

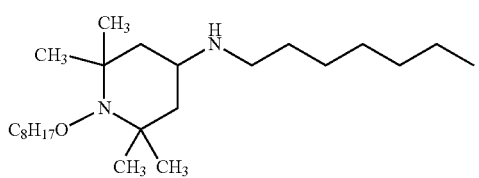

HA-8

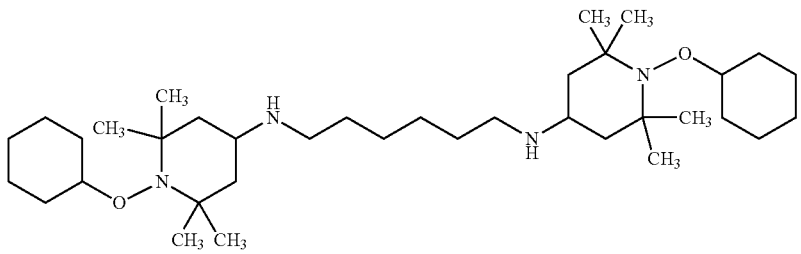

HA-9

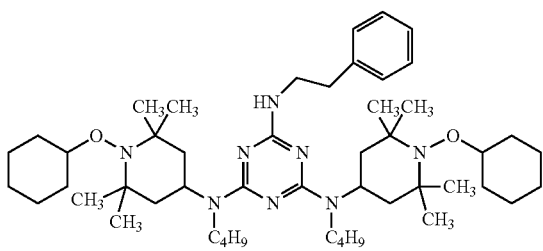

HA-10

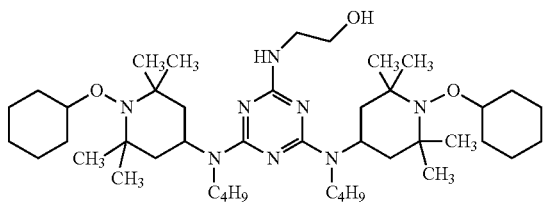

HA-11

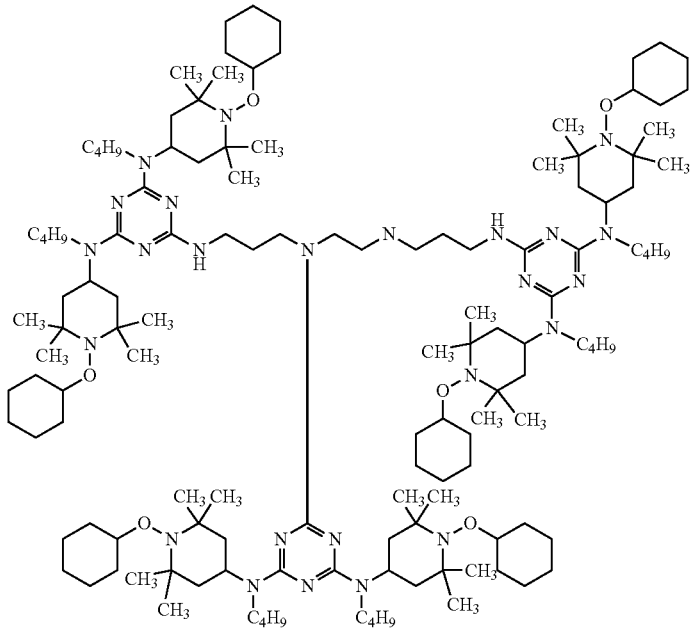

HA-12

The above compound HA-1 (trade name: "TINUVIN 123", manufactured by BASF SE, CAS-No. 129757-67-1), compound HA-11 (trade name: "TINUVIN 152", manufactured by BASF SE, CAS-No. 191743-75-6), and compound HA-12 (trade name: "FLAMESTAB NOR 116 FF", manufactured by BASF SE, CAS-No. 191680-81-6) can be commercially available.

The compound represented by Formula (H) may be commercially available as described above. Furthermore, the compound may be manufactured by synthesis. The synthesis method of the compound represented by Formula (H) is not particularly limited, and the compound can be synthesized by a method generally used in organic synthesis. As a purification method, it is possible to appropriately use distillation, recrystallization, reprecipitation, or a method using a filter medium adsorbent. In some cases, the compound represented by Formula (H) that is generally commercially available at a low price is not solely composed of the compound and may be a mixture. However, in the present invention, as long as the compound functions as a radical scavenger, it can be used regardless of the manufacturing method, composition, melting point, acid value, and the like.

The molecular weight of the compound represented by Formula (H) is not limited. From the viewpoint of inhibiting the volatilization of the compound from the support, it is preferable that the compound has somewhat high molecular weight, as the following molecular weight. By appropriately adjusting the molecular weight, a film excellently compatible with the support and has high transparency is obtained.

Accordingly, the molecular weight of the compound represented by Formula (H) is preferably 300 to 100,000, more preferably 500 to 50,000, and particularly preferably 700 to 30,000.

The timing of adding the compound represented by Formula (H) to the support is not particularly limited as long as the compound is added at a point in time when the film is formed. For example, the compound may be added at the last stage of mixing of the support and a solvent, or may be added after a mixed solution of the support and a solvent is prepared.

The content of the compound represented by Formula (H) in the support is preferably 0.0001 to 5.0 parts by mass with respect to 100 parts by mass of the support. In a case where the content of the compound represented by Formula (H) in the support is within the above range, a sufficient antioxidative effect and durability of the polarizer can be obtained. The content of the compound represented by Formula (H) in the support, with respect to 100 parts by mass of the support, is more preferably 0.001 to 2.0 parts by mass, and even more preferably 0.01 to 1.0 part by mass.

(Ultraviolet Absorber)

Front the viewpoint of preventing the deterioration of a polarizing plate, liquid crystal, and the like, an aspect is also preferable in which a film containing an ultraviolet absorber is used in the support. As the ultraviolet absorber, a compound is preferably used which can excellently absorb ultraviolet rays having a wavelength equal to or shorter than 370 nm and, from the viewpoint of excellent display properties, hardly absorbs visible light having a wavelength equal to or longer than 400 nm. The ultraviolet absorber used in the present invention is preferably at least one kind of compound selected from a hindered phenol compound, a hydroxybenzophenone compound, a benzotriazole compound, a salicylic acid ester compound, a benzophenone compound, a cyanoacrylate compound, and a nickel complex salt compound.

The hindered phenol compound is not particularly limited, but is preferably at least one kind of compound selected from 2,6-di-t-butyl-para-cresol, pentaerythritol-tetrakis[3-(3,5-di-t-butyl-4-hydroxyphenyl)propionate], N,N'-hexamethylenebis(3,5-di-t-butyl-4-hydroxy-hydrocinnamide), 1,3,5-trimethyl-2,4,6-tris(3,5-di-t-butyl-4-hydroxybenzyl)benzene, and tris-(3,5-di-t-butyl-4-hydroxybenzyl)-isocyanurate, The benzotriazole compound is not particularly limited, but is preferably at least one kind selected from 2-(2'-hydroxy-5'-methylphenyl)benzotriazole, 2,2-methylenebis[4-(1,1,3,3-tetramethylbutyl)-6-(2H-benzotriazol-2-yl)phenol], 2,4-bis-(n-octylthio)-6-(4-hydroxy-3,5-di-t-butytlanilino)-1,3,5-triazine, triethetylene glycol-bis[3-(3-t-butyl-5-methyl-4-hydroxyphenyl)propionate], N,N'-hexamethylene bis(3,5-di-t-butyl-4-hydroxy-hydrocinnamide), 1,3,5-trimethyl-2,4,6-tris(3,5-di-t-butyl-4-hydroxybenzyl)benzene, 2-(2'-hydroxy-3',5'-di-t-butylphenyl)-5-chlorobenzotriazole, 2-(2'-hydroxy-3',3'-di-t-amylphenyl)-5-chlorobenzotriazole, 2,6-di-t-butyl-para-creasol, pentacrythritol-tetrakis[3-(3,5-di-t-butyl-4-hydroxyphenyl)propionate], 2-(3,5-di-t-amyl-2-hydroxyphenyl)benzotriazole, and 2-(2H-benzotriazol-2-yl)-6-(1-methyl-1-phenylethyl)-4-(1,1,3,3,-tetramethylbutyl)phenol.

These compounds include commercially available products such as TINUVINs including TINUVIN 99-2, TINUVIN 109, TINUVIN171, TINUVIN320, TINUVIN 326, TINUVIN 327. TINUVIN 328, TINUVIN 329, TINUVIN 343, TINUVIN 900, TINUVIN 928, TINUVIN P, and TINUVIN PS. All of these are products manufactured by BASF SE, and can be preferably used.

The content of the ultraviolet absorber in the support, based on mass, is preferably 1 ppm to 10%, more preferably 1 ppm to 5.0%, and even more preferably 10 ppm to 3.0%.

(Matting Agent)

From the viewpoint of lubricating properties of the film and stabilized manufacturing, a film containing a matting agent may be used as a support. The matting agent may be a matting agent of an inorganic compound or a matting agent of an organic compound.

The matting agent of an inorganic compound is preferably at least one kind of compound selected from a silicon-containing inorganic compound (such as silicon dioxide, fired calcium silicate, hydrated calcium silicate, aluminum silicate, or magnesium silicate), titanium oxide, zinc oxide, aluminum oxide, barium oxide, zirconium oxide, strontium oxide, antimony oxide, tin oxide, tin oxide-antimony, calcium carbonate, talc, clay, fired kaolin, and calcium phosphate, more preferably at least one kind of compound selected from a silicon-containing inorganic compound and zirconium oxide. From the viewpoint of further reducing turbidity of the support, it is particularly preferable to use silicon dioxide.

As silicon dioxide particles, for example, it is possible to use commercially available products having trade names of AEROSIL R972, R974, R812, 200, 300, R202, OX50, TT600, and the like (all manufactured by NIPPON AEROSIL CO., LTD.). As zirconium oxide particles, for example, it is possible to use commercially available products having trade names of AEROSIL R976 and R811 (all manufactured by NIPPON AEROSIL CO., LTD.).

The matting agent of an organic compound is not particularly limited, but is preferably at least one kind of polymer selected from a silicone resin, a fluorine resin, and an acryl resin. Among these, a silicone resin is preferable. Among silicone resins, those having 3-dimensional network structure are particularly preferable. For example, it is possible to use commercially available products having trade names of TOSPEARL 103, TOSPEARL 105, TOSPEARL 108, TOSPEARL 120, TOSPEARL 145, TOSPEARL 3120, and TOSPEARL 240 (all manufactured by Toshiba Silicone Co., Ltd.).

The timing of adding these matting agents to the support is not particularly limited as long as the matting agents are added at a point in time when a film is formed. For example, the additives may be incorporated into the support at the last stage of mixing the material forming the support with a solvent or added after a mixed solution of the material forming the support and a solvent is prepared.

Furthermore, the matting agent may be added to and mixed with a dope immediately before the dope is cast. It is preferable to perform the mixing by installing a screw kneader on line. Specifically, it is preferable to use a static mixer such as an in-line mixer. As the in-line mixer, for example, a static mixer SWJ (TORAY static in-tube mixer Hi-Mixer, manufactured by Toray Engineering Co., Ltd.) is preferable.

Regarding in-line addition, in order to prevent concentration unevenness, particle aggregation, and the like, the method described in JP2003-0537529A can be used. Furthermore, in order to obtain a support in which the additives hardly cause bleed-out and interlaminar peeling does not occur and which is excellent in lubricating properties and transparency, the method described in JP2003-014933A can also be used.

The content of the matting agent in the support is particularly preferably 0.05% to 1.0% by mass. If the content is as described above, the haze of the film does not increase, and in a case where the support is actually used in a liquid crystal display, the matting agent contributes to the suppression of problems such as a decrease in contrast and the occurrence of a bright point. Furthermore, creak and abrasion resistance can be realized. In this respect, the content of the matting agent in the support is particularly preferably 0.05% to 1.0% by mass.

(Peeling Accelerator)

An aspect is also preferable in which a film containing a peeling accelerator is used in the support. As the peering accelerator, for example, it is possible to preferably use the compounds described in paragraphs [0048] to [008] in JP2006-45497A, the compounds described in paragraphs [0077] to [0086] in JP2002-322294A, the compounds described in paragraphs [0030] to [0056] in JP2012-72348A, and the like.

(Organic Acid)

An aspect is also preferable in which a film containing an organic acid is used in the support.

Examples of the organic acid include the compounds described in paragraphs [0079] to [0082] in JP2002-322294A. Examples of the organic acid include citric acid, oxalic acid, adipic acid, succinic acid, malic acid, tartaric acid, and the like.

Amino acids are also preferable as the organic acid, and examples thereof include asparagine, aspartic acid, adenine, alanine, β-alanine, arginine, isoleucine, glycine, glutamine, glutamic acid, serine, tyrosine, tryptophane, threonine, norleucine, valine, phenylalanine, methionine, lysine, leucine, and the like.

The organic acid may be used in the form of a free acid, and examples thereof include an alkali metal salt, an alkaline earth metal salt, and a salt of a heavy metal including a transition metal. Regarding the metal of each salt, examples of the alkali metal include lithium, potassium, sodium, and the like, and examples of the alkaline earth metal include calcium, magnesium, barium, strontium, and the like. Examples of the heavy metal including a transition metal include aluminum, zinc, tin, nickel, iron, lead, copper, silver, and the like. A salt of substituted or unsubstituted amines having 5 or less carbon atoms is also preferable. Examples of the amine forming a salt include ammonium, methylamine, ethylamine, propylamine, butylamine, dimethylamine, trimethylamine, triethylamine, hydroxyethylamine, bis(hydroxyethyl)amine, tris(hydroxyethyl)amine, and the like. Regarding preferred metals, sodium is preferred as the alkali metal, and calcium and magnesium are preferred as the alkaline earth metal. One kind of each alkali metal or alkaline earth metal can be used singly, or two or more kinds thereof can be used in combination. The alkali metal and the alkaline earth metal may be used in combination.

(Polyvalent Carboxylic Acid Derivative)

An aspect is also preferable in which a film containing a polyvalent carboxylic acid derivative is used in the support.

As the polyvalent carboxylic acid derivative, an ester compound and an amide compound are preferable.

The carboxylic acid component is polyvalent carboxylic acid. The carboxylic acid may be aliphatic, carboxylic acid or aromatic carboxylic acid, but is preferably aliphatic carboxylic acid. The aliphatic carboxylic acid may be saturated or unsaturated, and is preferably linear, branched, or cyclic aliphatic carboxylic acid. The aliphatic carboxylic acid may have a substituent. Examples of the substituent include an alkyl group, an alkenyl group, an aryl group, a hydroxyl group, an amino group, an alkoxy group, an alkenyloxy group, an acyloxy group, and an acylamino group.

Examples of the aromatic carboxylic acid include phthalic acid, terephthalic acid, isophthalic acid, 1,3,5-benzenetricarboxylic acid, and the like. Examples of the aliphatic carboxylic acid include oxalic acid, malonic acid, succinic acid, glutaric acid, adipic acid, and sebacic acid. Examples of the aliphatic carboxylic acid having a substituent include malic acid, citric acid, and tartaric acid.

In the polyvalent carboxylic acid ester, a group which is an alcohol component and bonded to an oxygen atom of —C(=O)—O— of an ester functional group is preferably a substituted or unsubstituted alkyl group [such as methyl, ethyl, isopropyl, t-butyl, 2-ethylhexyl, or —CH$_2$CH$_2$O(CH$_2$CH$_2$)n-C$_2$H$_5$] or an alkenyl group (such as vinyl, allyl, 2-methyl-2-propenyl, 2-butenyl, or oleyl). The total number of carbon atoms in the alcohol component (group bonded to an oxygen atom) is preferably 1 to 200, more preferably 1 to 100, and even more preferably 1 to 50. The substituent that the alkyl group and the alkenyl group may have is preferably an alkoxy group, an alkenyloxy group, a hydroxyl group, or an acyloxy group, and more preferably an alkoxy group. It is preferable that the alkoxy group or the alkenyloxy group has a (poly)oxyalkylene group. The (poly)oxyalkylene group is particularly preferably a (poly)oxyethylene group, a (poly)oxypropylene group, or a (poly)oxybutylene group.

The alcohol as a raw material in the alcohol component may be monohydric or polyhydric. Examples of the polyhydric alcohol include ethylene glycol, propylene glycol, glycerin, and pentacrythritol. The alcohols are also preferable in which the portion of a hydroxyl group (—OH) of the above alcohols is changed to polyoxyalkyleneoxy group [such as —(OCH$_2$CH$_2$)n-OH or —(OC$_3$H$_6$)nOH].

In polyvalent carboxylic acid amide, an amine compound as an amine component may be primary or secondary and is not particularly limited. The substituent substituting a nitrogen atom of —C(=O)—N< of an amide functional group is preferably an alkyl group [such as methyl, ethyl, isopropyl, t-butyl, 2-ethylhexyl or —CH$_2$CH$_2$O—(CH$_2$CH$_2$)n-C$_2$H$_5$] or an alkenyl group (such as vinyl, allyl, 2-methyl-2-propenyl, or 2-butenyl). The total number of carbon atoms in the amine compound as an amine component is preferably 1 to 200, more preferably 1 to 100, and even more preferably 1 to 50. The substituent that the alkyl group and the alkenyl group may have is preferably an alkoxy group, an alkenyloxy group, a hydroxyl group, an acyloxy group, an amino group, or an acylamino group, and more preferably an alkoxy group. It is preferable that the alkoxy group or the alkenyloxy group contains a (poly)oxyalkylene group. The (poly)oxyalkylene group Is particularly preferably a (poly) oxyethylene group, a (poly)oxypropylene group, or a (poly)

oxybutylene group, it is preferable that these polyoxyalkylene partial structures contain a branched polyoxyalkylene group through glycerin.

The amine compound as a raw material in the amine component may be monovalent or polyvalent.

Among polyvalent carboxylic acid derivatives, organic acid monoglyceride having a carboxyl group that can be liberated without going through a reaction is particularly preferable. Examples of commercially available products thereof include POEM K-37V (glycerin citric acid oleic acid ester) manufactured by RIKEN VITAMIN CO., LTD., STEP SS (glycerin stearate/palmitic acid succinic acid ester) manufactured by Kao Corporation, and the like.

(Surfactant)

An aspect is also preferable in which a film containing a surfactant is used in the support.

As the surfactant, it is possible to preferably use the compounds described in paragraphs [0050] to [0051] in JP2006-45497A and the compounds described in paragraphs [0127] and [0128] in JP2002-322294A. Specific examples of nonionic surfactants include polyoxyethylene alkyl ether, polyoxyethylene alkyl phenyl ether, polyoxyethylene-polyoxypropylene glycol, a partial ester of polyhydric alcohol fatty acid, a partial ester of polyoxyethylene polyhydric alcohol fatty acid, a polyoxyethylene fatty acid ester, a polyglycerin fatty acid ester, fatty acid diethanolamide, a partial ester of triethanolamine fatty acid, and poly ether amine. Examples of commercially available products thereof include NYMEEN L-202, STAFOAM DO, STAFOAM DL (NOF CORPORATION), and the like.

(Chelating Agent)

An aspect is also preferable in which a film containing a chelating agent is used in the support.

The chelating agent is a compound which can be chelated to polyvalent metal ions such as a metal ion including an iron ion or an alkaline earth metal ion including a calcium ion. Various chelating agents represented by aminopolycarboxylic acid, aminopolyphosphonic acid, alkylphosphonic acid, or phosphonocarboxylic acid may be used. As the chelating agent, it is possible to use the compounds described in JP1994-8956B (JP-H06-8956B), JP1999-190892A (JP-H11-190892A), JP2000-18038A, JP2010-158640A, JP2006-328203A, JP2005-68246A, and JP2006-306969A.

Specific examples of the chelating agent include ethylenediamine tetraacetic acid, hydroxyethyl ethylenediamine triacetic acid, diethylenetriamine pentaacetic acid, nitrilotriacetic acid, triethylenetetramine hexaacetic acid, cyclohexanediamine tetraacetic acid, hydroxyethyliminodiacetic acid, ethylene glycol bis(2-aminoethylether)tetraacetic acid, 1,3-diaminopropane tetraacetic acid, phosphonic acid, 1-hydroxyethylidene-1,1,-diphosphonic acid, nitrilo-N,N,N-trimethylene phosphonic acid, ethylene diamine-N,N,N,N-tetermethylene phosphonic acid, ethylene diamine-di(ortho-hydroxyphenyl acetic acid), DL-alanine-N,N-diacetic acid, aspartic acid-N,N-diacetic acid, glutamic acid-N,N-diacetic acid, serine-N,N-diacetic acid, polyacrylic acid, an isoamylene-maleic acid copolymer, an acrylic acid-maleic acid copolymer, an acrylic acid-methacrylic acid copolymer, silicic acid, gluconic acid, hydroxybenzyliminodiacetic acid, iminodiacetic acid, and the like. These commercially available products can be obtained from CHELEST CORPORATION, Nagase ChemteX Corporation, Dojindo Laboratories, and the like.

In addition, if is preferable to use an oil-soluble chelating agent. As commercially available products thereof, it is possible to use TEKURAN DO (manufactured by Nagase ChemteX Corporation) and CHELEST MZ-2 and CHELEST MZ-8 (manufactured by CHELEST CORPORATION).

[Method for Manufacturing Hardcoat Film]

A method for manufacturing a hardcoat film of the present invention is a method for manufacturing a hardcoat film having a support and a hardcoat layer disposed on at least one surface of the support, including a step of forming the hardcoat layer by curing a composition for forming a hardcoat layer containing at least the following a), the following b), the following c), and the following d) such that a film thickness of the hardcoat layer exceeds 20 µm, in which the support contains a resin as a main component, and in a case where a total solid content of the composition for forming a hardcoat layer is regarded as being 100% by mass, the composition contains a) in an amount of 15% to 70% by mass, b) in an amount of 25% to 80% by mass, c) in an amount of 0.1% to 10% by mass, d) in an amount of 0.1% to 10% by mass:

a) compound which has one alicyclic epoxy group and one ethylenically unsaturated double bond group in a molecule and has a molecular weight equal to or less than 300;

b) compound which has 3 or more ethylenically unsaturated double bond groups in a molecule;

c) radical polymerization initiator; and d) cationic polymerization initiator.

<Coating Method>

Each layer in the hardcoat film of the present invention can be formed by the following method, but the method is not limited. Known methods such as a dip coating method, an air knife coating method, a curtain coating method, a roller coating method, a wire bar coating method, a gravure coating method, a slide coating method, an extrusion coating method (die coating method) (see JP2003-164788A), and microgravure coating method are used. Among these, a microgravure coating method and a the coating method are preferable.

<Drying and Curing Conditions>

Preferred examples of drying and curing methods used in a case where the hardcoat layer or the like in the present invention is formed by coating will be described below.

It is effective to perform curing by combining irradiation using ionizing radiation with a thermal treatment which is performed before the irradiation, simultaneously with the irradiation, or after the irradiation.

Some patterns of the manufacturing steps will be shown below, but the present invention is not limited thereto.

(1) Order of thermal treatment before irradiation and ionizing radiation curing (2) Order of pre-irradiation thermal treatment, ionizing radiation curing, and post-irradiation thermal treatment (3) Order of ionizing radiation curing and post-irradiation thermal treatment In addition, a step of performing a thermal treatment simultaneously with the ionizing radiation curing is also preferable.

As described above, it is preferable that the irradiation using ionizing radiation and the thermal treatment are performed in combination. The thermal treatment is not particularly limited as long as the layer constitution including the support and the hardcoat layer of the hardcoat film is not damaged. The thermal treatment is preferably performed at a temperature of 40 to 150° C., and more preferably performed at a temperature of 40° C. to 80° C.

The time required for the thermal treatment varies with the molecular weight of the components used, the interaction with other components, viscosity, and the like, but is 15 seconds to 1 hour, preferably 20 seconds to 30 minutes, and most preferably 30 seconds to 5 minutes.

The type of the ionizing radiation is not particularly limited, and examples thereof include X-rays, electron beams, ultraviolet rays, visible light, infrared rays, and the like. As the ionizing radiation, ultraviolet rays are widely used. For example, in a case where a coating film is an ultraviolet ray-curable, it is preferable to cure each layer by irradiating the layer with ultraviolet rays by using an ultraviolet lamp at a dose of 10 mJ/cm$^2$ to 1,000 mJ/cm$^2$. At the time of irradiation, the aforementioned energy can be applied at once or in batches. Particularly, from the viewpoint of suppressing the coating film from demonstrating uneven performance in plane or improving smoothness, it is preferable to perform irradiation two or more times in batches. Furthermore, it is preferable to initially perform ultraviolet ray irradiation at a low dose equal to or lower than 150 mJ/cm$^2$ and then perform ultraviolet ray irradiation at a high dose of equal to or higher than 50 mJ/cm$^2$, and to apply energy such that the dose of the last stage is higher than the dose of the initial stage.

[Polarizing Plate]

A polarizing plate of the present invention is a polarizing plate including a polarizer and at least one sheet of the hardcoat film of the present invention.

The hardcoat film of the present invention is used on one side or both sides of a protective film of a polarizing plate which consists of a polarizing film and a protective film disposed on both sides of the polarizing film, and in this way, a polarizing plate having hardcoat properties can be obtained.

It is preferable to be able to provide a polarizing plate which has the hardcoat film of the present invention, has improved brittleness, is excellent in handleability, does not impair display quality by surface smoothness or wrinkles, and can suppress the leakage of light at the time of moist-heat test.

The hardcoat film of the present invention may be used as a protective film for one side, and a general cellulose acetate film may be used as a protective film for the other side. As the protective film for the other side, it is preferable to use a cellulose acetate film which is manufactured by a solution film forming method and stretched along a width direction in a roll film form at a stretching ratio of 10% to 100%.

An aspect is also preferable in which, of the two sheets of the protective films of the polarizing film, the film other than the hardcoat film of the present invention is an optical compensation film having an optical compensation layer including an optically anisotropic layer. The optical compensation film (retardation film) can improve the viewing angle characteristics of a liquid crystal display screen. Known optical compensation films can be used, but in view of widening the viewing angle, the optical compensation film described in JP2001-100042A is preferable.

The polarizing film includes an iodine-containing polarizing film, a dye-based polarizing film using a dichroic dye, and a polyene-based polarizing film. The iodine-containing polarizing film and the dye-based polarizing film are generally manufactured using a polyvinyl alcohol-based film.

As the polarizing film, a known polarizing film or a polarizing film cut out from a long polarizing film whose absorption axis is neither parallel nor perpendicular to the longitudinal direction may be used. The long polarizing film whose absorption axis is neither parallel nor perpendicular to the longitudinal direction is manufactured by the following method.

That is, the polarizing film can be manufactured by a stretching method in which, in a state where both ends of a continuously supplied polymer film such as a polyvinyl alcohol-based film are being held by holding means, the film is stretched under tension applied thereto such that the film is stretched by a factor of 1.1 to 20.0 in at least the film width direction; a difference in a moving rate between the holding devices at both ends of the film in the longitudinal direction is within 3%; and the moving direction of the film is bent in a state where both ends of the film are being held, such that the moving direction of the film at the exit of the step of holding both ends of the film and the actual stretching direction of the film form an oblique angle of 20° to 70°. From the viewpoint of productivity, a polarizing film obtained by setting the aforementioned oblique angle to be 45° is particularly preferably used.

The stretching method of the polymer film is specifically described in paragraphs [0020] to [0030] in JP2002-86554A.

[Image Display and Liquid Crystal Display]

The hardcoat film or the polarizing plate of the present invention can be used in an image displays such as a liquid crystal display (LCD), a plasma display panel, an electroluminescence display, or a cathode tube display.

According to the present invention, it is preferable to be able to provide an image display which has the hardcoat film of the present invention, has improved brittleness, is excellent in handleability, does not impair display quality by surface smoothness or wrinkles, and can suppress the leakage of light at the time of moist-heat test.

The image display is particularly preferably a liquid crystal display of the present invention including a liquid crystal cell and the polarizing plate of the present invention disposed on at least one surface of the liquid crystal cell, in which the hardcoat film of the present invention is disposed on the uppermost surface of the display.

EXAMPLES

Hereinafter, the present invention will be more specifically described based on examples and comparative examples. The materials, the amount of the materials used, the ratio between the materials, the treatment content, the treatment sequence, and the like shown in the following examples can be appropriately changed within a scope that does not depart from the gist of the present invention. Accordingly, the scope of the present invention is not limited to the following specific examples.

Preparation Example

<Preparation of Composition for Forming Hardcoat Layer>

The components were added according to the composition shown in the following Tables 6, 7, and 8, and the mixture was filtered through a filter made of polypropylene having a pore size of 10 μm, thereby preparing compositions for forming a hardcoat layer A01 to A30 and B01 to B13. The numerical values in Tables 6, 7, and 8 shows "% by mass of solid content" of each component.

The material, such as ELECOM V-8802, diluted with a solvent, is also added such that the solid content ratio is adjusted and becomes the value described in Table 6, 7, or 8. For the solvent, the solvent ratio is adjusted such that it becomes the ratio described in Tables 6, 7, and 8. In this way, the composition for forming a hardcoat layer was prepared which was a coating solution with a solid content ratio of 35% by mass.

TABLE 6

| | Composition for forming hard coat layer | A01 | A01 | A01 | A02 | A03 | A04 | A05 | A06 | A07 | A08 | A09 | A10 |
|---|---|---|---|---|---|---|---|---|---|---|---|---|---|
| a) | 3,4-Epoxycyclohexylmethyl methacrylate | | | | 40.00% | | | 15.00% | 70.00% | 40.00% | 40.00% | | |
| | 3,4-Epoxycyclohexylmethyl acrylate | 40.00% | 40.00% | 40.00% | | | | | | | | 40.00% | 40.00% |
| | 3,4-Epoxycyclohexylbutyl methacrylate | | | | | 40.00% | | | | | | | |
| | Epoxy compound A | | | | | | 40.00% | | | | | | |
| b) | DPHA | 55.40% | 55.40% | 55.40% | 55.40% | 55.40% | 55.40% | 80.00% | 25.00% | | | | |
| | ATMMT | | | | | | | | | | 55.40% | | |
| | UV-1700B | | | | | | | | | | | 55.40% | 55.40% | 55.40% |
| c) | IRGACURE127 | 2.50% | 2.50% | 2.50% | 2.50% | 2.50% | 2.50% | 3.70% | 1.50% | 2.50% | 2.50% | | |
| | IRGACURE184 | | | | | | | | | | | 2.50% | 2.50% |
| d) | IRGACURE290 | 2.00% | 2.00% | 2.00% | 2.00% | 2.00% | 2.00% | 1.20% | 3.40% | 2.00% | 2.00% | 2.00% | |
| | IRGACORE270 | | | | | | | | | | | | |
| | B2380 | | | | | | | | | | | | |
| | FK-1 | | | | | | | | | | | | 2.00% |
| e) | ELECOM V-8802 | | | | | | | | | | | | |
| | ELECOM V-8803 | | | | | | | | | | | | |
| | MiBK-ST | | | | | | | | | | | | |
| f) | Polyester urethane P-1 | | | | | | | | | | | | |
| | Polyester urethane P-2 | | | | | | | | | | | | |
| | Polyester urethane P-3 | | | | | | | | | | | | |
| g) | RS-90 | | | | | | | | | | | | |
| | RS-78 | | | | | | | | | | | | |
| | B-1 | | | | | | | | | | | | |
| Wind irregularity prevention agent | FP-1 | 0.10% | 0.10% | 0.10% | 0.10% | 0.10% | 0.10% | 0.10% | 0.10% | 0.10% | 0.10% | 0.10% | 0.10% |
| Other polymerizable compounds | Glycidyl methacrylate | | | | | | | | | | | | |
| | Ethylene glycol dimethacrylate | | | | | | | | | | | | |
| | CELLOXIDE 2021P | | | | | | | | | | | | |
| | Epoxy compound B | | | | | | | | | | | | |
| | Bisphenol A-type diepoxy acrylate | | | | | | | | | | | | |
| Solvent | MEK | 50% | 50% | 50% | 50% | 50% | 40% | 40% | 40% | 40% | 40% | 40% | 40% |
| | MiBK | 30% | 30% | 30% | 30% | 30% | 54% | 54% | 54% | 54% | 54% | 54% | 54% |
| | Methyl acetate | 20% | 20% | 20% | 20% | 20% | 6% | 6% | 6% | 6% | 6% | 6% | 6% |

| | Composition for forming hard coat layer | A11 | A12 | A13 | A14 | A15 | A16 | A17 | A18 | A19 | A20 | A21 |
|---|---|---|---|---|---|---|---|---|---|---|---|---|
| a) | 3,4-Epoxycyclohexylmethyl methacrylate | | | 40.00% | 30.00% | 30.00% | 30.00% | 30.00% | 30.00% | 22.00% | 22.00% | 22.00% |
| | 3,4-Epoxycyclohexylmethyl acrylate | 40.00% | 40.00% | | | | | | | | | |
| | 3,4-Epoxycyclohexylbutyl methacrylate | | | | | | | | | | | |
| | Epoxy compound A | | | | | | | | | | | |
| b) | DPHA | | | | | | | | | 67.30% | 67.30% | 67.30% |
| | ATMMT | | | | | | | | | | | |
| | UV-1700B | 55.40% | 55.40% | 50.40% | 46.00% | 36.40% | 26.40% | 46.00% | 46.00% | | | |
| c) | IRGACURE127 | | | | | | | | | | | |
| | IRGACURE184 | 2.50% | 2.50% | 2.50% | 2.40% | 2.00% | 2.00% | 2.40% | 2.40% | 3.40% | 3.40% | 3.40% |
| d) | IRGACURE290 | | | | | | | | | | | |
| | IRGACORE270 | | | | | | | | | | | |
| | B2380 | | 2.00% | | | | | | | | | |
| | FK-1 | | | 2.00% | 2.00% | 1.50% | 1.50% | 1.50% | 1.50% | 1.50% | 1.20% | 1.20% |

TABLE 6-continued

| | | | | | | | | | | | | |
|---|---|---|---|---|---|---|---|---|---|---|---|---|
| e) | ELECOM V-8802 | | | 5.00% | 20.00% | 30.00% | 40.00% | | | | | |
| | ELECOM V-8803 | | | | | | | 20.00% | | | | |
| | MiBK-ST | | | | | | | | 20.00% | | | |
| f) | Polyester urethane P-1 | | | | | | | | | 6.00% | | |
| | Polyester urethane P-2 | | | | | | | | | | 6.00% | |
| | Polyester urethane P-3 | | | | | | | | | | | 6.00% |
| g) | RS-90 | | | | | | | | | | | |
| | RS-78 | | | | | | | | | | | |
| | B-1 | | | | | | | | | | | |
| Wind irregularity prevention agent | FP-1 | 0.10% | 0.10% | 0.10% | 0.10% | 0.10% | 0.10% | 0.10% | 0.10% | 0.10% | 0.10% | 0.10% |
| Other polymerizable compounds | Glycidyl methacrylate | | | | | | | | | | | |
| | Ethylene glycol dimethacrylate | | | | | | | | | | | |
| | CELLOXIDE 2021P | | | | | | | | | | | |
| | Epoxy compound B | | | | | | | | | | | |
| | Bisphenol A-type diepoxy acrylate | | | | | | | | | | | |
| Solvent | MEK | 40% | 40% | 40% | 40% | 40% | 40% | 40% | 40% | 40% | 40% | 40% |
| | MiBK | 54% | 54% | 54% | 54% | 54% | 54% | 54% | 54% | 54% | 54% | 54% |
| | Methyl acetate | 6% | 6% | 6% | 6% | 6% | 6% | 6% | 6% | 6% | 6% | 6% |

TABLE 7

| | Composition for forming hardcoat layer | A22 | A22 | A23 | A23 | B01 | B02 | A01 | B03 | B04 | B05 | B06 |
|---|---|---|---|---|---|---|---|---|---|---|---|---|
| a) | 3,4-Epoxycyclohexylmethyl methacrylate | 18.50% | 18.50% | 18.50% | 18.50% | 12.00% | 74.00% | | 18.50% | | | |
| | 3,4-Epoxycyclohexylmethyl acrylate | | | | | | | 40.00% | | | | |
| | 3,4-Epoxycyclohexylbutyl methacrylate | | | | | | | | | | | |
| | Epoxy compound A | | | | | | | | | | | |
| b) | DPHA | 69.90% | 69.90% | 69.90% | 69.90% | 83.00% | 21.00% | 55.40% | 20.00% | 69.90% | 69.90% | 69.90% |
| | ATMMT | | | | | | | | | | | |
| | UV-1700B | | | | | | | | | | | |
| c) | IRGACURE127 | | | | | 3.70% | 1.50% | 2.50% | | | | |
| | IRGACURE184 | 3.70% | 3.70% | 3.70% | 3.70% | | | | 3.70% | 3.70% | 3.70% | 3.70% |
| d) | IRGACURE290 | | | | | 1.20% | 3.40% | 2.00% | | | | |
| | IRGACURE270 | | | | | | | | | | | |
| | B2380 | | | | | | | | | | | |
| | FK-1 | 0.80% | 0.80% | 0.80% | 0.80% | | | | 2.00% | 0.80% | 0.80% | 0.80% |
| e) | ELECOM V-8802 | | | | | | | | | | | |
| | ELECOM V-8803 | | | | | | | | | | | |
| | MiBK-ST | | | | | | | | | | | |
| f) | Polyester urethane P-1 | 6.00% | 6.00% | 6.00% | 6.00% | | | | 6.00% | 6.00% | 6.00% | 6.00% |
| | Polyester urethane P-2 | | | | | | | | | | | |
| | Polyester urethane P-3 | | | | | | | | | | | |
| g) | RS-90 | 1.00% | 1.00% | | | | | | 1.00% | 1.00% | 1.00% | 1.00% |
| | RS-78 | | | 1.00% | 1.00% | | | | | | | |
| | B-1 | | | | | | | | | | | |
| Wind irregularity prevention | FP-1 | 0.10% | 0.10% | 0.10% | 0.10% | 0.10% | 0.10% | 0.10% | 0.10% | 0.10% | 0.10% | 0.10% |
| Other polymerizable compounds | Glycidyl methacrylate | | | | | | | 48.70% | | | | |
| | Ethylene glycol dimethacrylate | | | | | | | | | 18.50% | | |
| | CELLOXIDE 2021P | | | | | | | | | | 18.50% | |
| | Epoxy compound B | | | | | | | | | | | 18.50% |
| | Bisphenol A-type diepoxy acrylate | | | | | | | | | | | |

TABLE 7-continued

| Solvent | | | | | | | | | | | | |
|---|---|---|---|---|---|---|---|---|---|---|---|---|
| | MEK | 40% | 40% | 40% | 40% | 50% | 50% | 50% | 40% | 40% | 40% | 40% |
| | MiBK | 54% | 54% | 54% | 54% | 30% | 30% | 30% | 54% | 54% | 54% | 54% |
| | Methyl acetate | 6% | 6% | 6% | 6% | 20% | 20% | 20% | 6% | 6% | 6% | 6% |

| | Composition for forming hardcoat layer | B07 | B08 | B09 | B10 | B11 | B12 | B13 | A01 | A19 | A19 | A24 |
|---|---|---|---|---|---|---|---|---|---|---|---|---|
| a) | 3,4-Epoxycyclohexylmethyl methacrylate | | | 22.00% | 22.00% | 22.00% | 22.00% | 22.00% | | 22.00% | 22.00% | 18.50% |
| | 3,4-Epoxycyclohexylmethyl acrylate | | | | | | | | 40.00% | | | |
| | 3,4-Epoxycyclohexylbutyl methacrylate | | | | | | | | | | | |
| | Epoxy compound A | | | | | | | | | | | |
| b) | DPHA | 69.90% | 95.00% | 68.50% | 68.45% | 53.50% | 70.65% | 55.70% | 55.40% | 67.30% | 67.30% | 69.90% |
| | ATMMT | | | | | | | | | | | |
| | UV-1700B | | | | | | | | | | | |
| c) | IRGACURE127 | | 3.70% | | | | | | 2.50% | | | |
| | IRGACURE184 | 3.70% | | 3.40% | 3.40% | 3.40% | 0.05% | 15.00% | | 3.40% | 3.40% | 3.70% |
| d) | IRGACURE290 | | 1.20% | | | | | | 2.00% | | | |
| | IRGACURE270 | | | | | | | | | | | |
| | B2380 | | | | | | | | | | | |
| | FK-1 | 0.80% | | | 0.05% | 15.00% | 1.20% | 1.20% | | 1.20% | 1.20% | 0.80% |
| e) | ELECOM V-8802 | | | | | | | | | | | |
| | ELECOM V-8803 | | | | | | | | | | | |
| | MiBK-ST | | | | | | | | | | | |
| f) | Polyester urethane P-1 | 6.00% | | | | | | | | 6.00% | 6.00% | 6.00% |
| | Polyester urethane P-2 | | | | | | | | | | | |
| | Polyester urethane P-3 | | | 6.00% | 6.00% | 6.00% | 6.00% | 6.00% | | | | |
| g) | RS-90 | 1.00% | | | | | | | | | | |
| | RS-78 | | | | | | | | | | | |
| | B-1 | | | | | | | | | | | 1.00% |
| Wind irregularity prevention | FP-1 | 0.10% | 0.10% | 0.10% | 0.10% | 0.10% | 0.10% | 0.10% | 0.10% | 0.10% | 0.10% | 0.10% |
| Other polymerizable compounds | Glycidyl methacrylate | | | | | | | | | | | |
| | Ethylene glycol dimethacrylate | | | | | | | | | | | |
| | CELLOXIDE 2021P | | | | | | | | | | | |
| | Epoxy compound B | | | | | | | | | | | |
| | Bisphenol A-type diepoxy acrylate | 18.50% | | | | | | | | | | |
| Solvent | MEK | 40% | 50% | 40% | 40% | 40% | 50% | 50% | 50% | 40% | 40% | 40% |
| | MiBK | 54% | 30% | 54% | 54% | 54% | 30% | 30% | 30% | 54% | 54% | 54% |
| | Methyl acetate | 6% | 20% | 6% | 6% | 6% | 20% | 20% | 20% | 6% | 6% | 6% |

TABLE 8

| | Composition for forming hardcoat layer | A25 | A26 | A27 | A28 | A29 | A30 |
|---|---|---|---|---|---|---|---|
| a) | 3,4-Epoxycyclohexylmethyl methacrylate | 22.00% | 45.00% | 22.00% | 40.00% | 45.00% | 60.00% |
| | 3,4-Epoxycyclohexylmethyl acrylate | | | | | | |
| | 3,4-Epoxycyclohexylbutyl methacrylate | | | | | | |
| | Epoxy compound A | | | | | | |
| b) | DPHA | 72.90% | 50.10% | | | | |
| | ATMMT | | | | | | |
| | UV-1700B | | | 62.90% | 45.90% | 40.40% | 25.40% |
| c) | IRGACURE127 | 3.00% | 2.30% | | | | |
| | IRGACURE184 | | | 3.00% | 2.00% | 2.00% | 1.50% |
| d) | IRGACURE290 | 2.00% | 2.50% | | | | |
| | IRGACURE270 | | | | | | |
| | B2380 | | | | | | |
| | FK-1 | | | 2.00% | 2.00% | 2.50% | 3.00% |

TABLE 8-continued

| | Composition for forming hardcoat layer | A25 | A26 | A27 | A28 | A29 | A30 |
|---|---|---|---|---|---|---|---|
| e) | ELECOM V-8802 | | | 10.00% | 10.00% | 10.00% | 10.00% |
| | ELECOM V-8803 | | | | | | |
| | MiBK-ST | | | | | | |
| f) | Polyester urethane P-1 | | | | | | |
| | Polyester urethane P-2 | | | | | | |
| | Polyester urethane P-3 | | | | | | |
| g) | RS-90 | | | | | | |
| | RS-78 | | | | | | |
| | B-1 | | | | | | |
| Wind irregularity prevention | FP-1 | 0.10% | 0.10% | 0.10% | 0.10% | 0.10% | 0.10% |
| Other polymerizable compounds | Glycidyl methacrylate | | | | | | |
| | Ethylene glycol dimethacrylate | | | | | | |
| | CELLOXIDE 2021P | | | | | | |
| | Epoxy compound B | | | | | | |
| | Bisphenol A-type diepoxy acrylate | | | | | | |
| Solvent | MEK | 40% | 40% | 40% | 40% | 40% | 40% |
| | MiBK | 54% | 54% | 54% | 54% | 54% | 54% |
| | Methyl acetate | 6% | 6% | 6% | 6% | 6% | 6% |

The details of the materials in Tables 6, 7, and 8 are described below.

Epoxy compound A:

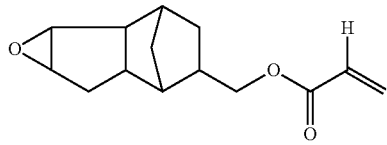 [SMILES: C=CC(=O)OCC1CC2CC1C1CC3OC3C21]

DPHA: KAYARAD DPHA (manufactured by Nippon Kayaku Co., Ltd.)

ATMMT: pentaerythritol tetraacrylate (manufactured by SHIN-NAKAMURA CHEMICAL CO., LTD.)

UV-1700B: urethane acrylate (manufactured by The Nippon Synthetic Chemical Industry Co., Ltd.)

Irgacure 127: alkylphenone-based photopolymerization initiator (manufactured by BASF SE)

Irgacure 184: alkylphenone-based photopolymerization initiator (manufactured by BASF SE)

Irgacure 290: sulfonium salt-based cationic polymerization initiator (manufactured by BASF SE)

Irgacure 270: sulfonium salt-based cationic polymerization initiator (manufactured by BASF SE)

B2380: iodonium salt-based cationic polymerization initiator (TOKYO CHEMICAL INDUSTRY CO., LTD.)

FK-1: photo-cationic polymerization initiator (iodonium salt compound) FK-1 having the following structure

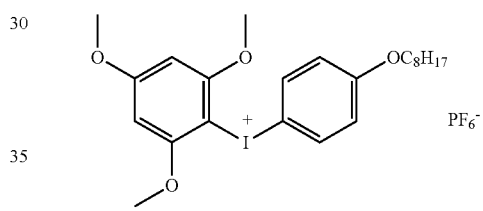

ELECOM V-8802: MiBK dispersion with solid content of spherical silica particles of 40% by mass having an average primary particle size of 12 nm and containing a polymerizable group (manufactured by JGC CORPORATION)

ELECOM V-8803: MiBK dispersion with solid content of irregular silica particles (connected in the form of a chain) of 40% by mass and containing a polymerizable group (manufactured by JGC CORPORATION)

MiBK-ST: MiBK dispersion with solid content of silica particles of 30% by mass having an average primary particle size of 10 to 20 nm and free of reactive group (manufactured by NISSAN CHEMICAL INDUSTRIES, LTD.)

Polyester urethane P-1: 30% by mass methyl ethyl ketone (MEK) solution of polyester urethane (manufactured by Toyobo Co., Ltd., trade name VYLON (registered trademark) UR-3260)

Polyester urethane P-2: manufactured by Toyobo Co., Ltd., trade name VYLON UR-5537 (30% by mass MEK/toluene solution of polyester urethane)

Polyester urethane P-3: manufactured by Toyobo Co., Ltd., trade name VYLON UR-8300 (30% by mass MEK/toluene solution of polyester urethane)

RS-90: manufactured by DIC Corporation

RS-78: manufactured by DIC Corporation

Antifoulant: represented by structural formula B-1

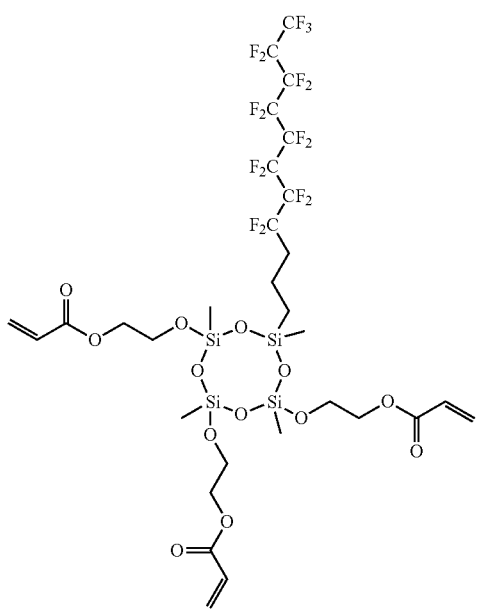

B-1

Wind irregularity preventing agent FP-1: fluorine-containing compound having the following structure

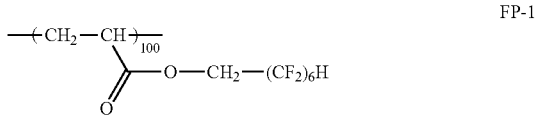

FP-1

CELLOXIDE 2021P: 3',4'-epoxycyclohexylmethyl-3,4-epoxycyclohexane carboxylate (manufactured by DAICEL CORPORATION)

Epoxy compound B:

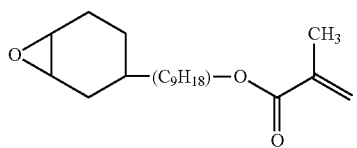

Bisphenol A-type epoxy acrylate: EPOXYESTER 3000A manufactured by KYOEISHA CHEMICAL Co., LTD.

Examples 1 to 28 and 30 to 41 and Comparative Examples 1 to 14

<Formation of Hardcoat Layer by Coating>

In Examples 1 to 24, 26, and 32 to 37 and Comparative Examples 1 to 14, as described in the following Table 9, 10, or 11, one surface of TECHNOLLOY C-101 (having a 3-layered structure in which PMMA film/polycarbonate film/PMMA film are laminated in this order, pencil hardness of surface: 2H) manufactured by Sumika Acryl Co., Ltd. having a thickness of 300 μm that was used as a support was coated with any one of the compositions for forming a hardcoat layer A01 to A26 and B01 to B14 by adjusting the amount of the composition such that, the film thickness of the hardcoat layer obtained after curing became as shown in the following Table 9, 10, or 11. Then, the composition was cured to form a hardcoat layer, thereby preparing hardcoat films of sample Nos. T01 to T24, T26, T28 to T41, and T45 to T50.

In Examples 25 and 27, one surface of a polyethylene terephthalate (PET) film (pencil hardness of surface: 1H) having a thickness of 300 μm was coated with the composition for forming a hardcoat layer A22 or A23, followed by curing to form a hardcoat layer, thereby preparing hardcoat films of sample Nos. T25 and T27.

In Examples 28 and 38 to 41, one surface of a triacetyl cellulose (TAC) film (pencil hardness of surface: 1H) prepared by a method, which will be described later, was coated with any of the compositions for forming a hardcoat layer A01 and A27 to A30, followed by curing to form a hardcoat layer, thereby preparing hardcoat films of sample Nos. T42 and T51 to T54.

In Examples 30 and 31, one surface of TECHNOLLOY (having a 3-layered structure in which PMMA film/polycarbonate film/PMMA film are laminated in this order) manufactured by Sumika Acryl Co., Ltd. having a thickness of 120 μm and surface hardness of 1H or a thickness of 200 μm and a surface hardness of 1H was coated with the composition for forming a hardcoat layer A19, followed by curing to form a hardcoat layer, thereby preparing hardcoat films of sample Nos. T43 and T44.

Specifically, the coating and curing methods in Examples 1 to 32 and Comparative Examples 1 to 14 are as below. By the die coating method using a slot the described in Example 1 in JP2006-122889A, the support was coated with a coating solution which was each of the compositions for forming a hardcoat layer under the condition of a transport rate of 30 m/min, followed by drying for 150 seconds at 60° C. Thereafter, with nitrogen purging, at an oxygen concentration of about 0.1% by volume, the coating layer was cured by being irradiated with ultraviolet rays at an illuminance of 400 mW/cm$^2$ and a dose of 500 mJ/cm$^2$ by using a 160 W/cm air-cooled metal halide lamp (manufactured by EYE GRAPHICS Co., Ltd.) such that a hardcoat layer was formed, and then the resulting film was wound up.

Specifically, the coating and curing methods in Examples 3 to 41 are as below. That is, the support was coated with the coating solution which was each of the compositions for forming a hardcoat layer under the aforementioned condition, followed by drying. Thereafter, the resulting film was wrapped around a back up roll kept at 30° C., and in this state, with nitrogen purging, at an oxygen concentration of about 0.1% by volume, the film was irradiated with ultraviolet rays at an illuminance of 300 mW/cm$^2$ and a dose of 50 mJ/cm$^2$ by using the aforementioned air-cooled metal halide lamp. Subsequently, the resulting film was wrapped around a back up roll kept at 55° C., and in this state, with nitrogen purging, at an oxygen concentration of about 0.1% by volume, the film was irradiated with ultraviolet rays at an illuminance of 400 mW/cm$^2$ and a dose of 500 mJ/cm$^2$ by using the aforementioned air-cooled metal halide lamp so as to form a hardcoat layer by curing the coating layer, and then the resulting film was wound up.

(Preparation of Triacetyl Cellulose Film Having Film Thickness of 300 μm)

The triacetyl cellulose film having a film thickness of 300 μm used as a support of the hardcoat films of sample Nos. T42 and T51 to T54 was prepared by the following method.

(1) Preparation of Cellulose Acylate Dope for Core Layer

The following composition was put into a mixing tank and stirred such that the components dissolved, thereby preparing a cellulose acylate dope for a core layer.

| Cellulose acylate dope for core layer | |
|---|---|
| Cellulose acetate with a degree of acetyl substitution of 2.88 and a weight-average molecular weight of 260,000 | 100 parts by mass |
| Phthalic acid ester oligomer A | 10 parts by mass |
| Compound (A-1) represented by Formula I | 4 parts by mass |
| Ultraviolet absorber (compound having the following structure, manufactured by BASF SE) | 2.7 parts by mass |
| TINUVIN 123 (HA-1, manufactured by BASF SE) | 0.18 parts by mass |
| TEKURAN DO (N-alkenylpropylenediamine triacetic acid, manufactured by Nagase ChemteX Corporation) | 0.02 parts by mass |
| Methylene chloride (first solvent) | 430 parts by mass |
| Methanol (second solvent) | 64 parts by mass |

Phthalic acid ester oligomer A having the following structure, molecular weight MW: 750

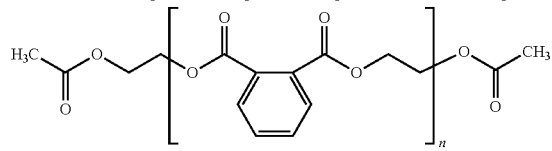

Compound (A-1) having the following structure represented by Formula I

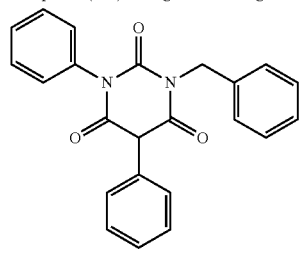

Ultraviolet absorber having the following structure

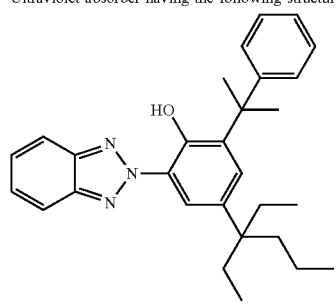

(2) Preparation of Cellulose Acylate Dope for Outer Layer 10 parts by mass of a matting agent solution, which was the following composition, was added to 90 parts by mass of the aforementioned cellulose acylate dope for a core layer, thereby preparing a cellulose acylate solution for an outer layer.

| Matting agent solution | |
|---|---|
| Silica particles having an average particle size of 20 nm (AEROSIL R972, manufactured by NIPPON AEROSIL CO., LTD.) | 2 parts by mass |
| Methylene chloride (first solvent) | 76 parts by mass |
| Methanol (second solvent) | 11 parts by mass |
| Cellulose acylate dope for core layer | 1 part by mass |

(3) Preparation of Cellulose Acylate Film

The cellulose acylate dope for a core layer and the cellulose acylate dope for an outer layer which will be cast onto both sides of the core layer was simultaneously cast as 3 layers from a casting outlet onto a drum with a temperature of 20° C. In a state where the solvent content rate became about 20% by mass, the film was peeled off, and both ends of the film in the width direction were fixed to tenter clips. In a state where the proportion of the residual solvent was 3% to 15%, the film was stretched while being stretched by a factor of 1.18 in the transverse direction. Then, the film was dried by being transported between rolls of a thermal treatment apparatus, thereby preparing a triacetyl cellulose film having a thickness of 300 µm.

[Evaluation]

The prepared hardcoat film of each of the examples and comparative examples was evaluated by the evaluation method.

The obtained results are described in the following tables.

<Film Thickness of Hardcoat Layer>

By using a contact-type film thickness meter, the film thickness of the hardcoat film was measured. By subtracting the support thickness measured by the same method from the film thickness of the hardcoat film, the film thickness of the hardcoat layer was calculated.

<Pencil Hardness>

The pencil hardness evaluation described in JIS K 5400 was performed. The hardcoat film was humidified for 2 hours at a temperature of 25° C. and a relative humidity of 60%. Then, by using 6H, 7H, and 8H testing pencils specified in JIS S 6006, the surface of the hardcoat layer of the hardcoat film was scratched under a load of 4.9 N. The numerical value described in the following tables is the number of samples in which scratch did not occur when the samples were scratched 5 times with each pencil.

According to grade, the pencil hardness was decided based on the following standards.

A: When the film was scratched 5 times with a 8H pencil, scratches did not occur 3 or more times.

B: When the film was scratched 5 times with a 7H pencil, scratches did not occur 3 or more times.

C: When the film was scratched 5 times with a 6H pencil, scratches occurred 3 or more times.

(Smoothness)

The smoothness of the surface of the film on the side where the hardcoat layer was formed was evaluated. Specifically, the image of fluorescent light reflected on the surface on which the hardcoat layer was formed was observed and evaluated as below.

A: the reflected image of the fluorescent light was not distorted.

B: the reflected image of the fluorescent light was slightly distorted, but it was unproblematic for practical use.

C: the reflected image of the fluorescent light was seriously distorted, and it was problematic for practical use.

(Brittleness)

By using testing methods for paints-bend resistance test (cylindrical mandrel method) described in JIS-K-5600-5-1, brittleness was evaluated as below.

Each of the optical films was stored for 16 hours under the conditions of a temperature of 25° C. and a relative humidity of 55% and then wound around mandrels having different diameters (in the present specification, described as φ in some cases), and the way the cracks occurred was observed. Based on the diameter of the biggest mandrel in which cracks did not occur, brittleness (crack resistance) was evaluated. The smaller the diameter of the mandrel the better the performance. The brittleness was evaluated based on the following evaluation standards.

A: the diameter of the mandrel was less than 35 mmφ.

B: the diameter of the mandrel was equal to or greater than 35 mmφ and less than 60 mmφ.

C: the diameter of the mandrel was equal to or greater than 60 mmφ

(Scratch Resistance)

By using a rubbing tester, a rubbing test was performed on the surface of the hardcoat layer of the hardcoat film under the following conditions so as to obtain an index of scratch resistance.

Environmental condition for evaluation: 25° C.; relative humidity of 60%

Rubbing material: steel wool (manufactured by NIHON STEEL WOOL Co., Ltd., grade No. 0000)

Wound around a rubbing tip portion (1 cm×1 cm) of the tester contacting a sample and fixed using a band Moving distance (one way): 13 cm Rubbing rate: 13 cm/sec Load: either 500 g/cm$^2$ or 1 kg/cm$^2$ Contact area of tip portion: 1 cm×1 cm Number of times of rubbing: 100 times of reciprocation Oil-based ink was applied to the rear surface of the sample having undergone rubbing, the sample was visually observed by using reflected light, and the scratch of the rubbed portion was evaluated.

A: a scratch was not seen at all even when the sample was very carefully observed.

B: slight scratches were observed when the sample was carefully observed, but the scratches were unproblematic.

C: Moderate scratches were observed, and the scratches were noticeable.

(Change in external appearance of film left in moist-heat environment for long period of time)

The hardcoat film was left for 1,000 hours in an environment of a temperature of 60° C. and a relative humidity of 90%. Then, the hardcoat film was humidified for 2 hours or longer at a temperature of 25° C. and a relative humidity of 60%, and the external appearance of the film at that time was evaluated.

A: No change in the external appearance of the film.

B: A change in the external appearance of the film, such as turbidness, was observed.

[Preparation of Polarizing Plate]

By using a microgravure coater (gravure roll: #180, spinning rate 140%/line speed), a surface of the hardcoat film, on which the hardcoat layer was no laminated, of each of the examples and comparative examples (one surface of the support used in the hardcoat film) was coated with an active energy ray-curable acryl adhesive such that the thickness became 5 μm, thereby preparing a hardcoat film with an adhesive.

Then, the surface to be bonded to a polarizer was subjected to a corona treatment, and the hardcoat film with an adhesive was bonded to both surfaces of a 25 μm iodine-containing PVA polarizer by using a roll machine. The hardcoat film sides (both sides) bonded were irradiated with electron beams, thereby obtaining polarizing plates of examples and comparative examples having a hardcoat film on both sides of a polarizer. The line speed was set to be 20 m/min, the acceleration voltage was set to be 250 kV, and the irradiation dose was set to be 20 kGy.

At this time, the polarizer and the hardcoat film were disposed such that the longitudinal direction of the prepared polarizer roll became parallel to the longitudinal direction of the hardcoat film. Furthermore, the polarizer and the support was disposed such that the longitudinal direction of the polarizer roll became parallel to the longitudinal direction of the support.

[Preparation of Liquid Crystal Display]

The polarizing plate on the surface side of a commercially available IPS-type liquid crystal television (42LS 5600 manufactured by LG Electronics) was peeled off, and the polarizing plate of each of the examples and comparative examples was bonded to the front side by using a pressure sensitive adhesive, such that the absorption axis of the polarizing plate on the front side became longitudinal direction (horizontal direction) and that the hardcoat layer became the uppermost surface. The thickness of glass used in the liquid crystal cell was 0.5 mm.

In this way, liquid crystal displays of examples and comparative examples were obtained.

(Evaluation of Liquid Crystal Display)

<Evaluation of Light Leakage>

The liquid crystal display of each of the examples and comparative examples prepared as above was humidified for 24 hours at a temperature of 40° C. and a relative humidity of 90% and then left for 24 hours at a temperature of 25° C. and a relative humidity of 55%. Thereafter, the backlight of the liquid crystal display was turned on 24 hours after the backlight was turned on, the light leakage from 4 corners of the panel was evaluated.

By using a camera for measuring brightness, "ProMetric" (manufactured by Radiant Imaging), the black display screen was imaged from a front of the screen. Based on a difference between the average brightness of whole screen and the brightness of sites where the light leakage seriously occurred at 4 corners, the light leakage was evaluated into 3 levels.

~Evaluation Indices~

A: light leakage was not visually recognized at 4 corners of the panel.

B: light leakage was slightly visually recognized at 1 to 2 corners among 4 corners of the plate, but it was acceptable.

C: serious light leakage occurred at 4 corners of the panel, and it was unacceptable.

The evaluation results of the prepared hardcoat film, the polarizing plate using the hardcoat film, and the liquid crystal display are shown in the following tables.

TABLE 9

|  |  | Sample No. | | | | | | | |
| --- | --- | --- | --- | --- | --- | --- | --- | --- | --- |
|  |  | T01 | T02 | T03 | T04 | T05 | T06 | T07 | T08 |
|  | Composition for forming hardcoat layer | A01 | A01 | A01 | A02 | A03 | A04 | A05 | A06 |
| Layer constitution | Support | PMMA PC PMMA | PMMA PC PMMA | PMMA PC PMMA | PMMA PC PMMA | PMMA PC PMMA | PMMA PC PMMA | PMMA PC PMMA | PMMA PC PMMA |
|  | Film thickness of support | 300 | 300 | 300 | 300 | 300 | 300 | 300 | 300 |

TABLE 9-continued

| | | | | | | | | | |
|---|---|---|---|---|---|---|---|---|---|
| | Film thickness of support [μm] | | | | | | | | |
| | Film thickness of hardcoat layer [μm] | 35 | 30 | 21 | 35 | 35 | 35 | 35 | 35 |
| Evaluation | Pencil hardness (8H) | 2 | 2 | 0 | 2 | 3 | 2 | 4 | 0 |
| | Pencil hardness (7H) | 5 | 4 | 3 | 5 | 5 | 5 | 5 | 3 |
| | Pencil hardness (6H) | 5 | 5 | 5 | 5 | 5 | 5 | 5 | 5 |
| | Evaluation of pencil hardness | B | B | B | B | A | B | A | B |
| | Smoothness | 5 nm | 7 nm | 10 nm | 5 nm | 5 nm | 7 nm | 10 nm | 3 nm |
| | Evaluation of smoothness | A | B | B | A | A | B | B | A |
| | Brittleness | 40 φ | 35 φ | 35 φ | 40 φ | 40 φ | 40 φ | 50 φ | 35 φ |
| | Evaluation of brittleness | B | B | B | B | B | B | B | B |
| | Scratch resistance | B | B | B | B | B | B | B | B |
| | Change in external appearance of film left in moist-heat environment for long period of time | A | A | A | A | A | A | A | A |
| | Liquid crystal cell No. | C01 | C02 | C03 | C04 | C05 | C06 | C07 | C08 |
| | Evaluation of light leakage | B | B | B | B | B | B | B | A |
| | Note | Example 1 | Example 2 | Example 3 | Example 4 | Example 5 | Example 6 | Example 7 | Example 8 |

| | | Sample No. | | | | | | | |
|---|---|---|---|---|---|---|---|---|---|
| | Composition for forming hardcoat layer | T09 A07 | T10 A08 | T11 A09 | T12 A10 | T13 A11 | T14 A12 | T15 A13 | T16 A14 |
| Layer constitution | Support | PMMA PC PMMA | PMMA PC PMMA | PMMA PC PMMA | PMMA PC PMMA | PMMA PC PMMA | PMMA PC PMMA | PMMA PC PMMA | PMMA PC PMMA |
| | Film thickness of support [μm] | 300 | 300 | 300 | 300 | 300 | 300 | 300 | 300 |
| | Film thickness of hardcoat layer [μm] | 35 | 35 | 35 | 35 | 35 | 35 | 35 | 35 |
| Evaluation | Pencil hardness (8H) | 2 | 1 | 2 | 1 | 1 | 2 | 3 | 4 |
| | Pencil hardness (7H) | 5 | 4 | 3 | 3 | 5 | 5 | 4 | 4 |
| | Pencil hardness (6H) | 5 | 5 | 5 | 5 | 5 | 5 | 5 | 5 |
| | Evaluation of pencil hardness | B | B | B | B | B | B | A | A |
| | Smoothness | 5 nm | 5 nm | 5 nm | 5 nm | 5 nm | 5 nm | 5 nm | 5 nm |
| | Evaluation of smoothness | A | A | A | A | A | A | A | A |
| | Brittleness | 35 φ | 35 φ | 35 φ | 35 φ | 35 φ | 35 φ | 35 φ | 35 φ |
| | Evaluation of brittleness | B | B | B | B | B | B | B | B |
| | Scratch resistance | B | B | B | B | B | B | B | B |
| | Change in external appearance of film left in moist-heat environment for long period of time | A | A | A | A | A | A | A | A |
| | Liquid crystal cell No. | C09 | C10 | C11 | C12 | C13 | C14 | C15 | C16 |
| | Evaluation of light leakage | B | B | B | B | B | B | B | A |
| | Note | Example 9 | Example 10 | Example 11 | Example 12 | Example 13 | Example 14 | Example 15 | Example 16 |

| | | Sample No. | | | | | | |
|---|---|---|---|---|---|---|---|---|
| | Composition for forming hardcoat layer | T17 A15 | T18 A16 | T19 A17 | T20 A18 | T21 A19 | T22 A20 | T23 A21 |
| Layer constitution | Support | PMMA PC PMMA | PMMA PC PMMA | PMMA PC PMMA | PMMA PC PMMA | PMMA PC PMMA | PMMA PC PMMA | PMMA PC PMMA |
| | Film thickness of support [μm] | 300 | 300 | 300 | 300 | 300 | 300 | 300 |
| | Film thickness of hardcoat layer [μm] | 35 | 35 | 35 | 35 | 35 | 35 | 35 |
| Evaluation | Pencil hardness (8H) | 4 | 5 | 5 | 2 | 4 | 4 | 5 |
| | Pencil hardness (7H) | 4 | 5 | 5 | 3 | 5 | 5 | 5 |
| | Pencil hardness (6H) | 5 | 5 | 5 | 5 | 5 | 5 | 5 |

TABLE 9-continued

| | | | | | | | |
|---|---|---|---|---|---|---|---|
| Evaluation of pencil hardness | A | A | A | B | A | A | A |
| Smoothness | 5 nm | 5 nm | 5 nm | 5 nm | 5 nm | 5 nm | 5 nm |
| Evaluation of smoothness | A | A | A | A | A | A | A |
| Brittleness | 35 φ | 35 φ | 35 φ | 35 φ | 30 φ | 30 φ | 30 φ |
| Evaluation of brittleness | B | B | B | B | A | A | A |
| Scratch resistance | B | B | B | B | B | B | B |
| Change in external appearance of film left in moist-heat environment for long period of time | A | A | A | A | A | A | A |
| Liquid crystal cell No. | C17 | C18 | C19 | C20 | C21 | C22 | C23 |
| Evaluation of light leakage | A | A | A | A | A | A | A |
| Note | Example 17 | Example 18 | Example 19 | Example 20 | Example 21 | Example 22 | Example 23 |

TABLE 10

| | | Sample No. | | | | | | | | | | | |
|---|---|---|---|---|---|---|---|---|---|---|---|---|---|
| | | T24 | T25 | T26 | T27 | T28 | T29 | T30 | T31 | T32 | T33 | T34 | T35 |
| | | A22 | A22 | A23 | A23 | B01 | B02 | A01 | B03 | B04 | B05 | B06 | B07 |
| Layer constitution | Composition for forming hardcoat layer | PMMA PC PMMA | PET | PMMA PC PMMA | PET | PMMA PC PMMA | PMMA PC PMMA | PMMA PC PMMA | PMMA PC PMMA | PMMA PC PMMA | PMMA PC PMMA | PMMA PC PMMA | PMMA PC PMMA |
| | Support | | | | | | | | | | | | |
| | Film thickness of support [μm] | 300 | 300 | 300 | 300 | 300 | 300 | 300 | 300 | 300 | 300 | 300 | 300 |
| | Film thickness of hardcoat layer [μm] | 35 | 35 | 35 | 35 | 35 | 35 | 20 | 35 | 35 | 35 | 35 | 35 |
| Evaluation | Pencil hardness (8H) | 3 | 2 | 3 | 2 | 4 | 0 | 0 | 0 | 3 | 4 | 3 | 3 |
| | Pencil hardness (7H) | 4 | 3 | 4 | 4 | 5 | 2 | 1 | 2 | 5 | 4 | 4 | 5 |
| | Pencil hardness (6H) | 5 | 5 | 5 | 5 | 5 | 3 | 3 | 4 | 5 | 5 | 5 | 5 |
| | Evaluation of pencil hardness | A | B | A | B | A | C | C | C | A | A | A | A |
| | Smoothness | 5 nm | 5 nm | 5 nm | 5 nm | 12 nm | 3 nm | 15 nm | 5 nm | 5 nm | 5 nm | 5 nm | 5 nm |
| | Evaluation of smoothness | A | A | A | A | C | B | C | B | A | A | A | A |
| | Brittleness | 30 φ | 30 φ | 30 φ | 30 φ | 60 φ | 30 φ | 20 φ | 35 φ | 30 φ | 30 φ | 30 φ | 30 φ |
| | Evaluation of brittleness | A | A | A | A | C | A | A | B | A | A | A | A |
| | Scratch resistance | A | A | A | A | B | C | B | A | A | A | A | A |
| | Change in external appearance of film left in moist-heat environment for long period of time | A | A | A | A | A | A | A | B | B | B | B | B |
| | Liquid crystal cell No. | C24 | C25 | C26 | C27 | C28 | C29 | C30 | C31 | C32 | C33 | C34 | C35 |
| | Evaluation of light leakage | A | A | A | A | C | A | A | B | A | A | A | A |
| | Note | Example 24 | Example 25 | Example 26 | Example 27 | Comparative Example 1 | Comparative Example 2 | Comparative Example 3 | Comparative Example 4 | Comparative Example 5 | Comparative Example 6 | Comparative Example 7 | Comparative Example 8 |

| | | Sample No. | | | | | | | | | |
|---|---|---|---|---|---|---|---|---|---|---|---|
| | | T36 | T37 | T38 | T39 | T40 | T41 | T42 | T43 | T44 | T45 |
| | | B08 | B09 | B10 | B1 | B12 | B13 | A01 | A19 | A19 | A24 |
| Layer constitution | Composition for forming hardcoat layer | PMMA PC PMMA | PMMA PC PMMA | PMMA PC PMMA | PMMA PC PMMA | PMMA PC PMMA | PMMA PC PMMA | TAC | PMMA PC PMMA | PMMA PC PMMA | PMMA PC PMMA |
| | Support | | | | | | | | | | |
| | Film thickness of support [μm] | 300 | 300 | 300 | 300 | 300 | 300 | 300 | 120 | 200 | 300 |
| | Film thickness of hardcoat layer [μm] | 35 | 35 | 35 | 35 | 35 | 35 | 35 | 35 | 35 | 35 |

TABLE 10-continued

| | | Comparative Example 9 | Comparative Example 10 | Comparative Example 11 | Comparative Example 12 | Comparative Example 13 | Comparative Example 14 | Example 28 | Example 30 | Example 31 | Example 32 |
|---|---|---|---|---|---|---|---|---|---|---|---|
| Evaluation | Pencil hardness (8H) | 5 | 0 | 0 | 0 | 0 | 3 | 1 | 1 | 2 | 3 |
| | Pencil hardness (7H) | 5 | 1 | 2 | 2 | 0 | 4 | 3 | 3 | 4 | 4 |
| | Pencil hardness (6H) | 5 | 3 | 5 | 3 | 0 | 5 | 5 | 5 | 5 | 5 |
| | Evaluation of pencil hardness | A | C | C | C | C | B | B | B | B | A |
| | Smoothness | 15 nm | 5 nm | 5 nm | 5 nm | 15 nm | 12 nm | 7 nm | 5 nm | 5 nm | 7 nm |
| | Evaluation of smoothness | C | A | A | A | C | C | B | A | A | B |
| | Brittleness | 70 φ | 20 φ | 20 φ | 20 φ | 20 φ | 60 φ | 35 φ | 25 φ | 30 φ | 30 φ |
| | Evaluation of brittleness | C | A | A | A | A | C | B | A | A | A |
| | Scratch resistance | A | C | C | A | C | C | B | B | B | B |
| | Change in external appearance of film left in moist-heat environment for long period of time | A | B | B | B | B | B | A | A | A | A |
| | Liquid crystal cell No. | C36 | C37 | C38 | C39 | C40 | C41 | C42 | C43 | C44 | C45 |
| | Evaluation of light leakage | C | A | A | A | A | A | A | B | A | A |
| | Note | Comparative Example 9 | Comparative Example 10 | Comparative Example 11 | Comparative Example 12 | Comparative Example 13 | Comparative Example 14 | Example 28 | Example 30 | Example 31 | Example 32 |

TABLE 11

| Composition for forming hardcoat layer | | Sample No. | | | | | | | | |
|---|---|---|---|---|---|---|---|---|---|---|
| | | T46 A05 | T47 A25 | T48 A02 | T49 A26 | T50 A06 | T51 A27 | T52 A28 | T53 A29 | T54 A30 |
| Layer constitution | Support | PMMA PC PMMA | PMMA PC PMMA | PMMA PC PMMA | PMMA PC PMMA | PMMA PC PMMA | TAC | TAC | TAC | TAC |
| | Film thickness of support [μm] | 300 | 300 | 300 | 300 | 300 | 300 | 300 | 300 | 300 |
| | Film thickness of hardcoat layer [μm] | 40 | 40 | 40 | 40 | 40 | 35 | 35 | 35 | 35 |
| Evaluation | Pencil hardness (8H) | 5 | 4 | 2 | 2 | 1 | 4 | 3 | 2 | 1 |
| | Pencil hardness (7H) | 5 | 5 | 5 | 5 | 3 | 5 | 4 | 4 | 3 |
| | Pencil hardness (6H) | 5 | 5 | 5 | 5 | 5 | 5 | 5 | 5 | 5 |
| | Evaluation of pencil hardness | A | A | B | B | B | A | A | B | B |
| | Smoothness | 10 nm | 7 nm | 5 nm | 3 nm | 3 nm | 5 nm | 5 nm | 3 nm | 3 nm |
| | Evaluation of smoothness | B | B | A | A | A | A | A | A | A |
| | Brittleness | 50 φ | 45 φ | 40 φ | 35 φ | 35 φ | 35 φ | 35 φ | 30 φ | 30 φ |
| | Evaluation of brittleness | B | B | B | B | B | B | B | A | A |
| | Scratch resistance | B | B | B | B | B | B | B | B | B |
| | Change in external appearance of film left in moist-heat environment for long period of time | A | A | A | A | A | A | A | A | A |
| | Liquid crystal cell No. | C46 | C47 | C48 | C49 | C50 | C51 | C52 | C53 | C54 |
| | Evaluation of light leakage | B | B | B | A | A | B | B | A | A |
| | Note | Example 33 | Example 34 | Example 35 | Example 36 | Example 37 | Example 38 | Example 39 | Example 40 | Example 41 |

From Tables 9, 10, and 11, it is understood that, compared to comparative examples, the hardcoat film of each example has higher pencil hardness, better smoothness, and further inhibited from experiencing a change in the external appearance of the film after being left in a moist-heat environment for a long period of time.

From Comparative Example 1, it was understood that, in a case where the content of a) component in the hardcoat layer is less than the lower limit specified by the present invention, the smoothness is poor.

From Comparative Example 2, it was understood that, in a case where the content of a) component in the hardcoat layer exceeds the upper limit specified by the present invention and the content of b) component in the hardcoat layer is less than the lower limit specified by the present invention, the pencil hardness is low.

From Comparative Example 3, it was understood that, in a case where the film thickness of the hardcoat layer is less than the lower limit specified by the present invention, the smoothness is poor.

From Comparative Example 4, it was understood that, in a case where the content of b) component in the hardcoat layer is less than the lower limit specified by the present invention, the pencil hardness is low, and the external appearance of the film changes after the film is left in a most-heat environment for a long period of time.

From Comparative Example 5, it was understood that, in a case where the hardcoat layer does not contain a) component, the external appearance of the film changes alter the film is left in a most-heat environment for a long period of time.

From Comparative Examples 6 and 8, it was understood that, in a case where the hardcoat layer does not contain a)

component and a compound containing only an epoxy group is used as a) component, the external appearance of the film changes after the film is left in a moist-heat environment for a long period of time.

From Comparative Example 7, it was understood that, in a case where the hardcoat layer does not contain a) component and a compound having a molecular weight exceeding the upper limit specified by the present invention is used instead of a) component, the external appearance of the film changes after the film is left in a moist-heat environment for a long period of time.

From Comparative Example 9, it was understood that, in a case where the hardcoat layer does not contain a) component and the content of b) component in the hardcoat layer exceeds the upper limit specified by the present invention, the smoothness is poor.

From Comparative Example 10, it was understood that, in a case where the hardcoat layer does not contain d) component, the pencil hardness is low, and the external appearance of the film changes after the film is left in a moist-heat environment for a long period of time.

From Comparative Example 11, it was understood that, in a case where the content of d) component in the hardcoat layer is less than the lower limit specified by the present invention, the pencil hardness is low, and the external appearance of the film changes after the film is left in a moist-heat environment for a long period of time.

From Comparative Example 12, it was understood that, in a case where the content of d) component in the hardcoat layer exceeds the upper limit specified by the present invention, the pencil hardness is low, and the external appearance of the film changes after the film is left in a moist-heat environment for a long period of time.

From Comparative Example 13, it was understood that, in a case where the content of c) component in the hardcoat layer is less than the lower limit specified by the present invention, the pencil hardness is low, the smoothness is poor, and the external appearance of the film changes after the film is left in a moist-heat environment for a long period of time.

From Comparative Example 14, it was understood that, in a case where the content of c) component in the hardcoat layer exceeds the upper limit specified by the present invention, the pencil hardness is high; however, the smoothness is poor, and the external appearance of the film changes after the film is left in a moist-heat environment for a long period of time.

[Preparation of Hardcoat Film Having Layer of Low Refractive Index]

By the following method, a layer of low refractive index was formed on the hardcoat film of the present invention by coating. As a result, it was confirmed that while the film has high pencil hardness, excellent smoothness, and excellently maintains the external appearance of the film even after being left in a moist-heat environment for a long period of time, the reflection is reduced, and excellent black color solidness is realized.

<Formation of Layer of Low Refractive Index by Coating>

(Preparation of Inorganic Particle Dispersion (B-1))

By changing the preparation conditions adopted in Preparation Example 4 in JP2002-79616A, silica particles having internal cavities were prepared. The solvent of the particles an aqueous dispersion state was substituted with methanol. The concentration of the solid content of the solution was regulated such that the concentration finally became 20% by mass, thereby obtaining silica particles having an average particle size of 45 nm, a shell thickness of about 7 nm, and a refractive index of 1.30. The resultant was named dispersion (B).

15 parts by mass of acryloyloxypropyltrimethoxysilane and 1.5 parts by mass of diisopropoxyaluminum ethyl acetate were added to and mixed with 500 parts by mass of the dispersion (B), and then 9 parts by mass of deionized water was added thereto. The resulting solution was reacted for 8 hours at 60° C. and then cooled to more temperature, and then 1.8 parts by mass of acetylacetone was added thereto. Furthermore, in a state where MEK was being added thereto such that the total amount of the solution was kept approximately constant, the solvent was substituted by means of distillation under reduced pressure. The concentration of the solid content of the solution was regulated such that the concentration finally became 20% by mass, thereby preparing a dispersion (B-1).

(Preparation of Coating Solution for Forming Layer of Low Refractive Index)

7.6 g of a fluorine-containing polymer (P-12; fluorine-containing copolymer, example compound in JP2007-293325A) and 1.4 g of DPHA were added to 2.4 g of the dispersion (B-1), 0.46 g of a photopolymerization initiator (IRGACURE 907), 190 g of methyl ethyl ketone, and 48 g of propylene glycol monomethyl ether acetate, followed by stirring. The mixture was filtered through a filter made of polypropylene having a pore size of 5 μm, thereby preparing a coating solution for a layer of low refractive index.

(Formation of Layer of Low Refractive Index by Coating)

The aforementioned hardcoat film on which the hardcoat layer was formed by coating was wound off, and the hardcoat layer was coated with the coating solution for a layer of low refractive index by the coating method using a slot the under the condition of a transport rate of 30 m/min, followed by drying for 75 seconds at 90° C. Then, with nitrogen purging, at an oxygen concentration of 0.01 to 0.1%, by using a 240 W/cm air-cooled metal halide lamp (manufactured by EYE GRAPHICS Co., Ltd.), the composition was irradiated with ultraviolet rays at an illuminance of 400 m W/cm$^2$ and a dose of 240 ml/cm$^2$, thereby forming a layer of low refractive index having a thickness of 100 nm. The film was then wound up, thereby preparing a hardcoat film having a layer of low refractive index on the hardcoat layer. The refractive index of the layer of low refractive index was 1.46.

What is claimed is:

1. A hardcoat film comprising:
   a support; and
   a hardcoat layer disposed on at least one surface of the support,
   wherein the support contains a resin as a main component;
   wherein a film thickness of the hardcoat layer exceeds 20 μm;
   wherein the hardcoat layer contains at least a structure derived from a), b), c), d) and g);
   wherein:
   a) compound which has one alicyclic epoxy group and one ethylenically unsaturated double bond group in a molecule and has a molecular weight equal to or less than 300;
   b) compound which has 3 or more ethylenically unsaturated double bond groups in a molecule;
   c) radical polymerization initiator;
   d) cationic polymerization initiator; and
   g) antifoulant which has a plurality of polymerizable unsaturated groups in one molecule;

wherein, on condition that a total solid content of the hardcoat layer is regarded as being 100% by mass, the hardcoat layer contains the structure derived from a) in an amount of 15% to 70% by mass, the structure derived from b) in an amount of 25% to 80% by mass, c) in an amount of 0.1% to 10% by mass, d) in an amount of 0.1% to 10% by mass, and the structure derived from g) in an amount of 1% to 20% by mass;

wherein the hardcoat layer is formed by curing a composition for forming a hardcoat layer containing at least a), b), c), d) and g);

wherein, on condition that a total solid content of the composition for forming a hardcoat layer is regarded as being 100% by mass, the composition contains a) in an amount of 15% to 70% by mass, b) in an amount of 25% to 80% by mass, c) in an amount of 0.1% to 10% by mass, d) in an amount of 0.1% to 10% by mass, and g) in an amount of 1% to 20% by mass;

wherein the pencil hardness of the hardcoat film is 6H or more;

wherein a) compound which has one alicyclic epoxy group and one ethylenically unsaturated double bond group in a molecule and has a molecular weight equal to or less than 300 is epoxycyclohexylmethyl (meth)acrylate;

wherein g) antifoulant which has a plurality of polymerizable unsaturated groups in one molecule contains a fluorine-containing compound;

wherein the fluorine-containing compound has a perfluoropolyether group and a plurality of polymerizable unsaturated groups in one molecule; and wherein the fluorine-containing compound is compatible and forms covalent bonds with a) and b), and the structure derived from g) is distributed within the hardcoat layer in a film thickness direction in such a state that a percentage of an amount of fluorine in the vicinity of the surface of the hardcoat layer, to an amount of fluorine in the entirety of the hardcoat layer, is higher than 51%.

2. The hardcoat film according to claim 1, wherein the hardcoat layer contains e) inorganic particles reactive with an epoxy group or an ethylenically unsaturated double bond group in an amount of 5% to 40% by mass.

3. The hardcoat film according to claim 2, wherein e) inorganic particles reactive with an epoxy group or an ethylenically unsaturated double bond group are silica particles.

4. The hardcoat film according to claim 1, wherein the hardcoat layer contains f) polyester urethane.

5. The hardcoat film according to claim 1, wherein the support is a plastic transparent support.

6. The hardcoat film according to claim 1, wherein the support includes at least one kind of film selected from the group consisting of an acryl resin film and a polycarbonate resin film.

7. The hardcoat film according to claim 1, wherein the support is a cellulose acylate film, and the cellulose acylate film contains at least a compound represented by the following Formula I;

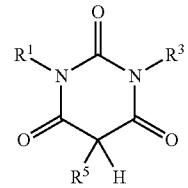

Formula I in Formula I, $R^1$, $R^3$, and $R^5$ each independently represent a hydrogen atom, an alkyl group, a cycloalkyl group, an alkenyl group, or an aromatic group, the alkyl group, the cycloalkyl group, the alkenyl group, and the aromatic group may have a substituent, and any one of $R^1$, $R^3$, and $R^5$ is an alkyl group or a cycloalkyl group substituted with a group having a ring structure, and the number of ring structures existing in $R^1$, $R^3$, and $R^5$ is equal to or greater than 3 in total.

8. The hardcoat film according to claim 1, wherein a film thickness of the support is equal to or greater than 200 μm.

9. A polarizing plate comprising:
a polarizer; and
at least one sheet of the hardcoat film according to claim 1.

10. A liquid crystal display comprising:
a liquid crystal cell; and
the polarizing plate according to claim 9 disposed on at least one surface of the liquid crystal cell,
wherein the hardcoat film is disposed on at least one uppermost surface of the liquid crystal display.

* * * * *